(12) United States Patent
Akatsuka et al.

(10) Patent No.: US 6,182,171 B1
(45) Date of Patent: Jan. 30, 2001

(54) INFORMATION COMMUNICATION SYSTEM AND METHOD APPLICABLE TO IN-VEHICLE NETWORKING ARCHITECTURE

(75) Inventors: Takeshi Akatsuka, Yokohama; Masayuki Takada, Kanagawa; Takashi Ueno, Yokohama; Ricardo Wong, Kanagawa, all of (JP)

(73) Assignee: Nissan Motor Co., Ltd., Kanagawa (JP)

( * ) Notice: Under 35 U.S.C. 154(b), the term of this patent shall be extended for 0 days.

(21) Appl. No.: 09/092,055

(22) Filed: Jun. 5, 1998

(30) Foreign Application Priority Data

Jun. 6, 1997 (JP) .................................... 9-149448
Jul. 4, 1997 (JP) .................................... 9-179990

(51) Int. Cl.[7] .................................................. G06F 13/00
(52) U.S. Cl. ............................................... 710/100; 701/1
(58) Field of Search ..................... 710/100, 129, 710/1, 5, 62, 72; 709/208, 223, 253; 714/39, 40, 819; 340/933, 146.2, 825.52; 370/257, 419, 906; 365/129; 713/400; 73/116; 359/118, 154; 307/10.1, 9.1, 38; 701/1, 36

(56) References Cited

U.S. PATENT DOCUMENTS

| | | | |
|---|---|---|---|
| 4,584,487 | * | 4/1986 | Hesse et al. . |
| 4,817,418 | * | 4/1989 | Asami et al. . |
| 4,881,227 | * | 11/1989 | Bühren . |
| 4,942,571 | * | 7/1990 | Möller et al. . |
| 4,947,393 | * | 8/1990 | Paul et al. . |
| 4,964,076 | * | 10/1990 | Schurk . |
| 5,396,485 | | 3/1995 | Ohno et al. . |
| 5,548,559 | * | 8/1996 | Mochizuki et al. . |
| 5,552,921 | * | 9/1996 | Hetzel et al. . |
| 5,726,876 | | 3/1998 | Koike et al. . |
| 5,734,978 | | 3/1998 | Hayatake et al. . |

FOREIGN PATENT DOCUMENTS

| | | |
|---|---|---|
| 4-170134 | 6/1992 | (JP) . |
| 4-326898 | 11/1992 | (JP) . |

OTHER PUBLICATIONS

"HIGH in-vehicle networking", Automotive Engineering, May 1996, pp 34–37.

* cited by examiner

Primary Examiner—Gopal C. Ray
(74) Attorney, Agent, or Firm—McDermott, Will & Emery

(57) ABSTRACT

In information communication system and method applicable to an in-vehicle networking architecture, at least one first electronic equipment which is enabled to serve another electronic equipment with its function and at least one second electronic equipment which is enabled to make use of a function which another electronic equipment serves are connected to a common communication bus (network). An equipment managing apparatus connected to the common communication bus stores a function serving information representing the function that the first electronic equipment can serve and a making-use-of function information representing the function of which the second electronic equipment can make use. If both contents of the function serving information and the making-use-of function information are coincident with each other, the second electronic equipment makes use of the function of the first electronic equipment.

20 Claims, 40 Drawing Sheets

FIG.10

| | EQUIPMENT (ADDRESS) | COMMAND (ADDRESS, ARGUMENT [, ARGUMENT [, ARGUMENT ··· ]]) |
|---|---|---|
| FUNCTION SERVING INFORMATION | MONITOR WITH FRONT OCCUPANT SEAT POSITIONED DIAL TYPE SWITCH (0071) | RESOURCE (0071, monitor_wide, switch_dial) |
| | MONITOR WITH REAR OCCUPANT SEAT POSITIONED JOYSTICK-TYPE SWITCH (0073) | RESOURCE (0074, monitor_normal, switch_joystick) |
| MAKING-USE-OF FUNCTION INFORMATION | CAR NAVIGATION SYSTEM (0081) | SEARCH (0081, switch_dial, monitor_wide) |
| | MOBILE TELEPHONE (0083) | SEARCH (0083, switch_joystick, monitor_normal) |

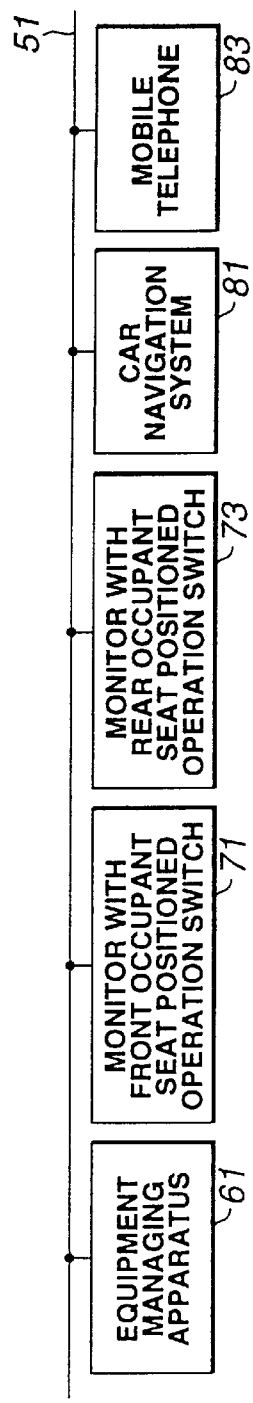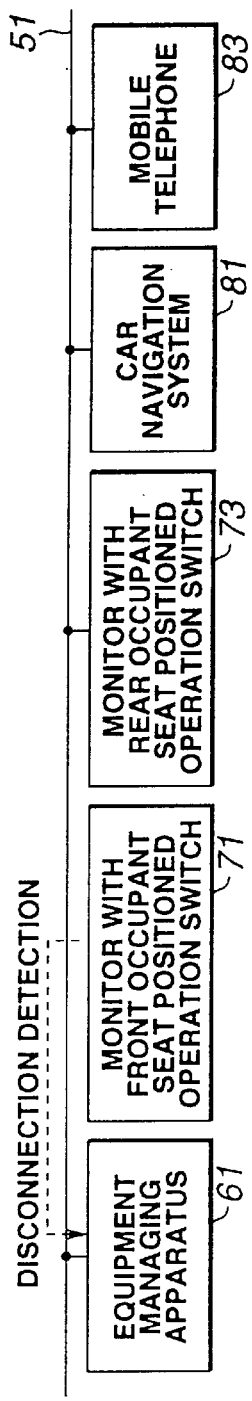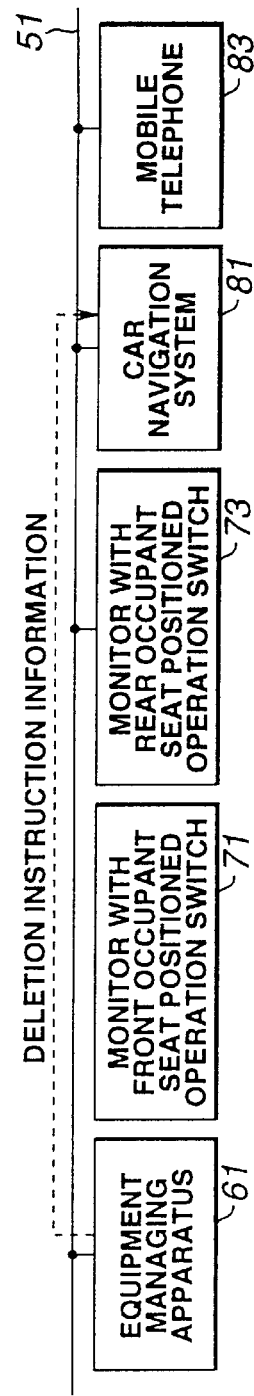

FIG.27

EXECUTION FUNCTION INFORMATION

| EXECUTION FUNCTION REGISTRATION | NUMBER OF REGISTRATION | NAME × ($\frac{\text{NUMBER OF}}{\text{REGISTRATION}}$) |
|---|---|---|

OPERATION FUNCTION INFORMATION

| OPERATION FUNCTION REGISTRATION | NAME |
|---|---|

FUNCTION SELECTION INFORMATION

| FUNCTION SELECTION | NAME |
|---|---|

OPERATION INFORMATION

| OPERATION | OPERATION KIND |
|---|---|

OPERATION KIND = MENU | RETURN | ENTER | UP | DOWN | LEFT | RIGHT

OPERATION MENU INFORMATION
(STANDARD MENU/REQUEST MENU)

| DISPLAY | STANDARD | TITLE | NUMBER OF ITEMS | DEFAULT | ITEM × ($\frac{\text{NUMBER}}{\text{OF ITEMS}}$) |
|---|---|---|---|---|---|

(TEXT / INTERRUPT TEXT)

| DISPLAY | INTERRUPT | TITLE | NUMBER OF ITEMS | ITEM × ($\frac{\text{NUMBER}}{\text{OF ITEMS}}$) |
|---|---|---|---|---|

DISPLAY RESPONSE INFORMATION

| DISPLAY RESPONSE | RESPONSE KIND 1 | NUMBER OF ITEMS |
|---|---|---|

RESPONSE KIND 1 = PUSH / ENTER / UP / DOWN

| DISPLAY RESPONSE | RESPONSE KIND 2 |
|---|---|

RESPONSE KIND 2 = RETURN

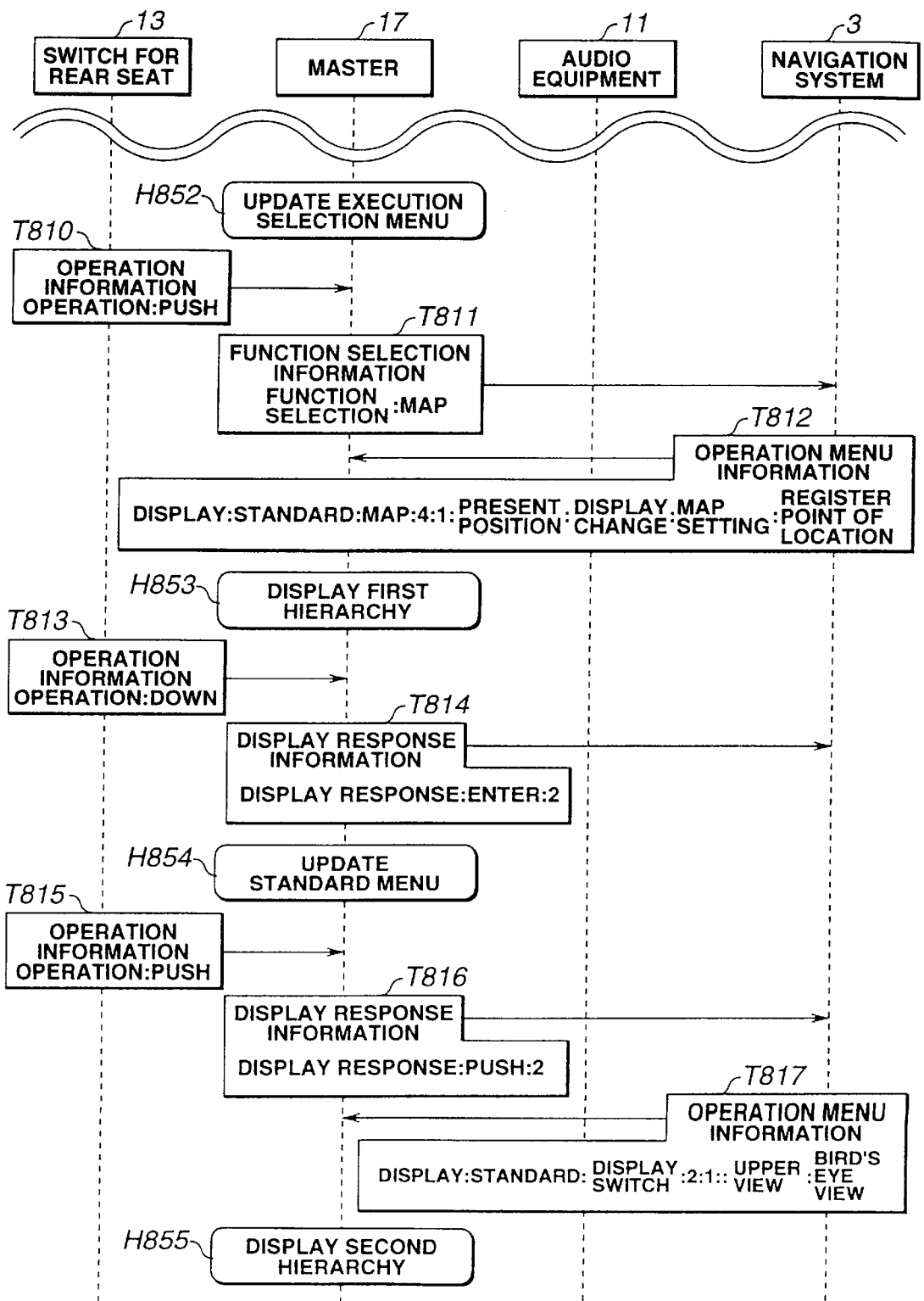

INFORMATION COMMUNICATION SYSTEM AND METHOD APPLICABLE TO IN-VEHICLE NETWORKING ARCHITECTURE

The contents of the Applications No. Heisei 9-149448, with a filing date of Jun. 6, 1997 in Japan, and No. Heisei 9-179990, with a filing date of Jul. 4, 1997 in Japan, are herein incorporated by reference.

BACKGROUND OF THE INVENTION a) Field of the Invention

The present invention relates to system and method for communicating an information via a common communication bus applicable to an in-vehicle communication network architecture.

b) Description of the Related Art

A Japanese Patent Application First Publication (not examined) No. Heisei 4-326898 published on Nov. 16, 1992 exemplifies a previously proposed in-vehicle data communication system.

The previously proposed in-vehicle information communication system disclosed in the above-identified Japanese Patent Application First Publication includes: a master unit which performs a display of various types of information using a display; a plurality of slave units, each of which an information used for the display purpose on the display of the master units is transferred therefrom to the master unit; and a common communication bus to which the master unit and the slave units are connected.

Even if another slave unit which is not previously projected by the master unit is connected to the common communication bus, the display of the master unit can display an information representing the function of the other slave unit.

SUMMARY OF THE INVENTION

However, in the previously proposed in-vehicle information communication system, in a case where such any one of the slave units as being operated utilizing a function of another slave unit is connected to the common communication bus prior to the connection of the other slave unit which provides the function for the one slave unit to the common communication bus, the one slave unit cannot make use of the function of the other slave unit.

In addition, if one of the slave units which has been connected to the common communication bus is disconnected from the common communication bus, such a countermeasure that how an operation of the whole in-vehicle information communication system should be arranged is not considered.

On the other hand, in the previously proposed in-vehicle communication system, the slave units are operated according to operations by an operator(s). And, the master unit determines the slave unit which is being operated and displays the information used for the display purpose on the display of the master unit. Hence, the slave units cannot be installed at locations inaccessible to the operator(s).

Furthermore, the master unit cannot select any one of the slave units and cannot operate simultaneously the slave units.

In addition, since the contents of operations which are not previously projected on the display information cannot be added, an improvement in operability cannot be expected.

It is therefore an object of the present invention to provide information communication system and method applicable to an in-vehicle networking architecture which can freely connect and disconnect such a slave unit or slave units as described above to and from a common communication bus and can contribute onto the improvement in operability.

The above-described object can be achieved by providing an information communication system, comprising: a function serving electronic equipment which is so arranged and constructed as to be enabled to serve another electronic equipment with at least one function that the function serving electronic equipment has; a making-use-of function electronic equipment which is so arranged and constructed as to be enabled to make use of at least one function that another electronic equipment has; a common communication bus to which the function serving electronic equipment and the making-use-of function are enabled to be connected; and an equipment managing apparatus which is enabled to be connected to the common communication bus and including a storage block for storing a function serving information representing the function which the function serving electronic equipment is enabled to serve and a making-use-of function information representing the function of which the making-use-of function electronic equipment is enabled to make use, and a comparing block for comparing the function serving information stored in the storage block with the making-use-of function information stored in the storage block so as to determine whether both contents of the function serving information and the making-use-of function information are coincident with each other, the equipment managing apparatus allowing the making-use-of function electronic equipment to make use of the function which the function serving electronic equipment is enabled to serve when determining that both contents of the function serving information and the making-use-of function information are coincident with each other.

The above-described object can also be achieved by providing an information communication system, comprising: a function serving electronic equipment which is so arranged and constructed as to be enabled to serve another electronic equipment with at least one function that the function serving electronic equipment has; a making-use-of function electronic equipment which is so arranged and constructed as to be enabled to make use of at least one function that another electronic equipment has; a common communication bus to which the function serving electronic equipment and the making-use-of function are enabled to be connected; and equipment managing apparatus which is enabled to be connected to the common communication bus and including storage means for storing a function serving information representing the function which the function serving electronic equipment is enabled to serve and a making-use-of function information representing the function of which the making-use-of function electronic equipment is enabled to make use, and comparing means for comparing the function serving information stored in the storage means with the making-use-of function information stored in the storage means so as to determine whether both contents of the function serving information and the making-use-of function information are coincident with each other, the equipment managing apparatus allowing the making-use-of function electronic equipment to make use of the function which the function serving electronic equipment is enabled to serve when determining that both contents of the function serving information and the making-use-of function information are coincident with each other.

The above-described object can also be achieved by providing an information communication method, comprising the steps of: connecting a function serving electronic equipment which is so arranged and constructed as to be enabled to serve another electronic equipment with at least one function that the function serving electronic equipment has to a common communication bus; connecting a making-use-of function electronic equipment which is so arranged and constructed as to be enabled to make use of at least one function that another electronic equipment has to the common communication bus; connecting an equipment managing apparatus to the common communication bus; storing a function serving information representing the function which the function serving electronic equipment is enabled to serve and a making-use-of function information representing the function of which the making-use-of function electronic equipment is enabled to make use into a storage block of the equipment managing apparatus; comparing the function serving information stored in the storage block with the making-use-of function information stored in the storage block so as to determine whether both contents of the function serving information and the making-use-of function information are coincident with each other; and allowing the making-use-of function electronic equipment to make use of the function which the function serving electronic equipment is enabled to serve when determining that both contents of the function serving information and the making-use-of function information are coincident with each other at the comparing step.

BRIEF DESCRIPTION OF THE DRAWINGS

FIG. 10 is a table representing a communication purpose information format in the information communication system in the second embodiment shown in FIG. 9A.

FIGS. 16A, 16B, and 16C are explanatory views for explaining information transmissions and receptions between each of the electronic managing apparatus and electronic pieces of equipment connected to the common communication bus in the case of the second preferred embodiment shown in FIG. 15 for explaining the series of operations when the monitor 71 is disconnected from the bus 51.

FIG. 27 is totally an explanatory view for explaining information formats of the information transferred between one of slave stations and a master station.

FIG. 34 is an explanatory view representing an operation sequence of the information communication system shown in FIG. 27 when a vehicular occupant selects a map function in a case of the selection of the execution function.

BEST MODE FOR CARRYING OUT THE INVENTION

Reference will hereinafter be made to the drawings in order to facilitate a better understanding of the present invention.

(First Embodiment)

Figure 1A:
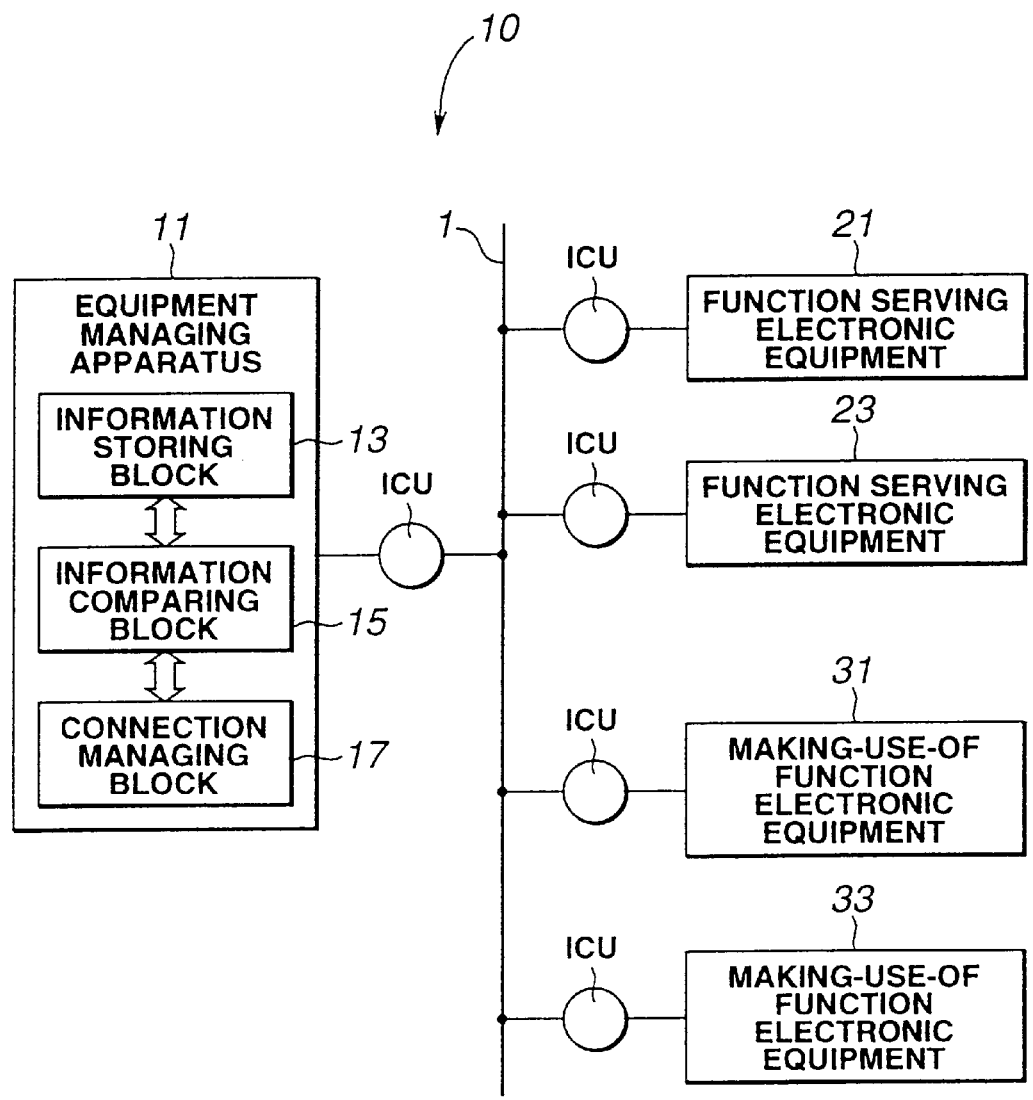
FIG. 1A and 1B are functional block diagrams of an information communication system applicable to an in-vehicle networking architecture in a first preferred embodiment according to the present invention.

FIG. 1A shows a first preferred embodiment of an information communication system applicable to an in-vehicle networking architecture according to the present invention.

In FIG. 1A, a first function serving electronic equipment 21 and a second function serving electronic equipment 23 are connected to a common communication bus 1. Each function serving electronic equipment 21 and 23 is an electronic equipment which can serve another electronic equipment with a function (or functions) thereof and is constituted by, for example, a monitor having an operation switch or a voice recognition device. Each making-use-of function electronic equipment 31 and 33 is an electronic equipment which can make use of the function or the functions of another electronic equipment and is constituted by, for example, a car navigation system, an audio equipment, a vehicular air conditioner, and a mobile telephone with a vehicular adapter.

Each making-use-of function electronic equipment 31 and 33 is interconnected to the common communication bus 1, thus a bus type network being formed together with each function serving electronic equipment 21 and 23.

In addition, an equipment managing apparatus 11 performs a management of the network having these pieces of electronic equipment 21, 23, 31, and 33 interconnected to the common communication bus 1. The equipment managing apparatus 11 includes an information storage block 13, an information comparing block 15, and connection managing block 17.

The information storing block 13 stores thereinto a serving function information representing functions with which the first and second function serving pieces of the electronic equipment 21 and 23 can serve and a making-use-of function information representing functions of the other pieces of electronic equipment of which each of the first and second making-use-of function pieces of the electronic equipment 31 and 33 can make use. The information storage block 13 is constituted by a RAM (Random Access Memory).

The information comparing block 15 compares the information stored in the information storage block 13.

The connection managing block 15 performs the management of connection situations of these pieces of the electronic equipment 21, 23, 31, and 33 connected onto the communication bus 1. The information comparing block 15 and the connection managing block 15 are constituted by, e.g., a microcomputer.

In addition, the equipment managing apparatus may be constituted by the microcomputer having the RAM.

Figure 1B:
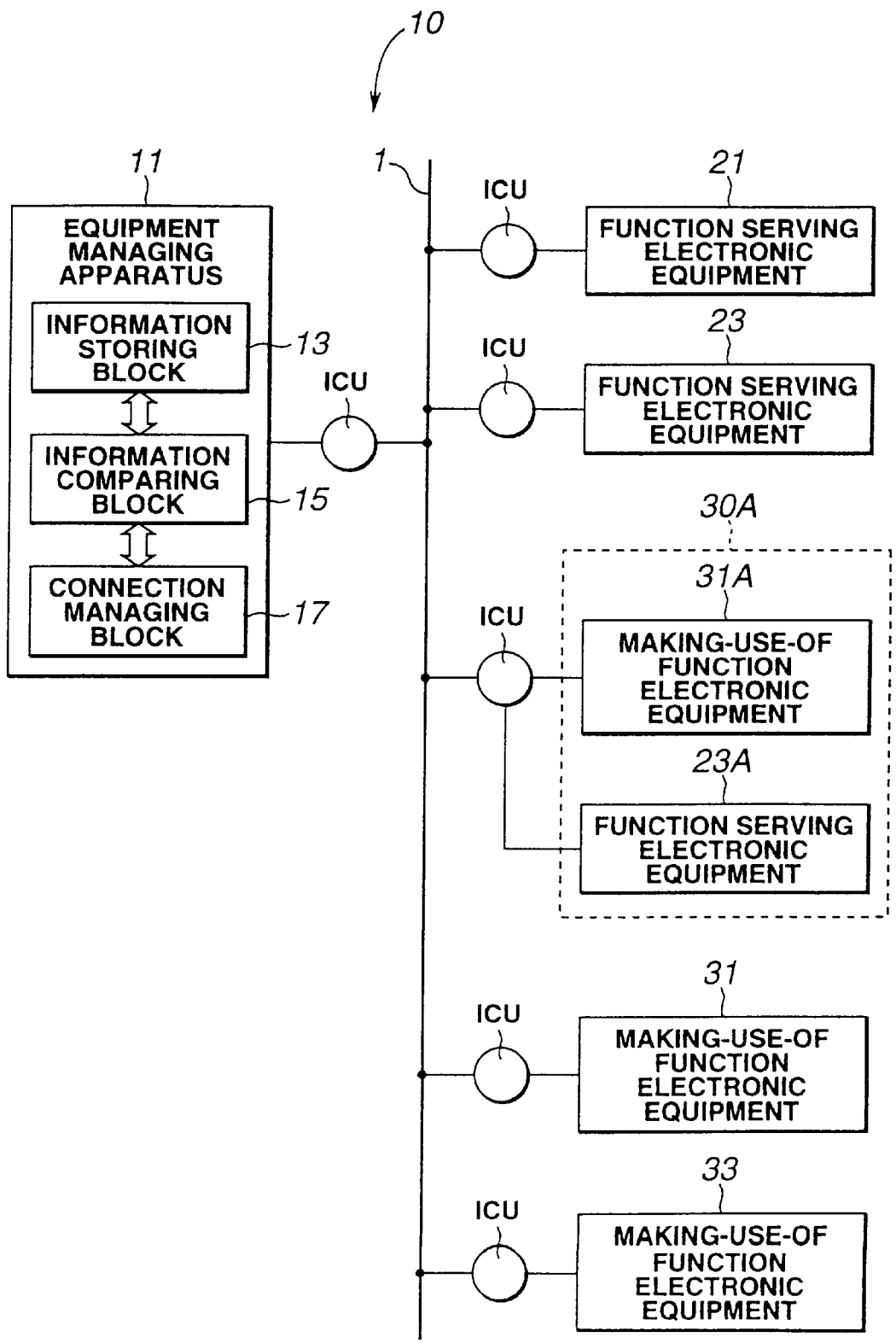

Furthermore, as shown in FIG. 1B, a third electronic equipment 30A mixing both functions of the function serving electronic equipment 31A and the making-use-of function electronic equipment 23A is connected to the common communication bus 1.

It is noted that a reference numeral 10 in FIGS. 1A and 1B denotes a whole in-vehicle information communication system and each equipment and managing apparatus has an information interface communication unit IC (ICU) connected to the common communication bus 1.

Next, an operation of the in-vehicle information communication system will be described below with reference to FIGS. 2 through 5.

Figure 2:
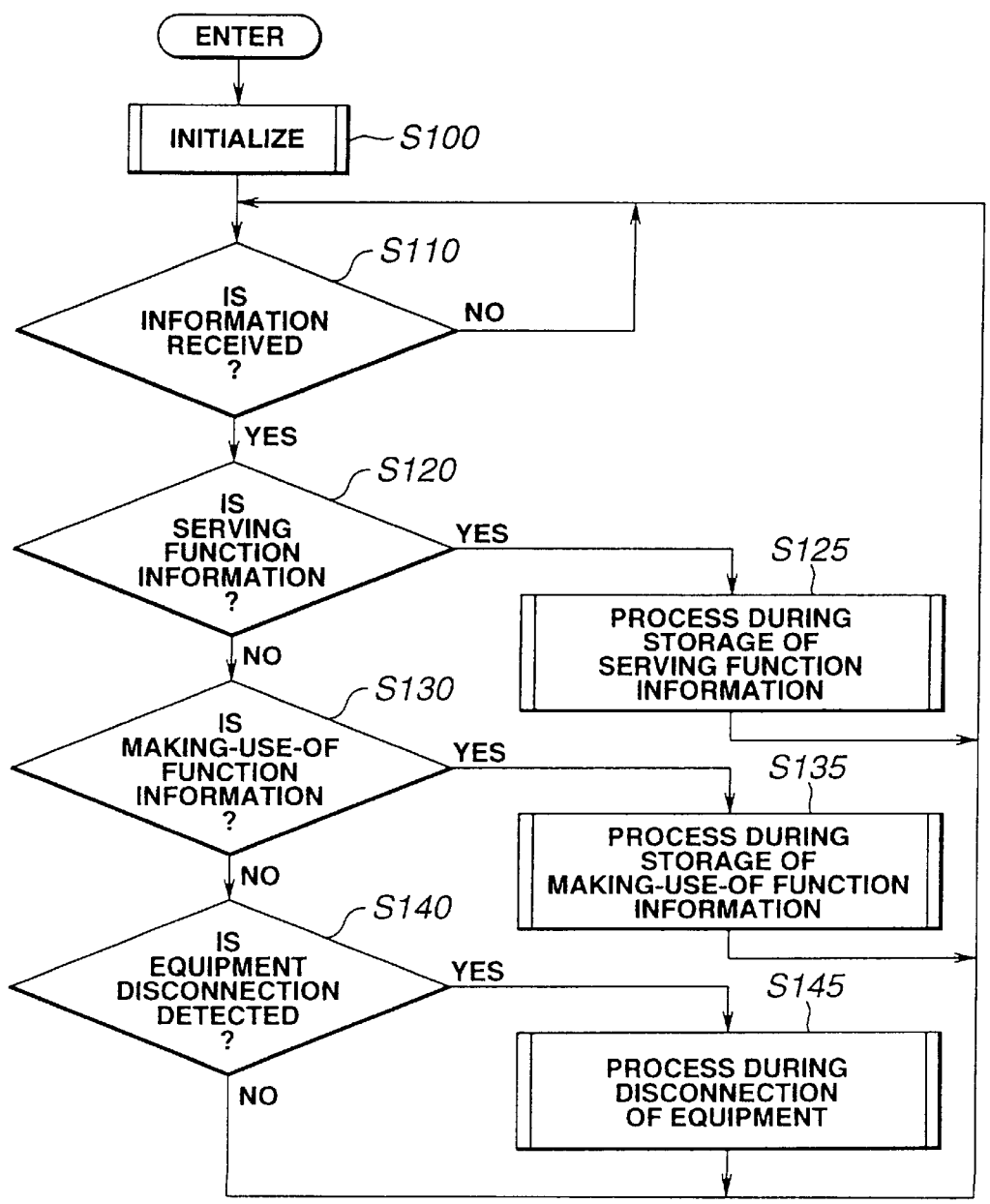
FIG. 2 is a general flowchart executed by an equipment managing apparatus shown in FIGS. 1A and 1B.

In FIG. 2, at a step S100, the equipment managing apparatus 11 initializes so as to wait for a receipt of an information to be transmitted from the information serving electronic equipment 21 or 23 (23A) or from the making-use-of function electronic equipment 31 or 33 (31A).

At a step S110, when the managing apparatus 11 has received the information from any one of the pieces of electronic equipment, the routine goes to a step S120.

At the step S120, the managing apparatus 11 determines whether the received information is the serving function information or not. If it is the serving function information (YES) at the step S120, the routine goes to a step S125. If it is not the making-use-of information (NO) at the step S120, the routine goes to a step S130.

Now, an operation of the storage of the serving function information by the managing apparatus at the step S125 will be described below.

Figure 3:
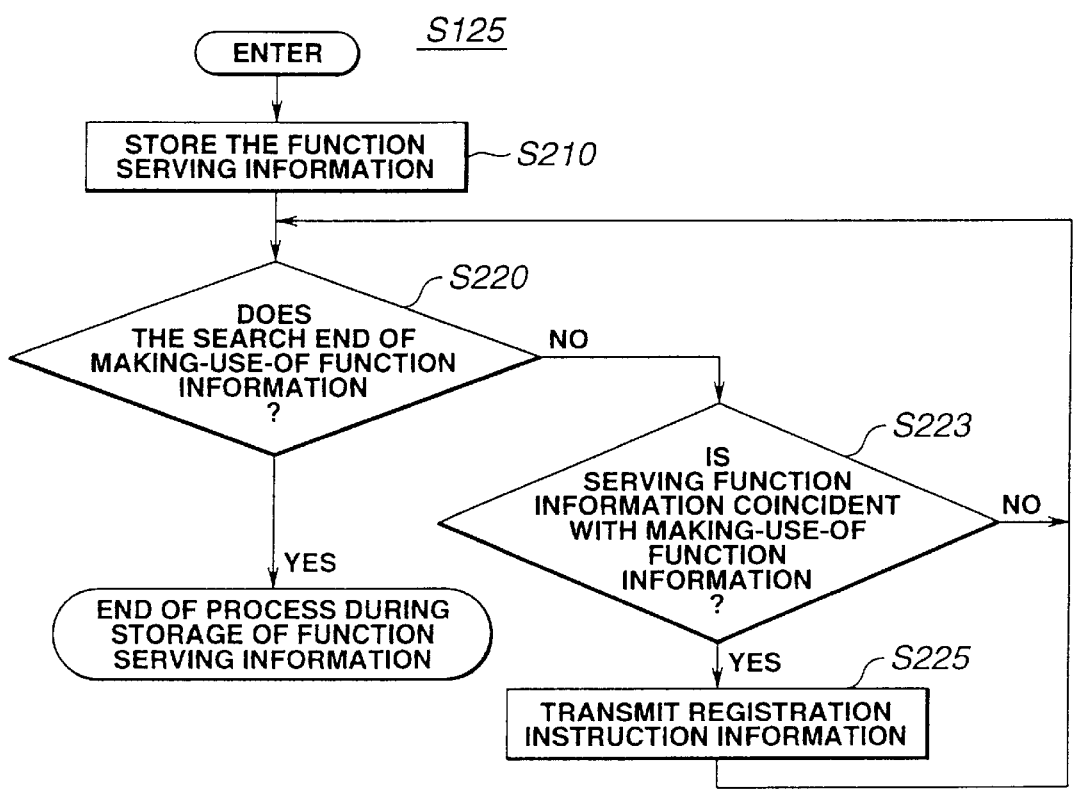
FIGS. 3, 4, and 5 are respectively detailed flowcharts executed by the equipment managing apparatus shown in FIGS. 1A and 1B.

When the equipment managing apparatus 11 recognizes that the received information from the common communication bus 1 is the function serving information at the step S120 (YES), the routine of the step S125 goes to the step S210 of FIG. 3 in which the received function serving information is stored in the information storing block 13 within the equipment managing apparatus 11.

At a step S220 of FIG. 3, the equipment managing apparatus 11 searches the information stored in the information storing block 13 for the making-use-of function information.

If the making-use-of function information is searched out at the step S220 (NO) at the step S220, the routine goes to a step S223. If the search of the making-use-of function information is ended at the step S220 (YES), the process during the storage of the function serving information of FIG. 3 is ended.

At the step S223, the content of the searched making-use-of function information is compared with that of the received function serving information.

If both contents of the searched making-use-of function information and received function serving information are coincident with each other at the step S223, the routine goes to a step S225.

If not coincident with each other (NO) at the step S223, the routine returns to the step S220.

At the step S225, the equipment managing apparatus 11 transmits a registration instruction information to one of the making-use-of function pieces of electronic equipment 31 or 33 (or 31A) which has transmitted the making-use-of function information thereto to register one of the function serving equipment 21 or 23 (or 23A) which has already transmitted the function serving information to the managing apparatus 11 into its making-use-of function source list.

Referring back to a step S130 of the flowchart shown in FIG. 2, the equipment managing apparatus 11 searches whether the received information is the making-use-of function information.

If the received information is determined to be the making-use-of function information (YES) at the step S130, the routine goes to a step S135.

If (NO) at the step S130, the routine goes to a step S140.

Figure 4:
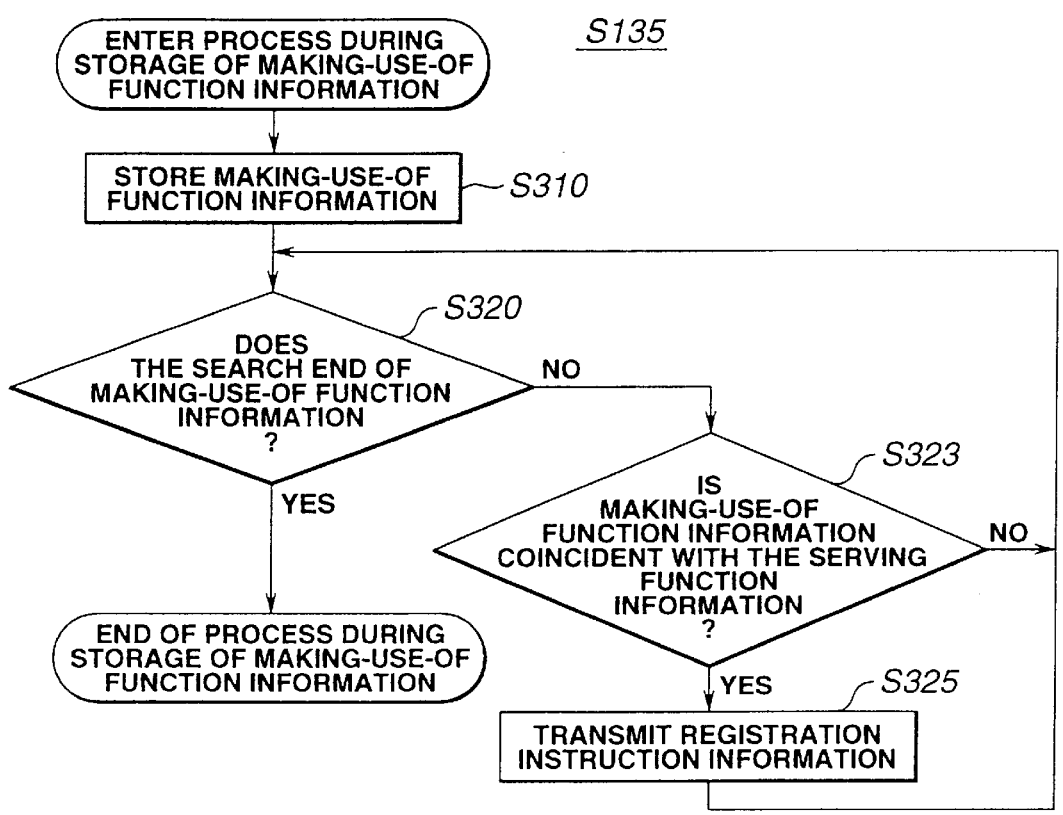

At the step S135, the process during the storage of the making-use-of function information is advanced as shown in FIG. 4.

FIG. 4 shows the detailed processing routine of the step S135.

That is to say, at a step S310, the equipment managing apparatus 11 stores the received making-use-of function information into the information storing block 13 within the equipment managing apparatus 11.

At a step S320, the equipment managing apparatus searches the information stored in the information storing block 13 for the function serving information.

If the function serving information is searched (NO) at the step S320, the routine goes to a step S323.

If the search for the function serving information is ended (YES) at the step S323, the routine of FIG. 4 (step S135) is ended.

At the step S323, the equipment managing apparatus 11 compares the content of the searched function serving information with that of the received making-use-of function information. If both contents of information are coincident with each other at the step S323 (YES), the routine goes to a step S325. If both contents of information are not coincident with each other (NO) at the step S323, the routine returns to repeat the step S320.

At the step S325, the equipment managing apparatus 11 transmits the registration instruction information to one of the connected making-use-of function pieces of electronic equipment 31 or 33 (or 31A) to register the one of the function serving pieces of electronic equipment 21 or 23 (or 21A) from which the corresponding function serving information is transmitted into the making-use-of function source list.

Referring back to a step S140 of the flowchart shown in FIG. 2, the equipment managing apparatus 11 detects whether any one electronic equipment is disconnected from the common communication bus 1.

If disconnected (YES) at the step S140, the routine goes to a step S145.

If NO (not disconnected) at the step S140, the routine returns to the step S110 for the managing apparatus 11 to wait for the subsequent receipt of the information described above.

Figure 5:
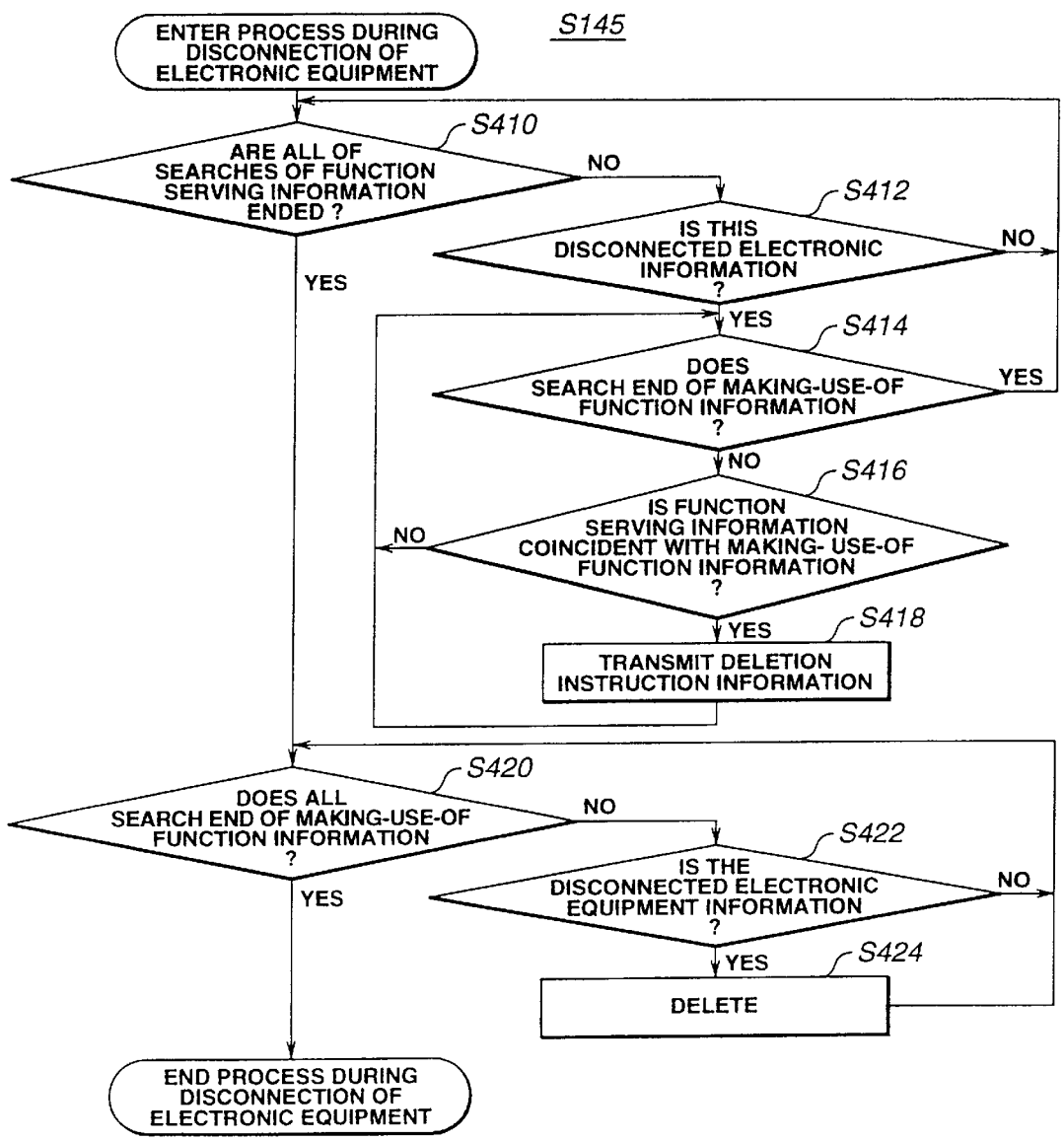

FIG. 5 shows the detailed routine at the step S145 of FIG. 2 to process the disconnection of any one of the pieces of electronic equipment.

That is to say, at a step S410, upon detection of the disconnection of any one electronic equipment from the bus 1 the connection managing block 17 searches the information stored in the information storing block 13 for the function serving information.

If all searches of the function serving information are not ended at the step S410 (NO), the routine goes to a step S412. If all of the searches for the function serving information are ended (YES) at the step S410, the routine goes to a step S420.

At the step S412, the comparing block in the equipment managing apparatus 11 determines whether the content of the searched function serving information is coincident with that of the information on the disconnected electronic equipment.

If both contents of the information are coincident with each other (YES) at the step S412, the routine goes to a step S414. If both contents of information are not coincident with each other (NO) at the step S412, the routine returns to the step S410.

At the step S414, the making-use-of function information is searched from among the information stored in the information storing block 13.

If (NO), namely, the search for the making-use-of function information is ended at the step S414, the routine goes to a step S416.

If YES, namely, the search for the making-use-of function information is ended at the step S414, the routine returns to the step S410.

At the step S416, the equipment managing apparatus 11 determines whether the content of the searched making-use-of function information is coincident with that of the function serving information of the disconnected one of the function information serving electronic equipment pieces 21 or 23 (21A).

If both contents of the information is coincident with each other at the step S416 (YES), the routine goes to a step S418.

If both contents of the information is not coincident with each other (NO) at the step S416, the routine returns to the step S414.

At the step S418, the managing apparatus 11 transmits a deletion instruction information to one of the making-use-of function pieces of electronic equipment 31 or 33 (31A) which has transmitted the making-use-of function information to delete the disconnected one of the function serving pieces of electronic equipment 21 or 23 from its making-use-of function source list.

On the other hand, at the step S420, the equipment managing apparatus 11 searches the information stored in the information storing block 13 for the making-use-of function information.

If all of searches for the making-use-of function information is not ended at the step S420 (NO), the routine goes to a step S422. If all of the searches for the making-use-of function information are ended (YES) at the step S420, the routine returns to the step S110 of FIG. 2.

At the step S422, the managing apparatus 11 determines whether the contents of the making-use-of function includes an address of one of the first and second pieces of electronic equipment 31 or 33 (or 33A) which is disconnected from the common communication bus 1.

If both contents and the address are coincident with each other at the step S422 (YES), the routine goes to a step S424.

If both contents and address are not coincident with each other (NO) at the step S422, the routine returns to the step S420.

At the step S424, the managing apparatus 11 deletes the information of the disconnected making-use-of function equipment stored in the information storing block 13.

Figure 6:
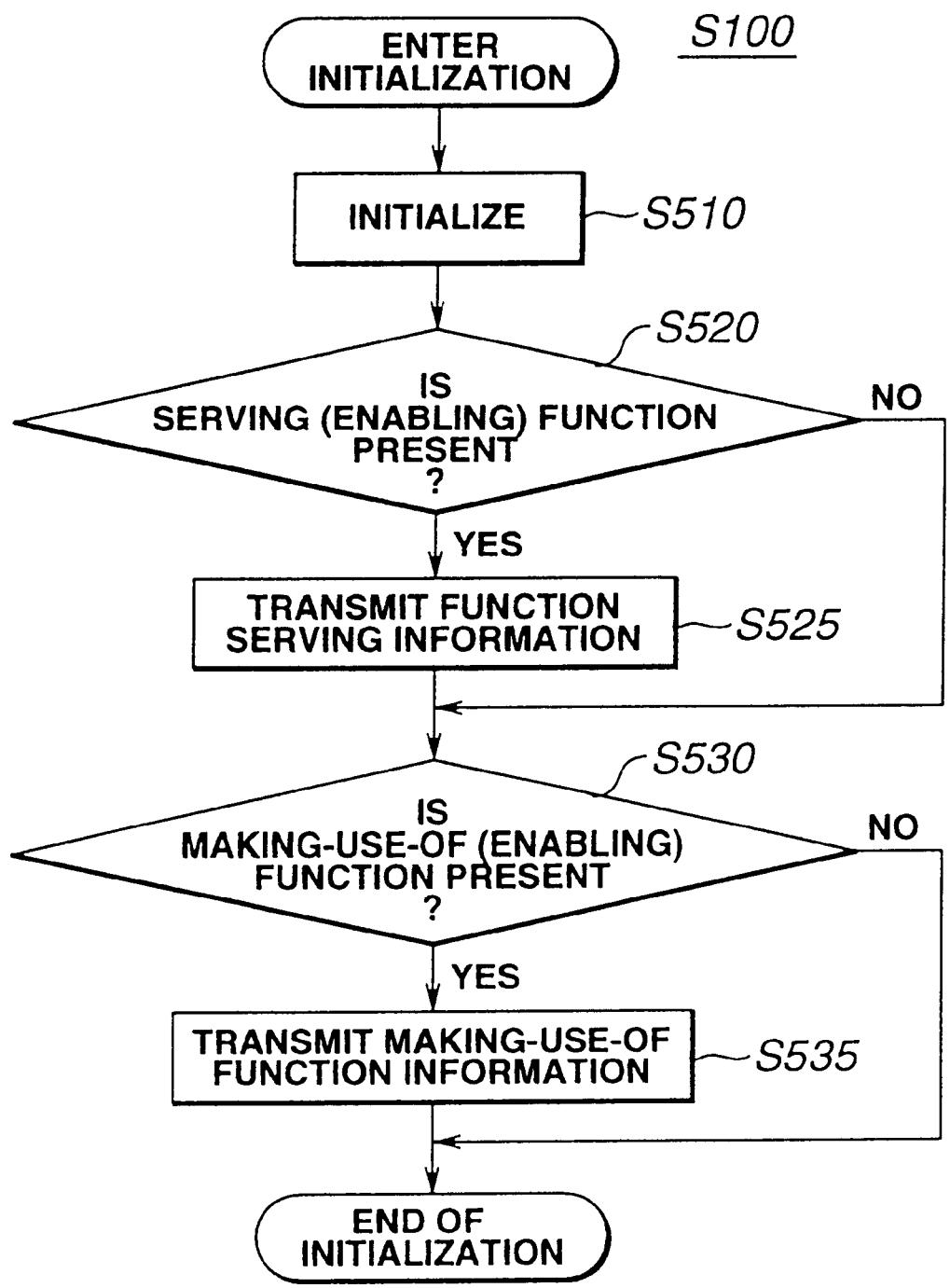
FIG. 6 is a detailed flowchart executed in an initialize processing by the equipment managing apparatus shown in FIGS. 1A and 1B.

Next, FIG. 6 shows an operational flowchart executed at the initialization of the step S100 by the equipment managing apparatus 11. It is noted that the flowchart shown in FIG. 6 is executed also by any one or each one of the pieces of electronic equipment 21, 23, 31, and 33 (and 31A and 33A).

In details, at a step S520, each one thereof searches whether the function serving information is present or absent in its equipment itself.

If the function serving information is present at the step S520 (YES), the routine goes to a step S525.

At the step S525, the corresponding equipment 21, 23 (or 21A) transmits its function serving information to the information storing block 13 of the managing apparatus 11 via the communication bus 1.

If no function serving information is absent at the step S520 (NO), the routine jumps to a step S530.

At the step S530, each one thereof determines whether the making-use-of function is present or not.

If no making-use-of function information is present (NO), the routine of FIG. 6 is ended.

If the making-use-of function information is present (YES) at the step S530, the routine goes to a step S535.

At the step S535, the corresponding electronic equipment 31, 33, or (31A) transmits the making-use-of function information to the information storing block 13 of the equipment managing apparatus 11 via the common communication bus 1.

Figure 7:
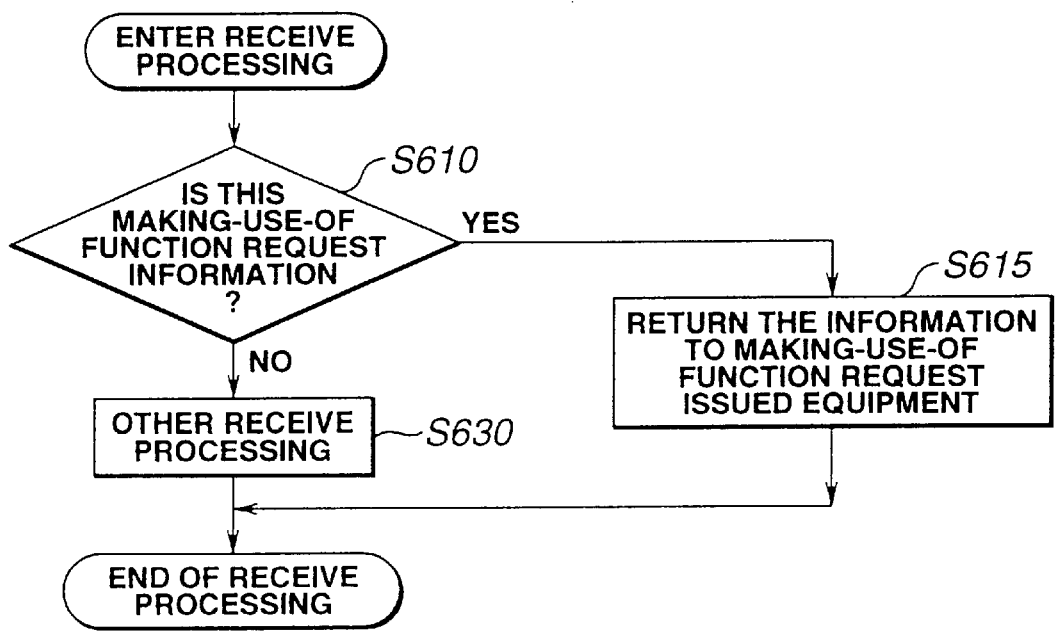
FIG. 7 is a detailed flowchart executed in a receive processing by a function serving electronic equipment shown in FIGS. 1A and 1B.

Next, FIG. 7 shows the flowchart to explain the receive process of each function serving electronic equipment 21, 23, (or 21A).

That is to say, at a step S610, the corresponding one of the function serving pieces of electronic equipment 21, 23, (or 21A) determines whether a making-use-of function request information has been received from one of the making-use-of function pieces of electronic equipment 31, 33, (or 31A).

If received (YES) at the step S610, the routine advances to a step S615.

At the step S615, the corresponding function serving electronic equipment 21, 23, (or 21A) replies the function or functions to be made use of to the corresponding making-use-of function request information issued equipment.

Figure 8:
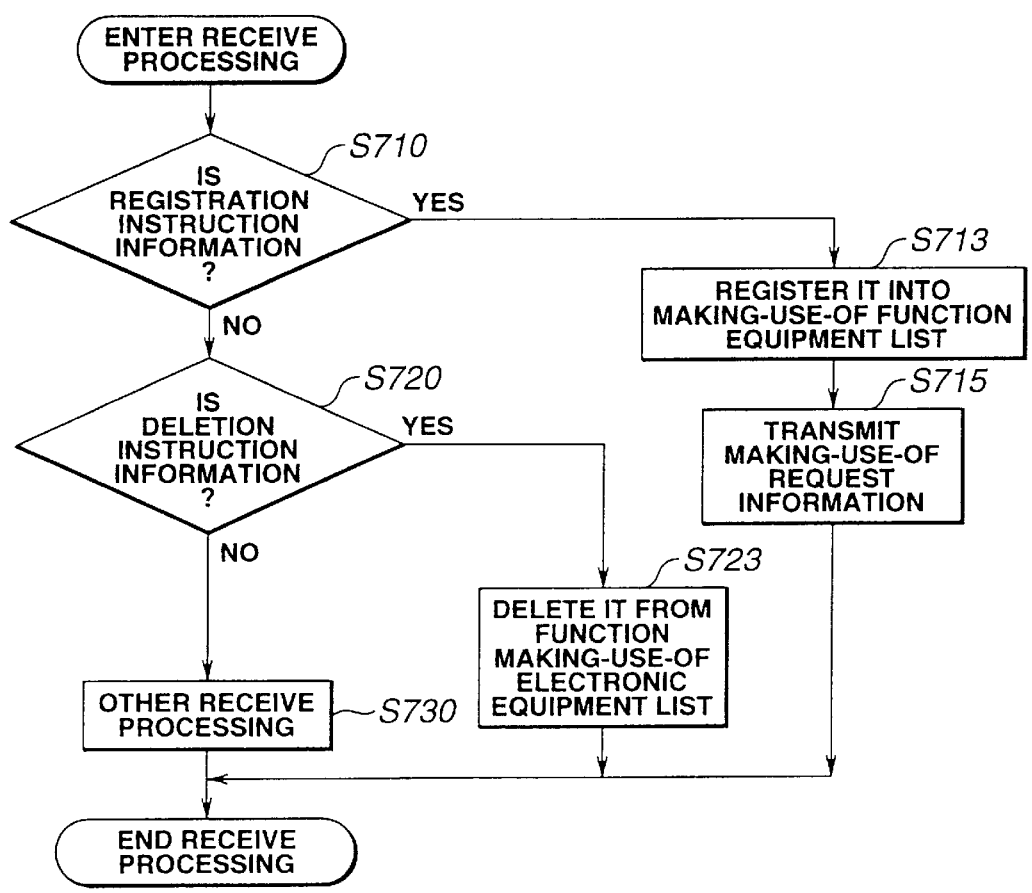
FIG. 8 is a detailed flowchart executed in a receive processing by a making-use-of function electronic equipment shown in FIGS. 1A and 1B.

Next, FIG. 8 shows the flowchart executed by each one of the making-use-of function pieces of electronic equipment 31, 33, (or 31A).

That is to say, at a step S710, each one of the making-use-of function pieces of electronic equipment 31, 33, (or 31A) determines whether the registration instruction information has been received from the managing apparatus 11.

If received (YES) at the step S710, the routine goes to a step S713.

If not received (NO) at the step S710, the routine goes to a step S720.

At the step S713, the corresponding making-use-of function electronic equipment 31, 33, (or 33A) which has received the register instruction information registers the corresponding one of the function serving pieces of electronic equipment 21, 23, (or 21A) into its making-use-of function source list.

At the step S715, each one of the function making-use-of function pieces of electronic equipment 31, 33, (or 33A) transmits the corresponding one of the making-use-of function request information representing a request of serving the function to the corresponding one of the function serving pieces of electronic equipment 21, 23, (or 23A) and makes use of the function (functions) via the common communication bus 1.

At the step S720, each one of the making-use-of function pieces of electronic equipment 31, 33, (or 31A) searches whether the deletion instruction information has been received from the equipment managing apparatus 11.

If not received (NO) at the step S720, the routine goes to a step S720 in which another receive processing is carried out.

If received (YES) at the step S720, the routine goes to a step S723, the corresponding one of the making-use-of function pieces of electronic equipment 31, 33, (or 31A) deletes the corresponding one of the function serving pieces of electronic equipment 21, 23, (or 23A) from its making-use-of function source list.

Consequently, the corresponding one of the making-use-of function pieces of electronic equipment 31, 33, or (31A) is operated without making use of the corresponding one of the function serving pieces of electronic equipment 21, 23, (or 23A).

As described above, in the first embodiment, the equipment managing apparatus 11 is connected to the common communication bus 1. When each of the function serving pieces of electronic equipment 21, 23, (or 21A) is connected to the common communication bus 1, the function serving information is stored in the information storing block 13 of the equipment managing apparatus 11.

When each of the making-use-of function pieces of electronic equipment 31, 33, (or 31A) is connected to the common communication bus 1, the making-use-of function information is stored in the information storing block 13.

Thereafter, when the equipment managing apparatus 11 detects that the electronic equipment has been connected to the common communication bus 1, the managing apparatus 11 determines whether the connected equipment is either such a function serving electronic equipment or such a making-use-of function electronic equipment as described above. If the managing apparatus 11 determines that the connected electronic equipment is the function serving electronic equipment 21, 23, (or 21A), the function serving information is stored in the information storing block 13.

Then, the managing apparatus 11 searches the information stored in the information storing block 13 for the making-use-of function information. If the managing apparatus 11 searches out the making-use-of function information, the corresponding function serving electronic equipment 21, 23, (or 21A) serves the corresponding making-use-of function electronic equipment 31, 33, (or 31A) with the function(s) that the corresponding function serving electronic equipment 21, 23, (or 21A) has.

On the other hand, if the connected electronic equipment is the corresponding making-use-of function electronic equipment, the making use-of function information is stored in the information storing block 13. Then, the managing apparatus 11 searches for the making-use-of function information from among the stored information in the information storing block 13.

If the function serving information is searched out from among the information stored in the information storing block 13, the corresponding making-use-of function electronic equipment 31, 33, (or 31A) makes use of the function of the corresponding one of the function serving pieces 21, 23, (or 23A) of electronic equipment.

When the equipment managing apparatus 11 detects that any piece of electronic equipment is disconnected from the common communication bus 1, the managing apparatus determines if the disconnected electronic equipment 21, 23, (or 23A) or the making-use-of function electronic equipment 21, 33, (or 31A).

If the disconnected electronic equipment is the function serving electronic equipment 21, 23, (or 23A), the managing apparatus 11 searches for the making-use-of function information from among the information stored in the information storing block 13. If the making-use-of information is searched, the corresponding making-use-of function electronic equipment 31, 33, (or 31A) suspends the making use of the disconnected function serving electronic equipment.

If the disconnected electronic equipment is the corresponding making-use-of function electronic equipment 31, 33, (or 31A). the managing apparatus 11 searches for the function serving a information from among the information stored in the information storing block 13.

If the function serving information is searched out, the corresponding function serving electronic equipment 21, 23, (or 23A) suspends the serving of the function that the corresponding electronic equipment 21, 23, (or 23A) has for the disconnected making-use-of function electronic equipment 31, 33, (or 31A).

Consequently, it is possible to make an effective use of the function that each electronic equipment has since the function of each function serving electronic equipment 21, 23, (or 21A) can be made use of via the common communication bus 1.

Furthermore, even if either the function serving electronic equipment 21, 23, (or 21A) or the making-use-of function electronic equipment 31, 33, (or 31A) is connected with the pieces of electronic equipment connected to the communication bus 1 operated, it is possible to make use of the function that the newly connected function serving electronic equipment 21, 23, (or 21A) has and for the newly connected making-use-of function electronic equipment 31, 33, (or 31A) to make use of the function of the function serving electronic equipment 21, 23, (or 21A) connected to the common communication bus 1. Thus, degrees of freedom when the electronic equipment is made use of and the electronic equipment architecture can be improved.

(Second embodiment)

Figure 9A:
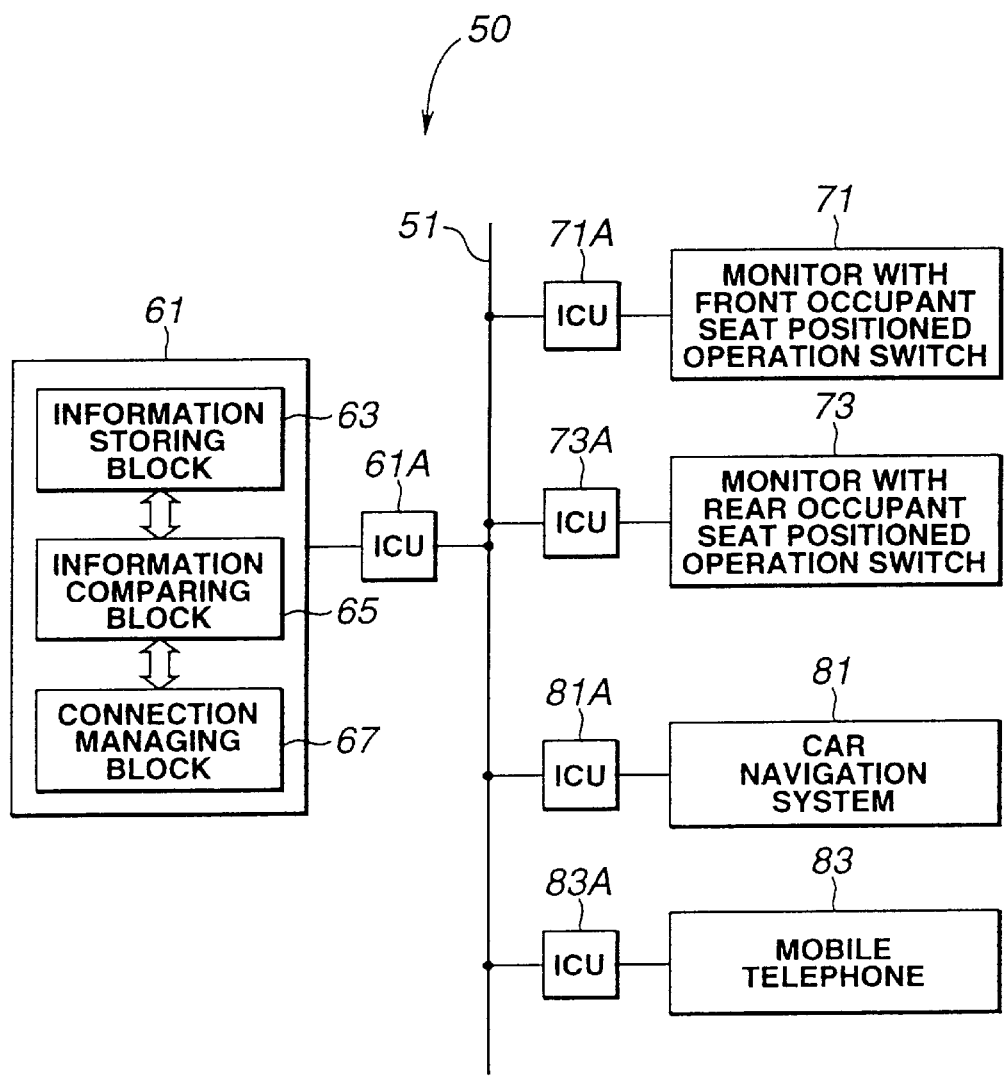
FIG. 9A is a functional block diagram of the information communication system applicable to the in-vehicle networking architecture in a second preferred embodiment according to the present invention.

FIG. 9A shows a system configuration of the information communication apparatus 50 applicable to the in-vehicle networking architecture in a second preferred embodiment according to the present invention.

In the second embodiment shown in FIG. 9A, a monitor 71 with a front occupant seat positioned operation switch includes: a dial type switch; and a monitor of a wide screen type and is so arranged and constructed as to be enabled to serve a joystick type switching function and a wide type monitor function to other pieces of equipment.

A monitor 73 with a rear seat occupant positioned switch includes: a joystick type switch and a monitor of a normal screen type and is so arranged and constructed as to be enabled to serve another electronic equipment with the joystick type switch function and a normal type monitor function.

A car navigation system 81 serves a vehicle occupant with a present position of the vehicle and a guide to a destination of the vehicle from a map information through a monitor.

A mobile telephone unit 83 (or called portable telephone) is provided with a vehicular adapter to perform a communication with another telephone wirelessly.

Each electronic equipment described above is interconnected to the common communication bus 51 to form the in-vehicle communication bus 51, thus the in-vehicle networking architecture being formed in the bus type.

In addition, the equipment managing apparatus 61 performs the management of each electronic equipment interconnected to the common communication bus 51.

The managing apparatus 61 includes the information storing block 63, the information comparing block 65, and the connection managing block 67.

The information storing block 63 stores the information serving information on each electronic equipment to be connected to the communication bus 51 and the making-use-of function information. The information storing block 63 includes, for example, RAM (Random Access Memory). The information comparing block 65 is to compare the function information of each electronic equipment and the connection managing block 67 is to manage the connection situation of each electronic equipment connected to the common communication bus 51.

The information comparing block 65 and the connection managing block 67 are, for example, constituted by a microcomputer. The equipment managing apparatus 61 may be constituted by a microcomputer having the RAM (refer to FIG. 9B).

Figure 9B:
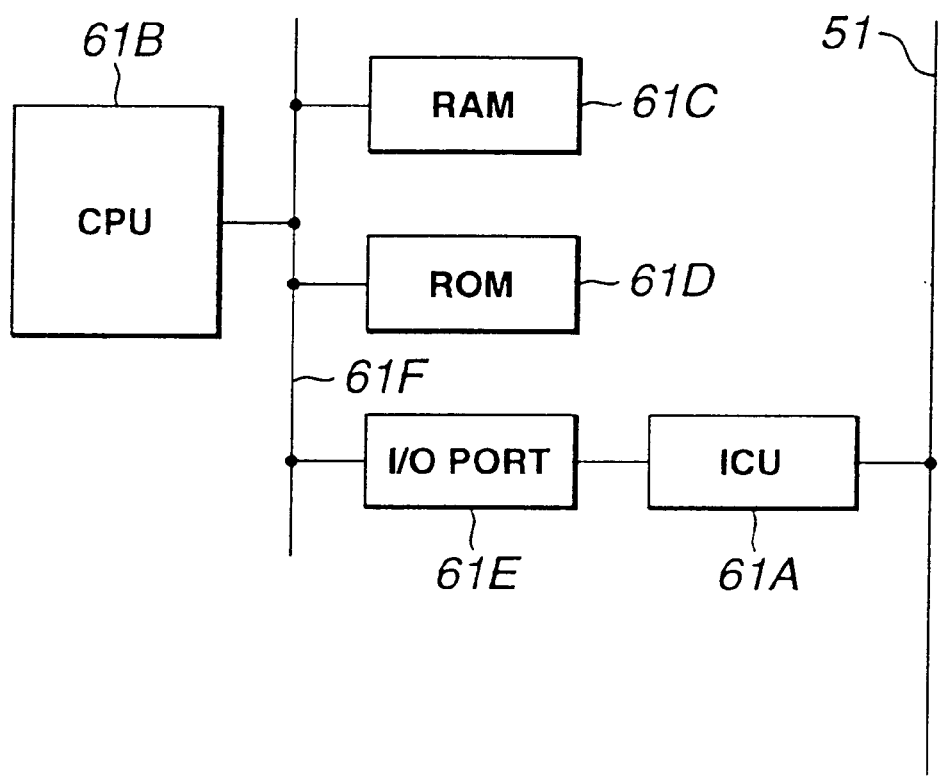
FIG. 9B is a specific circuit block diagram of the equipment managing apparatus in the second preferred embodiment shown in FIG. 9A.

That is to say, as shown in FIG. 9B, the microcomputer constituting the managing apparatus 61 has the RAM 61C, a ROM (Read Only Memory) 61D, a CPU (Central Processing Unit) 61B, I/O port 61E, and a common internal bus 61F. Each apparatus and electronic equipment is provided with the information communication interface IC (ICU) 61A, 71A, 73A, 81A, and 83A.

Next, an information format used in the second embodiment will be described in details with reference to FIG. 10.

FIG. 10 shows the information format on the information transmitted to the common communication bus 51.

As shown in FIG. 10, the information format includes: a command, an address allocated to the equipment itself, and a plurality or a single argument, the argument representing a function which is enabled to be served or representing a function which is enabled to be made use of. It is noted that actually when the information format described in FIG. 10 is transmitted via the common communication bus 51, an address of a transmitted station, viz., the managing apparatus 61, or equipment 71, 73, 81, or 83 is added before the command as an address.

An information communication message which the monitor 71 with the front occupant seat positioned operation switch transmits via its ICU 71A is described as follows:

resource (address, monitor_wide, switch_dial)

This communication message indicates that the monitor 71 having the address of 0071 can serve another or other pieces of electronic equipment with its wide type monitor function and its dial type switch function.

The information communication message which the monitor 73 with the rear occupant seat positioned switch is to transmit is described as follows:

resource(address, monitor_normal, switch_joystick)

The communication message indicates that the monitor 73 having the address of 0073 can provide the normal type monitor function and the joystick type switch function for another or other pieces of electronic equipment.

The information communication message which the car navigation system 81 is to transmit is described as follows:

search (address, switch_dial, monitor_wide)

The information communication message indicates that the car navigation system 81 having the address of 0081 can make use of the functions of the dial type switch and of the wide type monitor that another electronic equipment has.

The communication message which the mobile telephone 83 is to transmit is described as follows:

search (address, switch_10 key, switch_joystick, monitor_normal)

This communication message which the mobile telephone 83 transmits indicates that the mobile telephone 83 having the address of 0081 can make use of the functions of the 10 key type switch, the joystick type switch, and/or normal type monitor that another (or others) electronic equipment has (or have).

An operation of the in-vehicle information communication system shown in FIGS. 9A and 9B will be described with reference to FIGS. 2 to 8 used in the first embodiment and FIGS. 11 to 16C.

FIGS. 2 to 5 show the flowcharts executed by the electronic managing apparatus 61 in the second embodiment.

In FIG. 2, at the step S100, the electronic managing apparatus 61 initializes and, at the step S110, waits for receiving the information to be transmitted from any one of each electronic equipment 71, 73, 81, and 83.

If the managing apparatus has received the information from the connected one of the electronic equipment described above at the step S110, the routine goes to the step S120 in which the managing apparatus 61 determines whether the received information is the function serving information according to the content of the command in the received communication message.

If the content of command in the received communication message is (resource), viz., the function serving information transmitted from either the monitor 71 with the front occupant seat positioned switch or the monitor 73 with the rear occupant seat operation switch, the routine goes to the step S125 in which the processing operation in the case of the storage of the received function serving information shown in FIG. 3 is executed.

If not the function serving information at the step S120 (NO), the routine goes to the step S130.

The processing operation in the case of the storage of the received function serving information will be described with reference to FIG. 3.

At the step S210, the received function serving information is stored in the information storage block 63 within the equipment managing apparatus 61.

At the step S220, the managing apparatus 11 searches for the making-use-of function information whose content of the command in the corresponding communication message is (search) from among the information stored in the information storing block 63.

If the search for the making-use-of function information is ended (at the step S220), the routine of FIG. 3 is ended.

If the making-use-of function information is searched out (NO at the step S220), the routine goes to the step S223.

At the step S223, the searched making-use-of function information is compared with the received function serving information.

If the arguments of both of the information described above during the comparison at the step S223 are coincident with each other, the routine goes to the step S225.

If not coincident with each other at the step S223 (NO), the routine returns to the step S220.

At the step S225, the managing apparatus 61 transmits the registration instruction information to the electronic equipment 81 or 83 which has transmitted the corresponding making-use-of function information to the managing apparatus 61 to register the connected one of the monitor 71 or the monitor 73 into its making-use-of function source list.

Referring back to FIG. 2, at the step S130, the managing apparatus 61 determines whether the received information is, in turn, the making-use-of function information according to the content of the command in the received communication message.

If the content of this command indicates (search), viz., the received information in the making-use-of function information (YES) at the step S130, the routine goes to the step S135 in which the managing apparatus 61 carries out the processing operation shown in FIG. 4 in the case of the storage in the making-use-of function information.

On the other hand, if not the making-use-of function information (NO) at the step S130, the routine goes to the step S140.

The processing operation in the case of storage of the making-use-of function information will be described with reference to the flowchart of FIG. 4.

At the step S310, the managing apparatus 61 stores the received making-use-of function information into the information storing block 63 within the equipment managing apparatus 61.

At the step S320, the managing apparatus 61 searches for the function serving information of the content of the command (resource) form among the information stored in the information storing block 63.

If the function serving information is searched out at the step S320 (NO), the routine goes to the step S323.

If all of the searches for the function serving information are ended at the step S320 (YES), the routine of FIG. 4 is ended.

At the step S323, the managing apparatus 61 compares the searched function serving information with the received making-use-of function information.

If both contents of the arguments in the respectively corresponding information communication messages are coincident with each other (YES), the routine goes to the step S325.

If not coincident with each other at the step S323 (NO), the routine returns to the step S320.

At the step S325, the managing apparatus 61 transmits the registration instruction information to the electronic equipment 81 or 83 which has transmitted the making-use-of-function information to register the connected one of the monitor 71 or 73 into its function-making-use of source list.

Referring back to the flowchart of FIG. 2, at the step S140, the managing apparatus 61 detects that any electronic equipment is disconnected (YES), the routine goes to the step S145 in which the managing apparatus 61 carries out the processing operation shown in FIG. 5 in the case of the disconnection of the electronic equipment from the common communication bus 51.

FIG. 5 shows the flowchart to explain the processing operation in the case of disconnection of some connected electronic equipment from the common communication bus 51.

At the step S410, when the connection managing block 67 of the managing apparatus 61 detects the disconnection of the electronic equipment from the bus 51, the managing apparatus 61 searches for the function serving information whose communication message includes the command of (resource) from among the information stored in the information storing block 63.

If the function serving function information is searched out (NO at the step S410), the routine goes to the step S412.

On the other hand, if all of the searches for the function serving information are ended (YES), the routine goes to the step S420.

At the step S412, the managing apparatus 61 determines whether both contents of the searched function serving information and the disconnected equipment information are coincident with each other.

If both contents are coincident with each other at the step S412 (YES), the routine goes to the step S414.

If both contents are not coincident with each other at the step S414 (NO), the routine returns to the step S410.

At the step S414, the managing apparatus 61 searches for the making-use-of function information from among the information stored in the information storing block 63.

If the making-use-of function information is searched out (NO), the routine goes to the step S416.

On the other hand, if all of the searches for the making-use-of function information are ended (YES at the step S414), the routine returns to the step S410.

At the step S416, the managing apparatus 61 compares both contents of the searched making-use-of function information and the disconnected function serving information.

If both arguments in both contents of information are coincident with each other, the routine goes to the step S418.

At the step S418, the managing apparatus 612 transmits the deletion instruction information to the electronic equipment, i.e., either the navigation system 81 or the mobile telephone 83 that the making-use-of function information has transmitted to delete the disconnected electronic equipment of the monitor 71 or 73 from its making-use-of function source list.

At the step S420, the managing apparatus 61 searches for the making-use-of function information whose content of the command is (search) from among the information stored in the information storing block 63.

If the making-use-of function information is searched out (NO), the routine goes to the step S422.

If all of the searches for the making-use-of function information are ended (YES) at the step S420, the routine returns to the step S110 of FIG. 2.

At the step S422, the managing apparatus 61 determines whether both of the addresses of the making-use-of function information and of the disconnected equipment are coincident with each other.

At the step S422, the managing apparatus 61 determines that both addresses of information are coincident with each other, the routine goes to the step S424.

If not coincident with each other at the step S422 (NO), the routine returns to the step S420.

At the step S424, the managing apparatus 61 deletes the stored making-use-of function information of the disconnected function making-use-of equipment, viz., the navigation system 81 or the mobile telephone 83.

Next, with reference to FIG. 6, the initialization processing of the monitor 71 with the front occupant seat switch, the monitor 73 with the rear seat occupant seat switch, the navigation system 81, and the mobile telephone 83 will be described.

At the step S510, the initialization is performed by each of the monitor 71 with the front occupant seat positioned switch, the monitor 73 with the rear occupant seat positioned operation switch, the navigation system 81, and the mobile telephone 83.

At the step S520, the managing apparatus 61 determines whether the function serving information is present.

If the function serving information is present (monitor 71 with the front occupant positioned operation switch and the monitor 73 with the rear occupant positioned operation switch), the routine goes to the step S525.

If the function serving information is absent (NO), the routine goes to the step S530.

If the making-use-of function is absent (NO), the routine goes to the step S535 in which the making-use-of function information is transmitted.

It is noted that the address of the managing apparatus 61 is 0061.

At the step S530, the managing apparatus 61 determines whether the making-use-of function information is present.

If the making-use-of function information is present (navigation system 81 and the mobile telephone 83), the routine goes to the step S535.

If no making-use-of function information is present (NO) at the step S530, the routine of FIG. 6 is ended.

If no making-use-of function information is present (NO) at the step S530, the routine of FIG. 6 is ended.

The receipt processing operation of the monitor 71 with the front occupant seat positioned operation switch and the monitor 73 with the rear occupant seat positioned operation switch will be described with reference to the flowchart of FIG. 7.

At the step S610, the monitor 71 or 73 determines whether the making-use-of function request information has been received from the other equipment.

If received (YES) at the step S610, the routine goes to the step S615.

If not received (NO) at the step S610, the routine goes to the step S630 in which the other receive processing operation is carried out.

At the step S615, either of the monitors 71 or 73 returns the function serving information to the making-use-of function request issued equipment, viz., the corresponding one of the navigation system 81 or the mobile telephone 83.

Next, the receive processing operation of either one of the navigation system 81 and the mobile telephone 83 will be described with reference to the flowchart shown in FIG. 8.

At the step S710, the navigation system 81 or the mobile telephone 83 determines whether the corresponding one of either the navigation system 81 or the mobile telephone 83 has received the registration instruction information from the equipment managing apparatus 61.

If received (YES) at the step S710, the routine goes to the step S713.

At the step S713, the corresponding one of the navigation system 81 and the mobile telephone 83 registers the equipment instructed using the registration instruction information into its making-use-of function source list together with the registration instructed equipment address (monitor 71 or 73) and its function(s).

Then, the routine goes to the step S715 in which the corresponding one of the navigation system 81 and the mobile telephone 83 transmits the making-use-of function request information to the other electronic equipment such as the monitor 71 or 73 having the address registered into the function making-use-of function source list and makes use of its function via the common communication bus 51.

After the step S715, the routine of FIG. 8 is ended.

At the step S720, the corresponding one of the navigation system 81 and the mobile telephone 83 determines whether the deletion instruction information has been received from the equipment managing apparatus 61.

If received (YES) at the step S720, the routine goes to the step S723.

If not received (NO) at the step S720, the routine goes to the step S730.

At the step S723, the corresponding one of the navigation system 81 and the mobile telephone 83 deletes the equipment viz., monitor 71 or 73 instructed to delete it from the making-use-of function source list according to the deletion instruction information and is operated without making use of the function that the delete instructed equipment has.

As described above, in the second embodiment, the equipment managing apparatus 61 manages the pieces of electronic equipment connected to the common communication bus 51.

When either one or both of the monitor 71 with the front occupant seat positioned switch or/and the monitor 73 with the rear occupant seat positioned switch are connected to the common communication bus 51, the managing apparatus 61 stores the function serving information indicating one or both monitors 71 and 73 can provide the function or functions for another or other pieces of electronic equipment.

In addition, when the navigation system 81 and the mobile telephone 83 are connected to the common communication bus 51, the managing apparatus 61 stores the making-use-of function information into the information storing block 63.

Thereafter, when the equipment managing apparatus 61 detects that some electronic equipment has been connected to the communication bus 51, the managing apparatus 61 determines whether the connected electronic equipment is the equipment whose function can be served or the equipment which can make use of the function of another electronic equipment according to its content of the command.

If the connected electronic equipment is the function serving enabling electronic equipment (which corresponds to either the monitor 71 with the front occupant seat positioned switch or the monitor 73 with the rear occupant seat positioned switch), the managing apparatus 61 stores the corresponding function serving information into the information storing block 63 and searches for the information on the electronic equipment which can make use of that function (which corresponds to either one or each of the navigation system 81 or the mobile telephone 83).

If this information is searched out, the corresponding one or two of the monitors 71 and 73 serves the corresponding one or two of the navigation system 81 and the mobile telephone 83 with the function that has informed to the managing apparatus 61.

On the other hand, if the connected electronic equipment is the equipment which can make use of the function with which another equipment can serve (navigation system 81 or the mobile telephone 83), the information of the making-use-of function is stored in the information storing block 63 and the information on the function serving (serve enabling) equipment (monitor 71 with the front occupant seat positioned switch and monitor 73 with the rear occupant seat positioned switch) is searched from the information storing block 63.

If this information is searched out, the corresponding one or two of the monitor 71 with the front occupant seat operation switch and the monitor 73 with the rear occupant seat operation switch suspends the provision of the function that the corresponding one or two of the function that the corresponding one or two of the monitors 71 and 73 for the corresponding one or two of the navigation system 81 and the mobile telephone 83.

Consequently, since the navigation system 81 and the mobile telephone 83 can make use of the function or functions of the monitor 71 with the front occupant seat positioned switch or the monitor 73 with the rear occupant seat positioned switch via the common communication bus 51, it is possible to make the effective use of the function or functions that the respective pieces of electronic equipment have, as described in the case of the first embodiment.

Furthermore, in a case where, with the electronic equipment or apparatus in operation connected to the common communication bus 51, any one or more of the monitor 71 with the front occupant seat positioned switch, the monitor 73 with the rear occupant seat positioned switch, the car navigation system 81 or the mobile telephone 83 are newly connected to the common communication bus 51, the function or functions that the newly connected one or two of the monitors 71 and/or 73 has or have can be made use of by the already connected one or two of the navigation system 81 and/or the mobile telephone 83 can make use of the function or functions that the already connected one or two of the monitor 71 with the front seat occupant positioned switch and/or the monitor 73 with the rear seat occupant seat positioned switch. The degrees of freedom at the time of making use of the pieces of electronic equipment and at the time of networking of equipment architecture can be increased.

Figure 11:
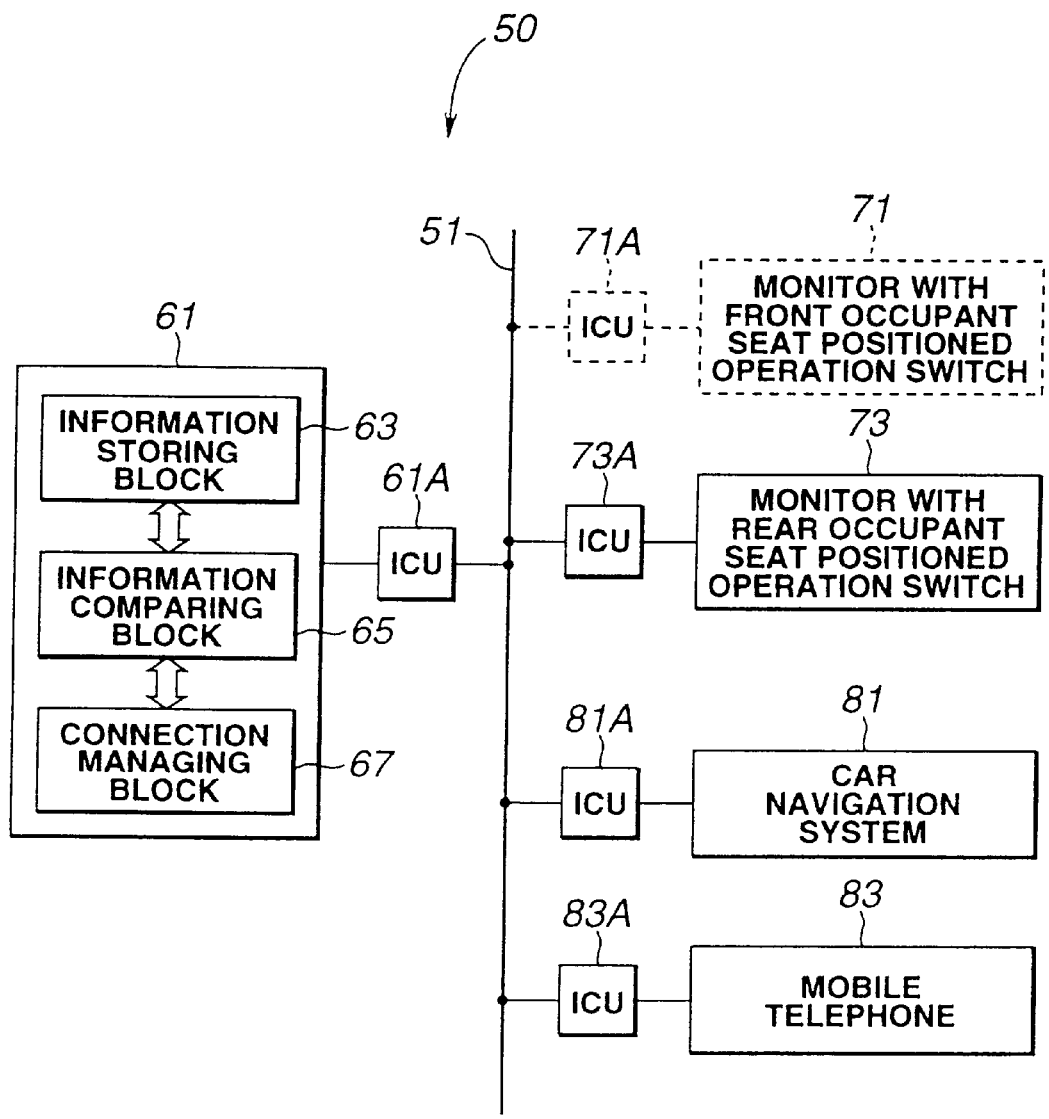
FIG. 11 is a functional block diagram of the information communication system applicable to the in-vehicle networking architecture in the second preferred embodiment according to the present invention in a case when a monitor 71 is newly connected to a common communication bus 51.

FIG. 11 shows a system configuration of the in-vehicle information communication system in the second preferred embodiment according to the present invention in the case when the monitor 71 as the function serving equipment is newly connected to the communication bus 51.

In FIG. 11, suppose that three pieces of electronic equipment, viz., the monitor 73 with the rear occupant seat positioned switch, the navigation system 81, and mobile telephone are interconnected via the common communication bus 51 to form the networking in the bus type.

Next, an operation in the case of the in-vehicle communication system shown in FIG. 11 will be described with reference to FIGS. 12A through 12D.

Figures 12A, 12B, 12C, 12D:
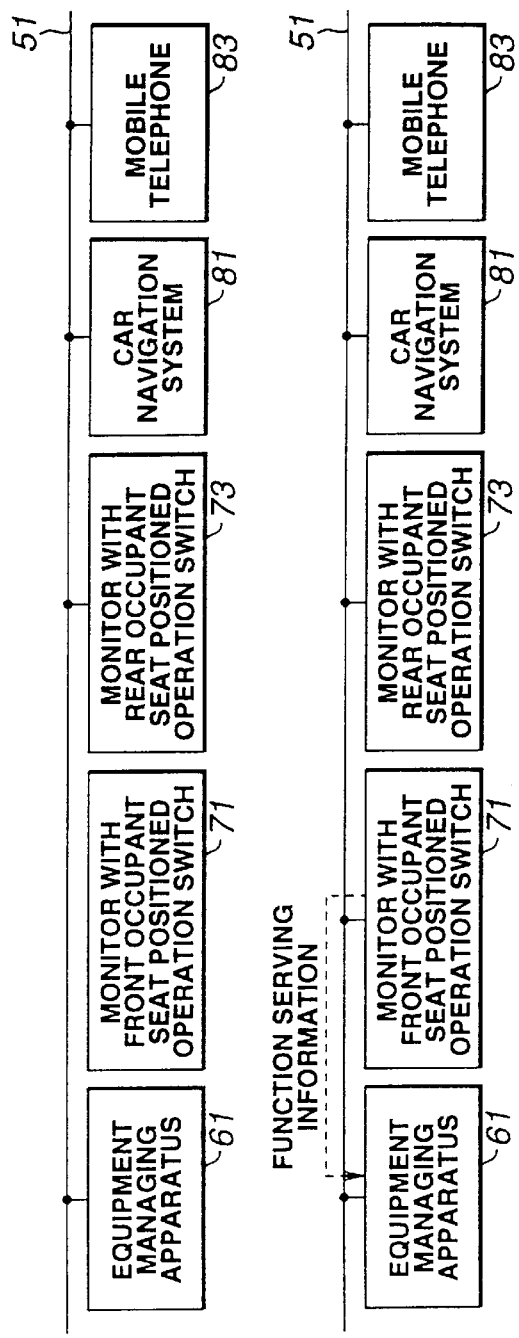
FIGS. 12A, 12B, 12C, and 12D are explanatory views for explaining information transmissions and receptions between each of the electronic managing apparatus and electronic pieces of equipment connected to the common communication bus for explaining a series of operations when the monitor 71 is newly connected to the bus 51 as shown in FIG. 11.

In FIG. 12A, the equipment managing apparatus 61 is initialized and, thereafter, waits for the receipt of the information transmitted from each electronic equipment.

When each of the monitor 73 with rear occupant seat positioned operation switch, the navigation system 81, and the mobile telephone 83 is connected and the managing apparatus 61 receives the information from any one of the pieces of electronic equipment connected to the common communication bus 51.

If the content of the command in the received information is identified as (resource), viz., it is the function serving information transmitted from the monitor 73 with the rear occupant seat positioned switch, the received function serving information is stored in the information serving block 63 within the equipment managing apparatus 61. The managing apparatus 61 searches for the making-use-of function information from among the information stored in the information storing block 63.

When the making-use-of information is searched out, the searched making-use-of function information and the received function serving information are compared with each other.

If the arguments of the respective pieces of information are coincident with each other, the managing apparatus 51 transmits the registration instruction information to one of the connected pieces of electronic equipment which has transmitted the making-use-of the function information to register the connected monitor 73 with the rear occupant seat positioned operation switch into its making-use-of function source list.

On the other hand, if the content of the command in the received information is (search), viz., it is the making-use-of function information transmitted from the navigation system 81 and/or the mobile telephone 83, the received making-use-of function information is stored in the information storing block 63 within the equipment managing apparatus 61. Then, the managing apparatus 61 searches for the function serving information from among the information stored in the information storing block 63.

If the function serving information is searched out, the searched function serving information and the received making-use-of the function information are compared with each other.

If the arguments of the respective pieces of the information are coincident with each other, the managing apparatus 61 transmits the registration instruction information to one of the connected pieces of electronic equipment which has transmitted the making-use-of function information to register the connected monitor 73 with the rear occupant seat positioned switch into its making-use-of function source list.

On the other hand, if the content of the command in the received information is (search), viz., it is the making-use-of function information transmitted from the navigation system 81 and/or the mobile telephone 83, the received making-use-of function information is stored in the information storing block 63 within the equipment managing apparatus 61. Then, the managing apparatus searches for the function serving information from among the information stored in the information storing block 63.

If the function serving information is searched out, the searched function serving information and the received making-use-of the function information are compared with each other.

If the arguments thereof are coincident with each other, the managing apparatus 61 transmits the registration instruction information to the navigation system 81 to register the one of the connected pieces of electronic equipment which has transmitted the function serving information to register the one of the pieces of electronic equipment into its function making-use-of the function source list.

Hence, either or each of the navigation system 81 and the mobile telephone 83 can make use of the switch function that the monitor 73 with the rear occupant seat positioned switch.

In FIG. 12B, when the managing apparatus 61 receives the information communication message of (resource (address, monitor_wide, switch_dial) from the newly connected monitor 71 with the front occupant seat positioned switch, the managing apparatus 61 determines whether the received information communication format corresponds to the function serving information from the content of command in the communication message of the information. In this case, since the content of command is (resource), the received information is the function serving information and carries out the processing operation and carries out the processing operation during the storage of the function serving information.

The received function serving information is stored in the information storing block 63 within the equipment managing apparatus 61 and the managing apparatus searches for the making-use-of function information from among the information stored in the information storing block 63.

Then, the managing apparatus 61 searches for the stored making-use-of function information {search (address, switch_dial, monitor_wide)} of the navigation system 81 and compares the searched making-use-of function information and the received function serving information.

When two arguments of both of the information are coincident with each other, as shown in FIG. 12C, the managing apparatus 61 transmits the registration instruction information to the navigation system 81 to register the monitor 71 with the front occupant seat positioned switch into its making-use-of function source list.

Next, the initialization processing of each of the monitor 71 with the front occupant seat positioned switch, the monitor 73 with the rear occupant seat positioned switch, the navigation system 81, and the mobile telephone 83 will be described below.

First, each electronic equipment including the managing apparatus 61 is initialized.

Each electronic equipment determines whether each electronic equipment itself has the function serving information according to the content of the command.

If each electronic equipment has the function serving information (each electronic equipment, in this case, corresponds to the monitor 71 with the front occupant seat positioned switch and to the monitor 73 with the rear occupant seat positioned switch), the corresponding function serving information is transmitted to the equipment managing apparatus 61 via the common communication bus 51.

If no function serving information is provided, each electronic equipment determines whether the making-use-of function information is present or not in each electronic equipment itself.

If the making-use-of function information is present, each of the navigation system 81 and the mobile telephone 83 transmits the making-use-of function information to the equipment managing apparatus 61 via the common communication bus 51.

Next, the receive processing operation of the monitor 71 with the front occupant seat positioned switch will be described below.

In the case where the monitor 71 with the front occupant seat positioned switch receives the making-use-of function request information from the navigation system 81 and the mobile telephone 83 into the function serving source list and provides the navigation system 81 and the mobile telephone 83 with the joystick type switch function via the common communication bus 51.

Next, the receive processing of each of the car navigation system 81 and the mobile telephone 83 will be described below.

In the case where the registration instruction information is received from the managing apparatus 61, each of the navigation system 81 and mobile telephone 83 registers the monitor 71 into the making-use-of function source list.

As shown in FIG. 12D, the navigation system 81 transmits the making-use-of function request information which requests the serving of the dial type switch function and the wide type monitor function to the monitor 71 with the front occupant seat switch and makes use of the dial type switch function and the wide type monitor function via the common communication bus 51.

As described above, in the third embodiment, the equipment managing apparatus 61 connects the common communication bus 51, stores the function serving information into the information storing block 63 when the monitor 71 with the front occupant seat positioned switch and the monitor 73 with the rear occupant seat switch are connected to the common communication bus 51 and stores the making-use-of function information into the common communication bus 51 when the navigation system 81 and the mobile telephone 83 are connected to the common communication bus 51.

Thereafter, when the equipment managing apparatus 61 detects that a certain electronic equipment has newly connected to the common communication bus 51, the managing apparatus 61 determines whether the connected electronic equipment is the electronic equipment (the monitor 71 with the front occupant set positioned switch) which can serve another (or other) electronic equipment with the function(s) which can make use of the function (or functions) that another (or other) equipment has.

If the connected electronic equipment is the equipment which can serve the other equipment with its function(s), the equipment managing apparatus 61 stores its function serving information into the information storing block 63 and searches for the information on the equipment which can make use of the function of the connected electronic equipment (navigation system 81 and the mobile telephone 83) from among the information stored in the information storing block 63.

If the information is searched out, the monitors 71 with the front occupant seat positioned switch can serve the navigation system 81 with the functions thereof.

Consequently, even if, with the connected monitor 73 with the rear occupant seat positioned switch, the navigation system 81 and the mobile telephone 83 operated, the monitor 71 with the front seat positioned switch is newly connected to the common communication bus 51, the dial type switch function and wide monitor function of the newly connected monitor 71 with the front occupant seat positioned switch can be made use of by the navigation system 81.

Figure 13:
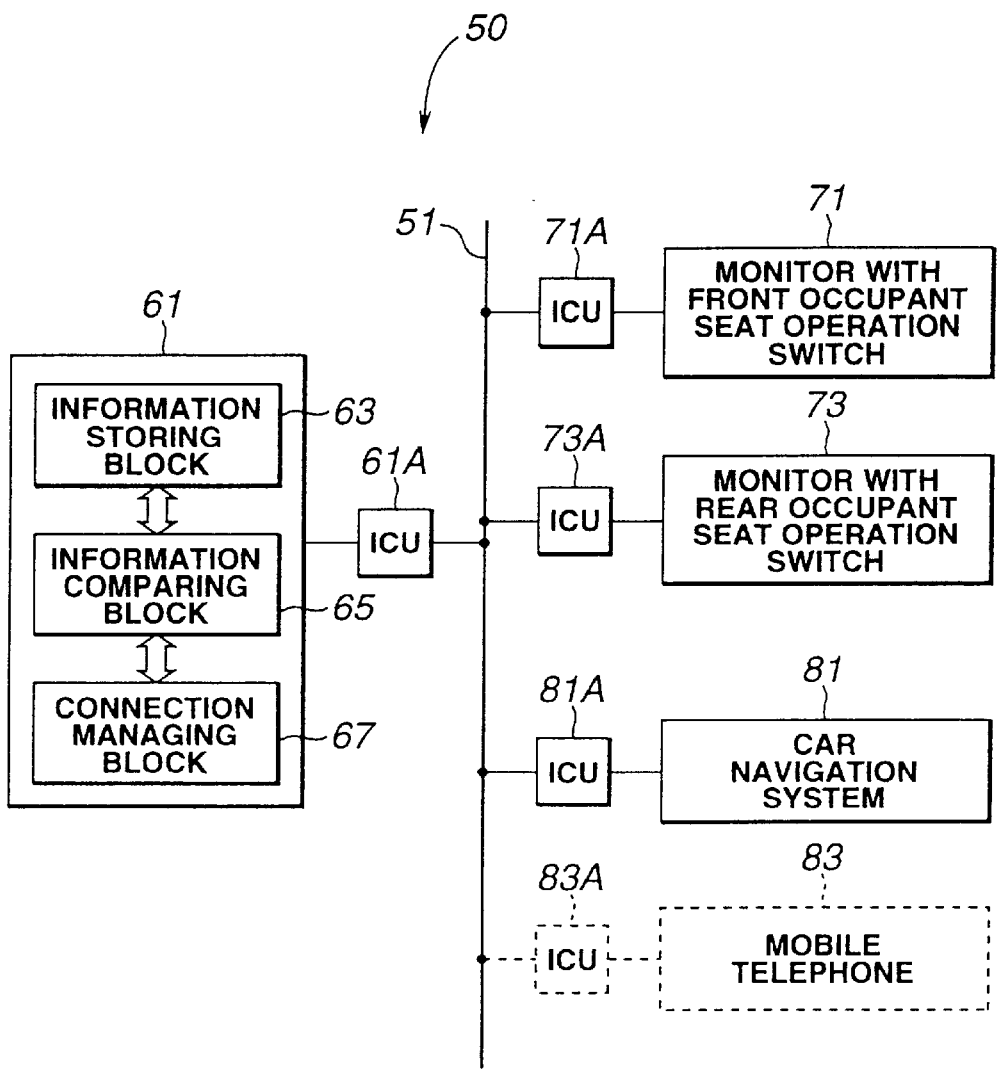
FIG. 13 is a functional block diagram of the information communication system applicable to the in-vehicle networking architecture in the second preferred embodiment according to the present invention in a case when a mobile telephone 83 is newly connected to the bus 51.

FIG. 13 shows a system configuration of the in-vehicle information communicating system 50 in the second preferred embodiment according to the present invention in a case when the mobile telephone 83 is newly connected to the communication bus 51.

In FIG. 13, the monitor 71 with the front occupant seat positioned switch, the monitor 73 with the rear occupant seat positioned switch, and the navigation system 81 are interconnected to the common communication bus 51 to form the bus type networking architecture and the mobile telephone 83 is newly connected to the communication bus 51.

Next, an operation of the second embodiment when the mobile telephone 83 is newly connected to the common communication bus 51 of the information communication system 50 will be described below with reference to FIGS. 14A through 14D.

FIGS. 14A through 14D show explanatory views of the information communication system 50 in the case shown in FIG. 13.

Figure 14A:
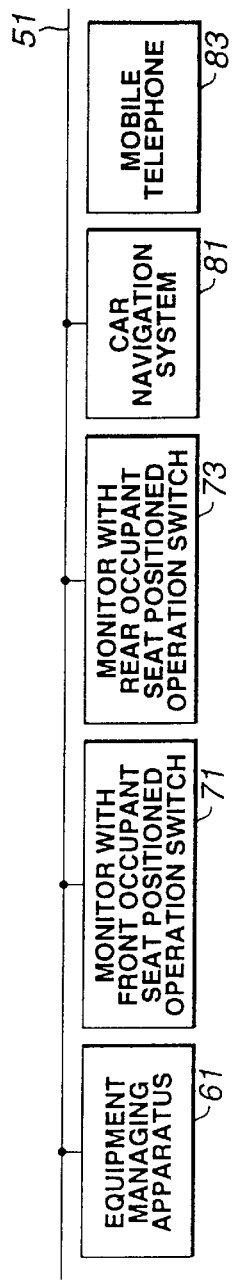
FIGS. 14A, 14B, 14C, and 14D are explanatory views for explaining information transmissions and receptions between each of the electronic managing apparatus and electronic pieces of equipment connected to the common communication bus 51 in the case of the second embodiment shown in FIG. 13 for explaining the series of operations when the mobile telephone 83 is newly connected to the bus 51.

In FIG. 14A, the equipment managing apparatus 61 is initialized and waits for the information to be transmitted from each electronic equipment.

When each of the monitor 71 with the front occupant seat positioned switch and the monitor 73 with the rear occupant seat positioned switch are connected to the common communication bus 51 and the equipment managing apparatus 61 receives the information from each of the connected pieces of electronic equipment, the managing apparatus 61 determines whether the received information is the function serving information or not according to the content of command in the information communication message.

If the content of the command described above is (resource), viz., the received information is two pieces of information transmitted from the monitor 71 with the front occupant seat positioned switch and the monitor 73 with the rear occupant seat positioned switch, the managing apparatus 61 stores the received pieces of information of the function serving information from the information storing block 63 and searches for the making-use-of function information from among the information stored in the information storing block 63. If the making-use-of function information and each of the received pieces of information are compared with each other and both arguments of the information are coincident with each other, the managing apparatus 61 transmits the registration instruction information to each electric equipment which has transmitted the making-use-of function information to register the monitor 73 with the rear occupant seat positioned switch into its making-use-of function source list.

On the other hand, if the content of the command in the received information communication message is (search), viz., the received making-use-of function information, the received making-use-of function information is stored in the information storing block 63 and the function serving information is searched from among the information stored in the information storing block 63.

If the function serving information is searched out, both of the searched function serving information and the received making-use-of function information are compared with each other. If both arguments of the information is coincident with each other, the managing apparatus 61 from the address therein transmits the registration instruction information to the navigation system 81 to register the equipment which has transmitted the function serving information and whose making-use-of function has been searched into the making-use-of function source list.

Hence, the navigation system 81 can become making use of the joystick type switch function and the normal type monitor function that the monitor 73 of the rear occupant seat positioned switch has.

Figure 14B:
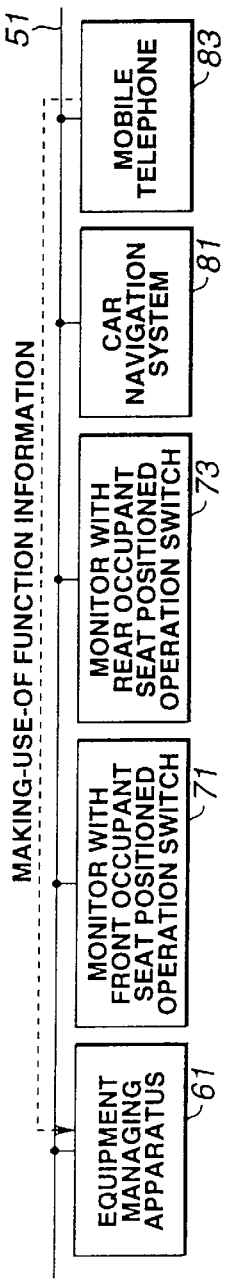

In FIG. 14B, when, with the mobile telephone 83 newly connected to the bus 51, the equipment managing apparatus 61 receives the information such as {search (address, switch_10 key, switch_joystick, monitor_normal)}, the managing apparatus 61 determines whether the received information is the making-use-of function or not according to the content of command in the received information communication message.

Since, in this case, the content of command in the received communication message is (search), the managing apparatus 61 stores the received making-use-of function information into the information storing block 63.

The managing apparatus 61 searches for the function serving information from among the information stored in the information storing block 63.

In this case, the managing apparatus 61 searches for the information {resource (address, monitor_normal, switch_joystick)} on the monitor 73 with the rear occupant seat positioned switch from among the information stored in the information storing block 63.

Figure 14C:
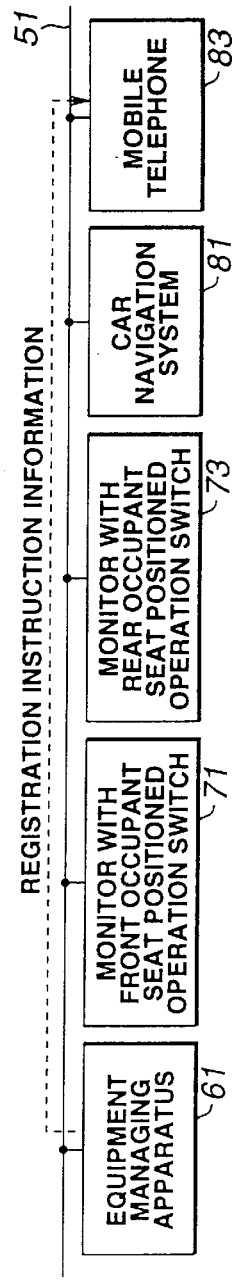

If both arguments in the compared information communication messages are coincident with each other, as shown in FIG. 14C, the managing apparatus 61 transmits the registration information to the mobile telephone 83 which can make use of the functions register the monitor 73 with the rear occupant seat positioned switch into its making-use-of function source list.

Next, the initialize processing of each of the monitor 71 with the front occupant seat positioned switch, the monitor 73 with the rear occupant seat positioned switch, the navigation system 81, and the mobile telephone 83 will be described below.

First, each electronic equipment is initialized. Then, each electronic equipment determines whether the function serving information is present in itself according to the content of command in its information.

If the function serving information is present (in this case, the monitor 71 with the front occupant seat positioned switch and the monitor 73 with the rear occupant seat positioned switch), each of both monitors 71 and 73 transmits its function serving information to the equipment managing apparatus 61 via the common communication bus 51.

On the other hand, if the making-use-of function information is present in itself (in this case, the car navigation system 81 and the mobile telephone 83), each of the managing apparatus 81 and the mobile telephone 83 transmits the making-use-of function information to the equipment managing apparatus 61 via the common communication bus 51.

Next, the receive processing operation of the mobile telephone 83 will be described below.

When the registration instruction information is received from the equipment managing apparatus 61, the monitor 73 with the rear occupant seat positioned switch which is instructed according to the registration instruction information is registered into its making-use-of function source list of the mobile telephone 83.

Figure 14D:
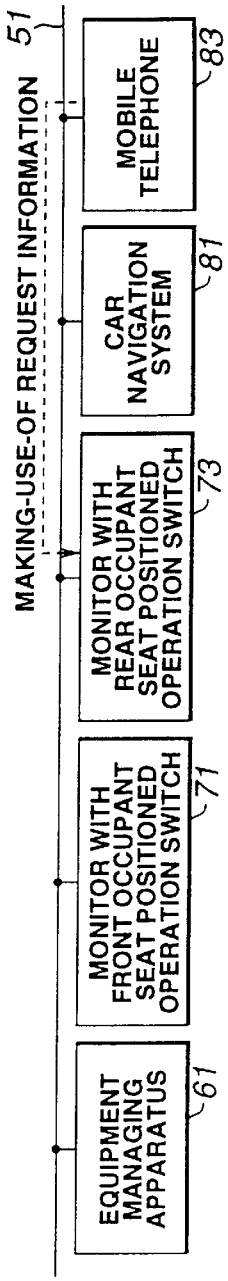

As shown in FIG. 14D, the mobile telephone 83 transmits the making-use-of function request information to the monitor 73 with the rear occupant seat positioned switch to request the latter to serve with the joystick type switch function and the normal type monitor function and makes use of the joystick type switch function and normal type monitor function via the common communication bus 51.

As described above, when with the equipment managing apparatus 61 connected to the common communication bus 51, each of the monitors 71 and 73 with the front and rear occupant seat positioned switches is interconnected to the common communication bus 51, the function serving information is stored in the information storing block 63.

Then, when both of the navigation system 81 and the mobile telephone 83 are connected to the common communication bus 51, the making-use-of function information is stored in the information storing block 63.

Thereafter, when the equipment managing apparatus 61 detects that the certain electronic equipment is newly connected to the common communication bus 51, the managing apparatus 61 determines whether the connected electronic equipment is the function serving (enabling) electronic equipment or the making-use-of function (enabling) electronic equipment.

If the connected electronic equipment is the making-use-of function (enabling) electronic equipment (navigation apparatus 81 or mobile telephone 83), the managing apparatus 61 stores the information on the making-use-of function (enabling) electronic equipment into the information storing block 63.

The managing apparatus 61 searches for the information on the electronic equipment whose function is enabled to serve (in this case, the monitor 71 with the front occupant seat positioned switch or the monitor 73 with the rear occupant seat positioned switch) from among the information stored in the information storing block 63.

If the corresponding information is searched out, the mobile telephone 83 makes use of the functions of the monitor 73 with the rear occupant seat positioned switch.

Consequently, even if, with the communication bus 51 connected monitors 71 and 73 with the front and rear occupant seat positioned switches and the navigation system 81 operated, the mobile telephone 83 is newly connected to the bus 51, the newly connected mobile telephone 83 can make use of the joystick type switch function and the normal type monitor function that the monitor 73 with the rear occupant seat positioned switch has.

Figure 15:
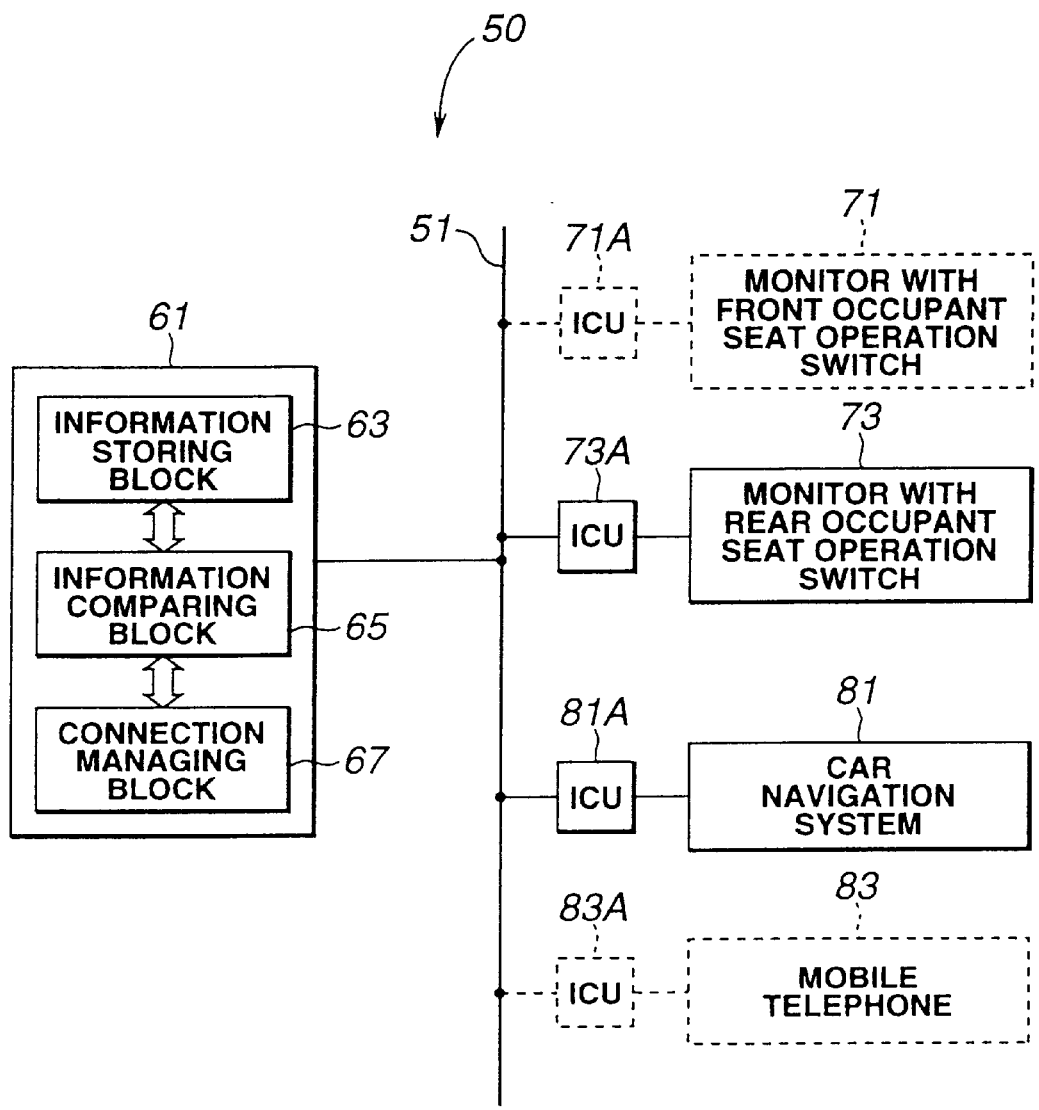
FIG. 15 is a functional block diagram of the information communication system applicable to the in-vehicle networking architecture in the second preferred embodiment according to the present invention in a case when the monitor 71 is disconnected from the bus 51.

FIG. 15 shows a system configuration of the in-vehicle information communication system 50 in the second embodiment according to the present invention in a case when the monitor 71 is newly disconnected from the bus 51.

In FIG. 15, each of the monitor 71 with the front occupant seat positioned switch, the monitor 73 with the rear occupant seat positioned switch, the navigation apparatus 81, the mobile telephone 83 are interconnected to the common communication bus 51 to form the bus type networking architecture.

Next, an operation in the second embodiment in which the monitor 71 with the front occupant seat positioned switch is disconnected from the common communication bus 51, viz., from the in-vehicle information communication system 50 will be described.

FIGS. 16A, 16B, and 16C show explanatory views for explaining the operation in the second embodiment when the monitor 71 is disconnected from the bus 51.

In FIG. 16A, the equipment managing apparatus 61 is initialized and waits for the receipt of the information transmitted from any one of each connected electronic equipment.

In a case where the equipment managing apparatus 61 receives the information from the monitor with the front occupant seat positioned switch 71 and the monitor with the rear occupant seat positioned switch 73, the monitoring apparatus 61 determines whether the received information is the function serving information or not according to the content of command in the received information.

It is noted that this sequence of the receipt of the information from the monitors 71 and 73 may be arbitrary, viz., at the first time, from the monitor 71 and, at the second time, from the monitor 73, or at the first time, from the monitor 73 and, at the second time, from the monitor 71.

The two pieces of function serving information received from the monitor 71 with the front occupant seat positioned switch and from the monitor 73 with the rear occupant seat positioned switch is stored in the information storing block 63.

Next, the equipment managing apparatus 61 searches for the making-use-of function information (the information having the content of command indicating (search)) from the stored information in the information storing block 63.

At this time, since both of the navigation system 81 and the mobile telephone 83 are not yet connected to the communication bus 51, the managing apparatus 61 does not search for the making-use-of function information.

Next, when the equipment managing apparatus 61 receives the information from each of the navigation system 81 and the mobile telephone 83, the equipment managing apparatus 61 determines whether the received information is the making-use-of function information or not according to the content of command in the received information communication message.

It is noted that the sequence of the receipt of information from the navigation system 81 and the mobile telephone may be arbitrary.

Then, the making-use-of function information received from each of the navigation system 81 or the mobile telephone 83 is stored in the information storing block 63 within the equipment managing apparatus 61.

Next, the managing apparatus 61 searches for the function serving information from among the information stored in the information storing block 63.

At this time, the information storing block 63 has already stored the information on the monitor 71 with the front occupant seat positioned switch: resource (address, monitor_wide, switch_dial); and the information on the monitor 73 with the rear occupant seat positioned switch: resource(address, monitor_normal, switch_joystick).

If the equipment managing apparatus 61 compares the searched function serving information with the received making-use-of function information and both arguments of the information are coincident with each other, the managing apparatus 61 transmits the registration instruction information to the navigation system 81 which has transmitted the making-use-of function information to the managing apparatus 61 to register the monitor 71 with the front occupant seat positioned switch into its function making-use-of function source list and transmits the registration instruction information to the mobile telephone 83 to register the searched monitor 73 with the rear occupant seat positioned switch into its making-use-of function source list.

Hence, the navigation system 81 can become making-use-of the dial type switch function and the wide type monitor function of the monitor 71 with the front occupant seat positioned switch and making use of the dial type switch function and the wide type monitor function of the monitor 71 with the front occupant seat positioned switch.

In addition, the mobile telephone 83 can become making use of the joystick type switch function and the normal type monitor function of the monitor 73 with the rear occupant seat positioned switch.

As shown in FIG. 16B, when the equipment managing apparatus 61 detects that any one electronic equipment is disconnected from the common communication bus 51, the managing apparatus 61 searches for the function serving information from among the information stored in the information storing block 63.

It is herein noted that the equipment managing apparatus 61 searches for the function serving information on the monitor 71 with the front seat positioned switch and the monitor 73 with the rear occupant seat positioned switch.

In the case of FIG. 15, since the disconnected equipment information is coincident with the function serving information of the monitor 71 with the front occupant seat positioned switch stored in the information storing block 63, the managing apparatus 61 transmits the deletion instruction information to the navigation system 81 which can make use of the function of the monitor 71 with the front seat positioned switch, as shown in FIG. 16C, to delete the disconnected monitor 71 with the front occupant seat positioned switch from its making-use-of function source list of the car navigation system 81.

Next, an initialize processing of the monitor 71 with the front occupant seat positioned switch, the monitor 73 with the rear occupant seat positioned switch, the navigation system 81, and the mobile telephone 83 will be described below.

First, each electronic equipment is initialized.

Each electronic equipment searches whether the function serving information is present or not according to the content of command in its information.

If the function serving information is present (the monitor 71 with the front occupant seat positioned switch and the monitor 73 with the rear occupant seat positioned switch), the corresponding electronic equipment transmits the making-use-of function information to the equipment managing apparatus 61 via the common communication bus 51.

Next, the receive processing of the monitor 71 with the front occupant seat positioned switch will be described below.

If the making-use-of function request information is received from the navigation system 81 and the mobile telephone 83, the monitor 71 with the front occupant seat positioned switch registers the navigation system 81 and the mobile telephone 83 which has transmitted the making-use-of function information into the function serving information into the function serving source list and provides the navigation system 81 with the dial type switch function and the wide type monitor function and the monitor 73 provides the mobile telephone 83 with the joystick type switch function and the normal type monitor function.

Next, the receive processing of the car navigation system 83 will be described below.

The car navigation system 83 registers the monitor 71 with the front occupant seat positioned switch into its making-use-of function source list in response to the registration instruction information when the registration instruction information is received, transmits the making-use-of function requesting information requesting the serving of the dial type switch function and the wide type monitor function to request the provision of the dial type switch function and the wide type monitor for the monitor 71 with the front seat positioned switch, and makes use of the dial type switch function and the wide type monitor function of the monitor 71 with the front occupant seat positioned switch.

However, since the deletion instruction information is received from the managing apparatus 61 that the monitor 71 has disconnected from the bus 51, the car navigation system 81 deletes the monitor 71 with the front occupant seat positioned switch from its making-use-of function source list, when the deletion instruction information is received, and is operated without making use of the monitor 71 with the front occupant seat positioned switch.

In FIG. 15, when, with the equipment managing apparatus 61 connected to the common communication bus 51, the monitor 71 with the front occupant seat positioned switch and the monitor 73 with the rear occupant positioned switch are connected to the common communication bus 51, the function serving information is stored in the function storing block 63 and the making-use-of function information is stored in the information storing block 63 when each of the navigation system 81 and the mobile telephone 83 is connected to the common communication bus 51.

Thereafter, when the equipment managing apparatus 61 detects that a certain electronic equipment is disconnected from the common communication bus 51, the equipment managing apparatus 61 determines whether the disconnected electronic equipment is the equipment which can serve another electronic equipment with the function that the disconnected electronic equipment has.

If the disconnected electronic equipment is the equipment which can serve another equipment with the function that the disconnected electronic equipment has (the monitor 71 with the front occupant seat positioned switch), the managing apparatus 61 searches for the information of the pieces of electronic equipment which can make use of the function (the navigation system 81) with which the other electronic equipment can serve from among the information stored in the information storing block 63.

If the corresponding information is searched out, each navigation system 81 suspends the making-use-of functions of the monitor 71 with the front occupant seat positioned switch.

Consequently, even when, with each electronic equipment connected to the common communication bus 51 operated, the connected monitor 71 with the front occupant seat positioned switch is disconnected from the common communication bus 51, it is possible for each electronic equipment still connected to the bus 51 to be operated without making use of the switch and monitor functions of the monitor 71 with the front occupant seat positioned switch. It is noted that if the disconnected equipment is one of the pieces of function making-use-of equipment 81 or 83, the managing apparatus 61 only deletes the corresponding stored making-use-of function information and does not inform the corresponding one of the pieces of the function serving equipment 71 or 73 whose functions have been made use of by the disconnected equipment 81 or 83 that the corresponding one of the pieces of the function making-use-of equipment has disconnected from the bus 51.

(Sixth Embodiment)

Figure 17:
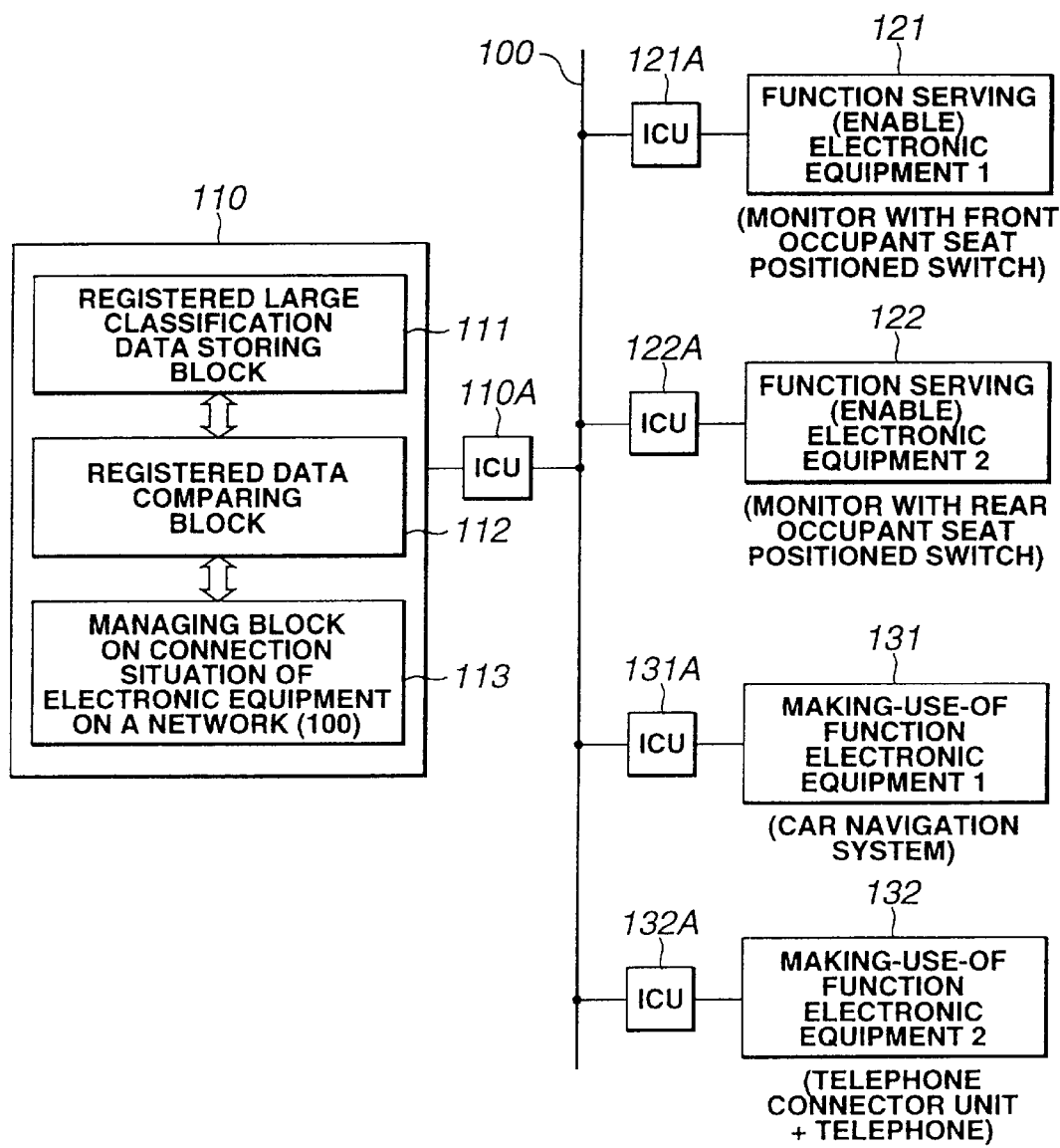
FIG. 17 is a functional block diagram of the information communication system applicable to the in-vehicle networking architecture in a third preferred embodiment according to the present invention.

FIG. 17 shows a system configuration of the in-vehicle information communication system in a sixth preferred embodiment according to the present invention.

Since the same reference numerals as those described in the second embodiment correspond to the like elements, the detailed explanation thereof will be omitted herein.

In FIG. 17, the monitor 71 with the front occupant seat positioned switch, the monitor 73 with the rear occupant seat positioned switch, the car navigation system 81, and the mobile telephone 83 are interconnected to the communication bus 51 to form the bus type networking architecture.

Next, the operation of the in-vehicle information communication system 50 will be described below, with the mobile telephone 83 disconnected.

FIGS. 18A, 18B, and 18C show the explanatory views for explaining the operation of the in-vehicle communication apparatus 50.

As shown in FIGS. 18A, 18B, and 18C, the equipment managing apparatus 61 is initialized and waits for the receipt of the information from each of the monitor 71 with the front seat positioned switch, the monitor 73 with the rear seat positioned switch, the navigation system 81, and the mobile telephone 13.

When the equipment managing apparatus 61 receives the information from the monitor 71 with the front occupant seat positioned switch, the monitor 73 with the rear occupant seat positioned switch, the navigation system 81, and the mobile telephone 83.

When the equipment managing apparatus 61 receives the information from the monitor 71 with the front occupant seat positioned switch and from the monitor 73 with the rear occupant seat positioned switch, the managing apparatus 61 determines whether the received information is the function serving information or not according to the content of command in the information communication message.

If the received information is the function serving information, the managing apparatus 61 stores the received function serving information into the information storing block 63 within the equipment managing apparatus 61.

The managing apparatus thereafter searches for the making-use-of function information from among the information stored in the information storing block 63.

At this time, since no electronic equipment which can make use of the function of another electronic equipment is connected, the managing apparatus 61 does not search for the making-use-of function.

When the equipment managing apparatus 61, thereafter, receives the information from the navigation system 81 and the mobile telephone 83, the managing apparatus 61 determines whether the received information is the making use of function information according to the content of command in the information communication message.

If it is the making-use-of function information, the managing apparatus 61 stores the received making-use-of function information in the information storing block 63 within the equipment managing apparatus 61.

The managing apparatus 61 searches for the function serving information from among the information stored in the information storing block and searches for the function serving information from among the information stored in the information storing block 63.

The information storing block 63 searches for the information serving information from among the information stored in the information storing block 63.

It is noted that the information storing block 63 stores the information of the monitor 71 with the front occupant seat positioned switch, viz., resource (address, monitor, switch joystick)

and the information of the monitor 73 with the rear occupant seat positioned switch, viz., resource (address, monitor, switch dial)

When the searched function serving information and the received making-use-of function information are compared with each other, Then, when the searched function serving information is compared with the received making-use-of function information and both arguments of the information is coincident with each other, the equipment managing apparatus 61 transmits the registration instruction information to the navigation system 81 from which the above-described making-use-of function information has transmitted to register the searched monitor 71 with the front occupant seat positioned switch and the searched monitor 73 with the rear occupant seat positioned switch into the making-use-of function source list and to the mobile telephone 83 to register the monitor 71 with the front occupant seat positioned switch into its making-use-of function source list.

Hence, the navigation system 81 can make use of both of the joystick type switch function of the monitor 71 with the front occupant seat positioned switch and the dial type switch function of the monitor 73 with the rear occupant seat positioned switch and the mobile telephone 83 can make use of the joystick type switch function of the monitor 71 with the front occupant seat positioned switch.

Next, as shown in FIG. 18B, when the equipment managing apparatus 61 detects that the equipment is disconnected from the common communication bus 51, the equipment managing apparatus 61 searches for the function serving information from among the information stored in the information storing block 63.

Then, the managing apparatus 61 compares the searched function serving information with the information on the disconnected equipment.

In this case, the two pieces of function serving information are searched but are not coincident with the information of the disconnected equipment. Thereafter, the managing apparatus 61 searches for the making-use-of function {information whose content of command is (search)}. In this case, the information in the car navigation system 81 and mobile telephone 83 is searched.

Then, when both arguments of the information on the disconnected equipment and the information on the mobile telephone 83 are coincident with each other, the managing apparatus 61 transmits the deletion instruction information to the monitor 71 with the front occupant seat positioned switch to delete the disconnected mobile telephone 83 from the making-use-of function source list, as shown in FIG. 18C. Thereafter, the equipment managing apparatus 61 deletes the information on the disconnected mobile telephone 83 stored in the information storing block 63.

Next, the initialize processing of the monitor 71 with the front occupant seat positioned switch, the monitor 73 with the seat occupant seat positioned switch, the navigation system 81, and the mobile telephone 83 will be described below.

First, each electronic equipment described above is initialized. Each electronic equipment, thereafter, determines whether the function serving information is present in itself.

In the case where the function serving information is present (the monitor 71 with the front occupant seat positioned switch and the monitor 73 with the rear occupant seat positioned switch), each of the monitors 71 and 73 transmits its function serving information to the equipment managing apparatus 61 via the communication bus 51.

On the other hand, in the case where the making-use-of function information is present (navigation system 81 and the mobile telephone 83), the managing apparatus 61 transmits the making-use-of function to the equipment managing apparatus 61 via the communication bus 51.

The receive processing of the monitor 71 with the front occupant seat positioned switch will be described below.

When the making-use-of function request information is received from the mobile telephone 83, the mobile telephone 83 is registered into the function serving source list of the monitor 71 with the front occupant seat positioned switch and the monitor 71 serves the mobile telephone 83 with the joystick type switch function.

On the other hand, when the equipment managing apparatus 61 receives the deletion instruction information from the equipment managing apparatus 61, the monitor 71 deletes the mobile telephone 83 in response to the deletion instruction information source list to suspend the serving of the joystick type switch function.

Next, the receive processing of the mobile telephone 83 will be described below.

If the mobile telephone 83 receives the registration instruction information from the equipment managing apparatus 61, the monitor 71 with the front occupant seat positioned switch is registered into its making-use-of function serving source list in response to the registration instruction information. The making-use-of function request information is transmitted to request that the joystick type switch function is to be served to the mobile telephone 83 itself to the monitor 71 with the front occupant seat positioned switch. Then, the mobile telephone 83 makes use of the joystick type switch function via the common communication bus 51.

As described above, in the fifth embodiment, when, with the equipment managing apparatus 61 connected to the communication bus 51, the monitor 71 with the front seat positioned switch and the monitor 73 with the rear seat positioned switch are connected to the common communication bus 51, the managing apparatus 61 stores their function serving information into the information storing block 63.

In addition, when the navigation system 81 and the mobile telephone 83 are connected to the common communication bus 51, the managing apparatus 61 stores the making-use-of function information into the information storing block 63.

Thereafter, when the managing apparatus 61 detects that the certain electronic equipment is disconnected from the common communication bus 51, the managing apparatus 61 determines whether the disconnected electronic equipment is the function serving (enabling) electronic equipment or the making-use-of function (enabling) electronic equipment.

If the disconnected electronic equipment is the making use of function (enabling) equipment, the managing apparatus 61 searches for the information on the electronic equipment (the monitors 71 and/or 73) which is enabled to serve the function of which another equipment can be made use from among the information stored in the information storing block 63.

If the corresponding information is searched out, each or one of the monitors 71 and/or 73 suspends the serving of its function or functions to the navigation system 81 and the mobile telephone 83.

Consequently, even when, with each electronic equipment which is interconnected to the communication bus 51 operated, the mobile telephone 83 is disconnected from the communication bus 51, it is possible for the managing apparatus 61 to inform the monitor 71 with the front occupant seat positioned switch which has provided its function for the disconnected mobile telephone 83 that the mobile telephone 83 has been disconnected from the communication bus 51.

The advantages of the sixth embodiment are generally the same as those described in the second embodiment.

It is noted that the information format of the registration instruction information is answer(resource name, address [,address, - - - ]) and the registration instruction information including the address or addresses of the function serving electronic equipment whose function (resource) is desired to be made use of is transmitted to the making-use-of function equipment or pieces of electronic equipment which is desired to make use of that function (resource), the-address indicating an address number of the electronic equipment having the resource and the address numbers being arranged continuously if a plurality of pieces of electronic equipment have the same resource and the resource name being exemplified by monitor or switch joystick or so on.

It is also noted that the information format of the deletion instruction information is delete (resource name, address) and the deletion instruction information including the resource name and the address number of the electronic equipment which cannot be made use of any more is transmitted to any one or more of the pieces of electronic equipment which have made use of the function (resource) that the disconnected electronic equipment has served.

(Third Embodiment)

FIG. 17 shows a system configuration of a third preferred embodiment of the in-vehicle information communication system.

The in-vehicle information communication system shown in FIG. 17 includes: a network 100 used to connect a plurality of pieces of vehicular electronic equipment thereto; an apparatus 110 for managing the plurality of pieces of electronic equipment 121 and 122 (hereinafter called, a first electronic equipment 121 and a second electronic equipment 122) which are so arranged and constructed as to be enabled to serve another or other pieces of electronic equipment with their functions; and two pieces of electronic equipment 131 and 132 (hereinafter called, a third electronic equipment 131 and a fourth electronic equipment 132) to be enabled to make use of the function or functions of another or other pieces of electronic equipment.

It is noted that the network 100 shown in FIG. 17 corresponds to the common communication bus 1 or 51 used in each of the first and second embodiments described before.

The managing apparatus 110 includes: a large classification registration data storing block 111 for storing a large classification data of a function that each electronic equipment of a function that each electronic equipment to be connected to the network 100 has (hereinafter, also simply referred to as a storing block); a comparing block 112 for comparing the large classification data of the function; and a connection situation managing block 113 for managing a connection situation of each electronic equipment connected to the network 100.

The storing block 111 of the managing apparatus 110 is constituted by, for example, the RAM. The comparing block 112 and the connection situation managing block 113 can be constituted by the microcomputer.

The managing apparatus 110 is constituted by, for example, the microcomputer with the RAM.

The first electronic equipment 121 and the second electronic equipment 122 are constituted by, for example, the monitor with the operation switch and a voice recognition device. The third electronic equipment 131 and the fourth electronic equipment 132 are constituted by, for example, the car navigation system, an audio/video equipment, an air conditioner, and/or the mobile telephone with the automotive adapter.

Next, the operation of the third embodiment will be described with reference to the flowcharts in FIGS. 18 through 25.

FIGS. 18, 19, 20, and 21 show respective flowcharts executed by the equipment managing apparatus 110.

Figure 22:
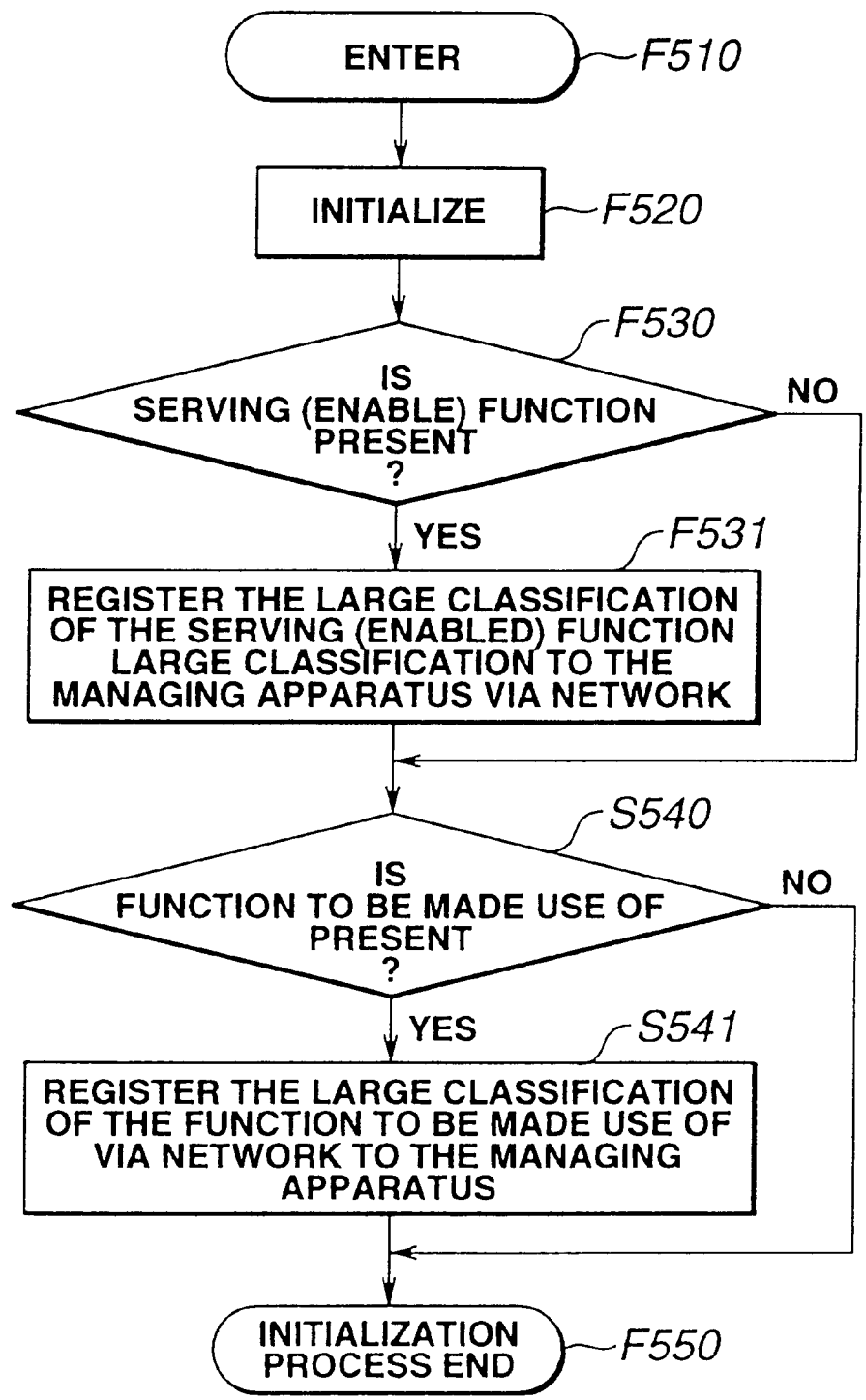
FIG. 22 is a detailed flowchart for explaining an initialization processing executed by each electronic equipment connected to the communication network shown in FIG. 17.
Figure 23:
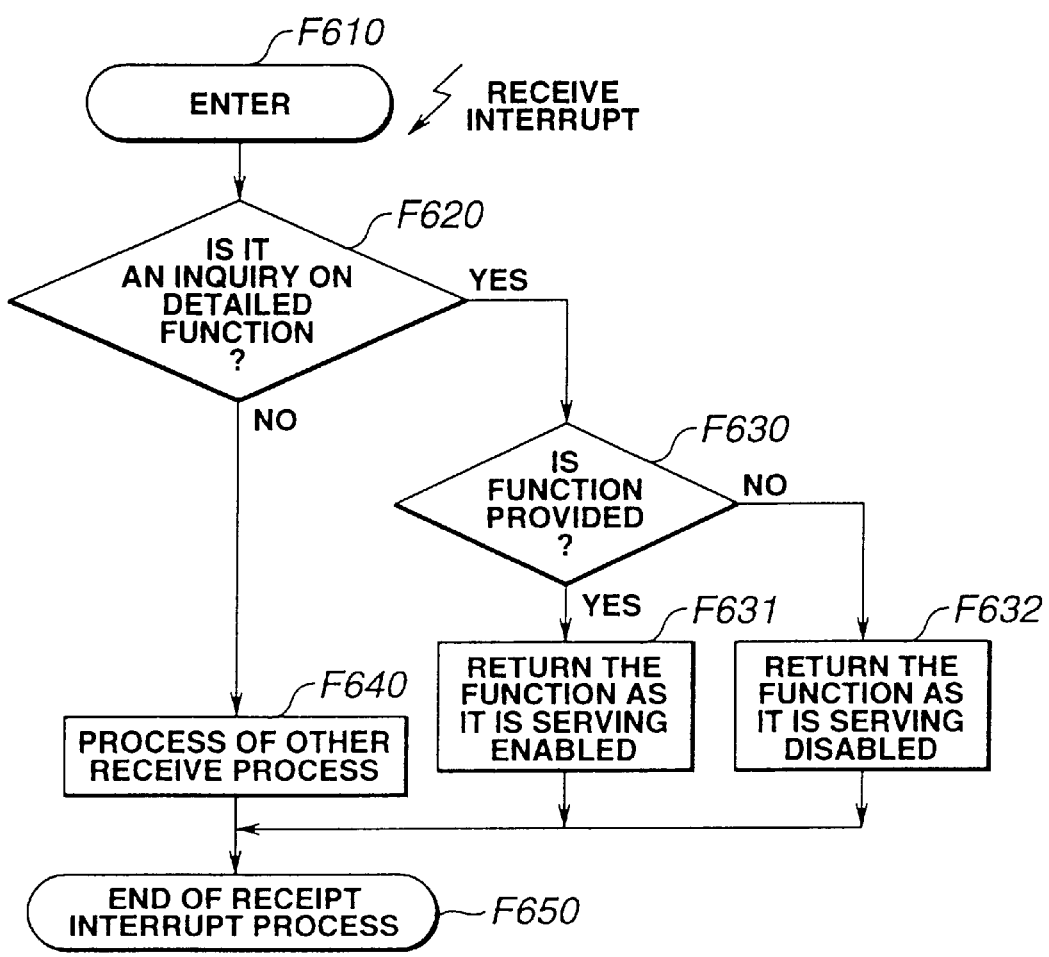
FIG. 23 is a detailed flowchart for explaining a receive processing executed by each function serving electronic equipment shown in FIG. 17.

FIGS. 22 and 23 show the flowcharts executed by each of the first electronic equipment 121 and the second electronic equipment 122.

Figure 24:
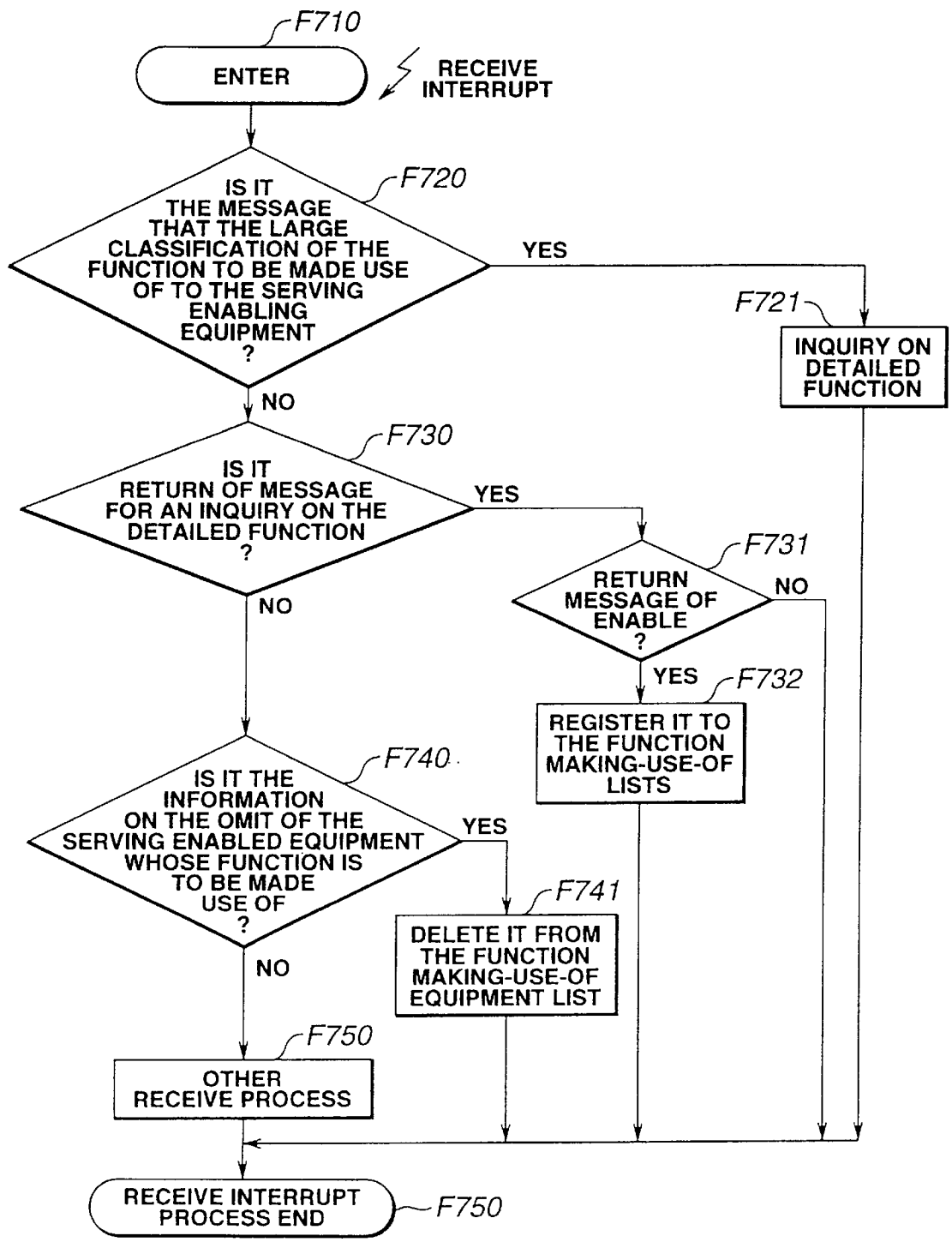
FIG. 24 is a detailed flowchart for explaining a receive processing executed by each making-use-of function electronic equipment shown in FIG. 17.

FIGS. 22 and 24 show the flowcharts executed by each of the third electronic equipment 131 and the fourth electronic equipment 132.

Figure 18:
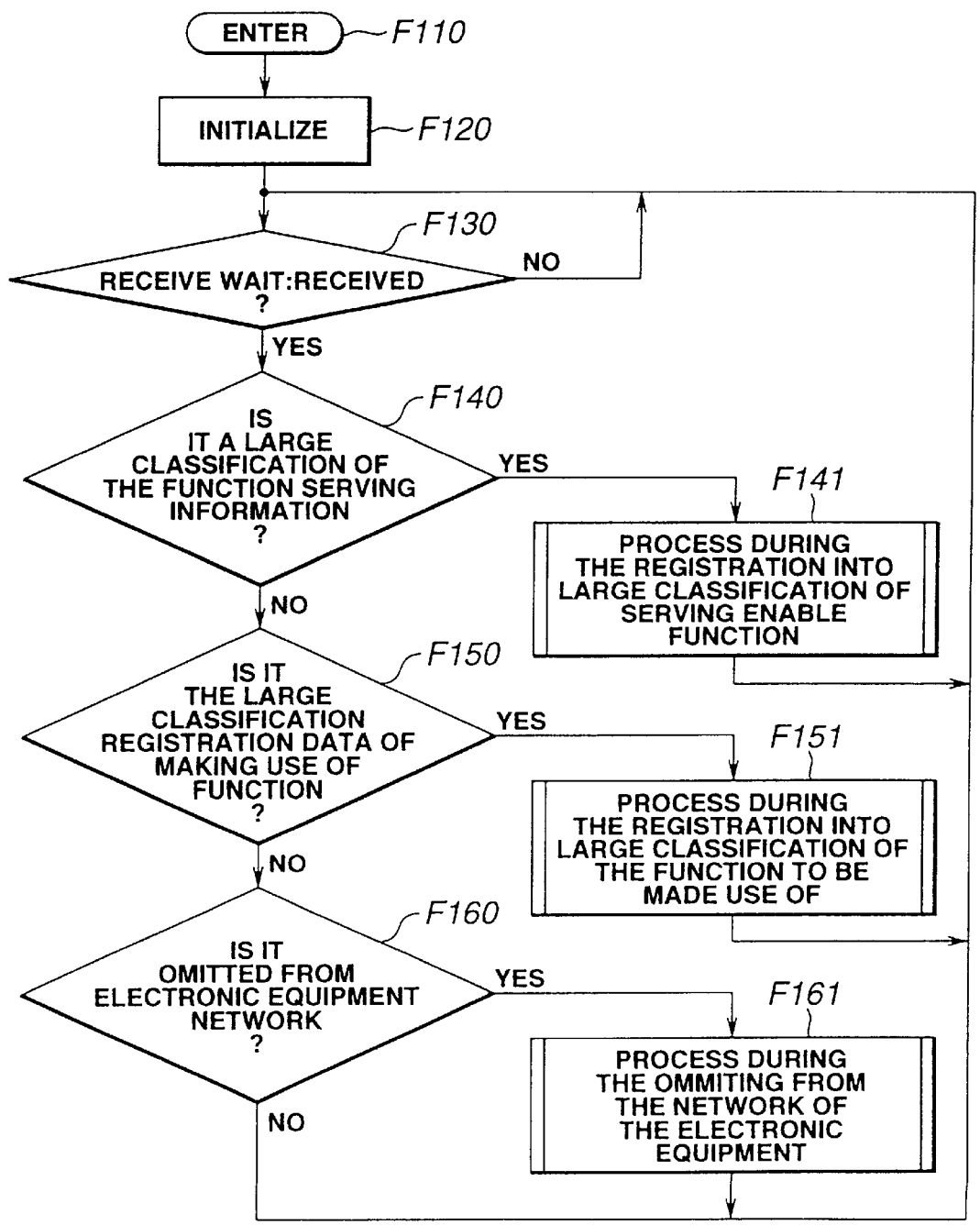
FIG. 18 is a general flowchart executed by the equipment managing apparatus shown in FIG. 17.
Figure 19:
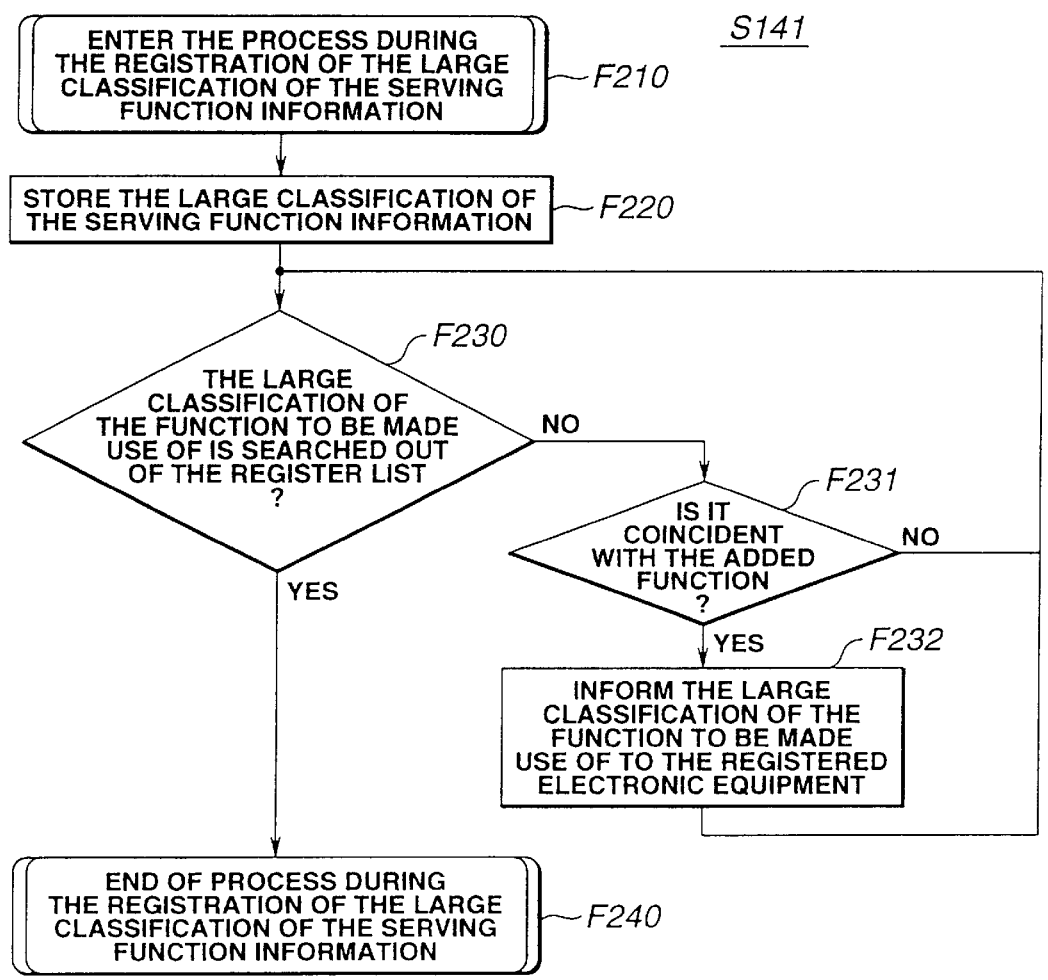
FIG. 19 is a detailed flowchart for explaining a registration processing for a serving enabled function executed by the equipment managing apparatus connected to a communication network shown FIG. 17.
Figure 20:
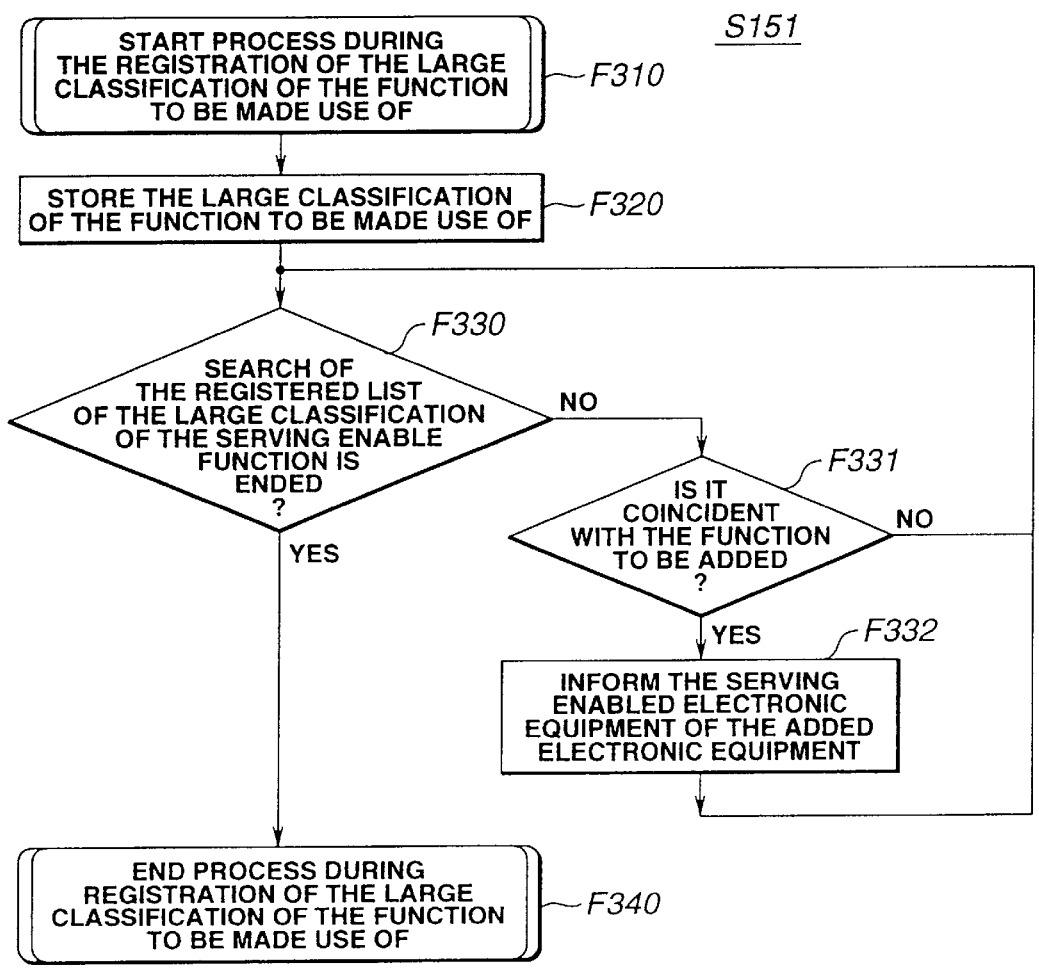
FIG. 20 is a detailed flowchart for explaining a registration processing for a making-use-of function by the equipment managing apparatus connected to the communication network shown in FIG. 17.
Figure 21:
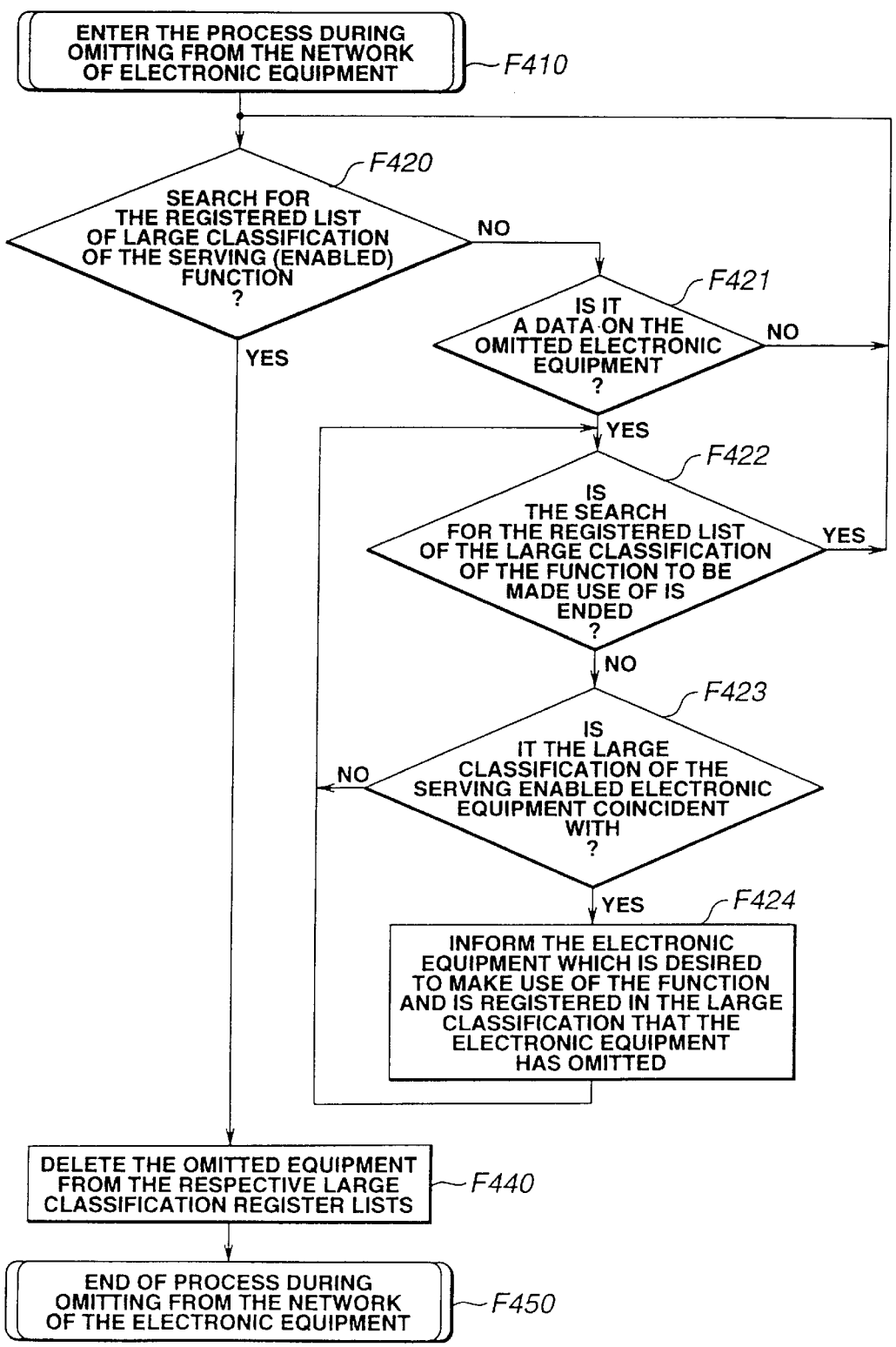
FIG. 21 is a detailed flowchart for explaining an omitting processing for the electronic equipment omitted by the equipment managing apparatus shown in FIG. 17.

At a step F120 of FIG. 18, the managing apparatus 110 is initialized and, at a step F130, waits for the receipt of the information from the network connected one of the first, second, third, and fourth pieces of electronic equipment 121, 122, 131, and 132.

On the other hand, at a step of F520 in FIG. 22, each of the electronic equipment is initialized and, at steps of F531 and F541, transmits the large classification data of the function which can be served to any other electronic equipment or the large classification data of the function of which any other electronic equipment can be made use.

Referring to FIG. 18, when the managing apparatus 110 receives the information on the large classification of the function with which the first or second electronic equipment 121 or 122 can serve the other electronic equipment at a step F140, the managing apparatus 110 stores the received information as the large classification registration data of the electronic equipment connected to the network 100 into the storing block 111 at a step F220. Then, the managing apparatus 110 compares the received information with the registration information on the function of which the other electronic equipment is requested to be made use using the comparing block 112 at a step F231.

If both are coincident with each other, at a step F232, the managing apparatus 110 determines that there is an equipment which is desired to make use of the large classification function presently received and tells the equipment which has been registered as the equipment which has requested to make use of the large classification of the added function (the third electronic equipment 131 or the fourth electronic equipment 133) the equipment (specifically the address) which has transmitted the information which has presently been received by the managing apparatus 110 (corresponds to the first electronic equipment 121 or the second electronic equipment 122) at a step F332.

At a step F720, when the third or fourth electronic equipment 131 or 132 is told by the managing apparatus 110 that there is the electronic equipment having the large classification function to be desired to be made use of (first electronic equipment 121 and the second electronic equipment 122), the third or fourth electronic equipment 131 or 132 makes an inquiry of detailed function whether the equipment having the large classification of the function of which the other electronic equipment is desired to be made use has a function of which is desired to be actually made use at a step F721.

When, at a step F730, the third or fourth electronic equipment receives a reply to the inquiry of the detailed function, the third or fourth electronic equipment 131 or 132 determines whether the received reply indicates that the inquired function can be made use of at a step F731. If the inquired function can be made use of, the third or fourth embodiment 131 or 132 registers the equipment having the inquired detailed function into its making-use-of function source list in order to make use of the function that the corresponding inquired electronic equipment has at a step F732.

On the other hand, when, at a step F620, the first or second electronic equipment 121 or 122 receives the inquiry of the detailed function from the third or fourth electronic equipment, the first or second electronic equipment 121 or 122 determines whether the detailed function is provided in itself at the step F630. If it is provided in itself at the step F630, the first or second electronic equipment 121 or 122 replies the inquired third or fourth electronic equipment 131 or 132 that the detailed function is provided in itself and can be made use of.

However, if the detailed function is not provided in itself, the first or second electronic equipment 121 or 122 replies the third or fourth electronic equipment 131 or 132 that the detailed function is not provided therein so as to be impossible to be made use of at a step F632.

Furthermore, when, at a step F160, the managing apparatus 110 detects that a certain electronic equipment is disconnected from the network 100, the managing apparatus 110 determines whether the disconnected electronic equipment has the function of which the other connected electronic equipment can be made use from the large classification registration information of the functions stored in the information storing block 111 at steps F420 and F410.

If the disconnected electronic equipment has the function with which the disconnected electronic equipment can serve the connected electronic equipment, the managing apparatus 110 compares the large classification function information on the function with which the disconnected electronic equipment can serve the connected electronic equipment with the large classification of the function registration information stored in the information storing block 111 using the comparing block 112 at steps F422 and F423.

If there is the electronic equipment which has registered to make use of the large classification function that the disconnected equipment has, the managing apparatus 110 tells that equipment that there is the equipment which has been disconnected from the network 100 at a step F424.

When, at a step F740, the third or fourth electronic equipment 131 or 132 is told by the managing apparatus 110 that the electronic equipment having the function for the third or fourth electronic equipment 131 or 132 to make use of at a step F740, the third or fourth electronic equipment 131 or 132 deletes the disconnected electronic equipment from its making-use-of function source list at a step F741 and is operated without making use of the function.

Next, when the managing apparatus 110 detects that the certain electronic equipment which has been connected to the network 100 is disconnected from the network 100 at the step F160, the managing apparatus 110 compares that function information with the registered information on the function of which the other electronic equipment is desired to be made use using the comparing block 112 at steps of F422 and F423.

If there is the registration information that the corresponding electronic equipment has registered that the function of the disconnected equipment is desired to be made use of, the managing apparatus 110 tells the latter equipment that the corresponding electronic equipment has been disconnected (omitted) from the network 100.

Then, the managing apparatus 110 deletes the registration data of the large classification of the function with which the disconnected electronic equipment can serve and of the large classification of the function of which the other electronic equipment is desired to be made use from the information storing block 110 at a step F440.

Next, a specific example of the operation in the third embodiment will be described below.

That is to say, the first electronic equipment 121 is constituted by the monitor with the front occupant seat positioned switch and the second electronic equipment 122 is constituted by the monitor with the rear occupant seat positioned switch.

The third electronic equipment 131 is constituted by the car navigation system and the fourth electronic equipment 132 is constituted by the mobile telephone.

The monitor 121 with the front occupant seat positioned switch has the functions of a normal monitor (monitor) and the joystick type switch (switch) which can be served to any other electronic equipment.

TABLE 1 shows the functions used in the third embodiment, their large classifications, and definitions of the detailed function information.

TABLE 1

| Function | Large Classification | Detailed Function |
| --- | --- | --- |
| Normal monitor | Monitor | normal monitor |
| Wide monitor | Monitor | wide monitor |
| Joystick type switch | Switch | joystick |
| Dial type switch | Switch | dial |
| 10 key type switch | Switch | 10 key |

TABLE 2 shows the large classification information formats to be issued by the first electronic equipment 121 constituted by the monitor having the address of 0171 and having the front seat occupant positioned switch, by the second electronic equipment 122 constituted by the monitor having the address of 0173 and having the rear occupant seat positioned switch, by the third electronic equipment 131 constituted by the car navigation system having the address of 0181, and by the fourth electronic equipment 132 constituted by the mobile telephone and having the address of 0183.

It is noted that the address of the managing apparatus 110 is 0101 and actually when the information formats described in TABLE 2 is transmitted to the network 100, the address of the transmitted station, for example, the managing apparatus having the address of 0101 is added before the command as address.

TABLE 2

| | Equipment (address) | Command (address, argument[,—]) |
| --- | --- | --- |
| ① | Monitor with Front seat Occupant | RESOURCE (0171, MONITOR, SWITCH) |

TABLE 2-continued

| | Equipment (address) | Command (address, argument[,—]) |
| --- | --- | --- |
| | seat positioned Dial type Switch (0171) | |
| ① | Monitor with Rear seat Occupant seat positioned Joystick type Switch (0173) | RESOURCE (0173, MONITOR, SWITCH) |
| ② | Car navigation System (0181) | SEARCH (0181, SWITCH, MONITOR) |
| ② | Mobile Telephone (0183) | SEARCH (0183, SWITCH, MONITOR) |

In TABLE 2, ① denotes the information of the large classification function serving information and ② denotes the information of the large classification making-use-of function information.

In the initialize processing of each of the monitors 121 and 122 at the step F531, the monitor 121 with the front occupant seat positioned switch transmits the information of the large classification functions thereof, viz., the normal type monitor (monitor) and (switch) corresponding to the joystick type switch to the managing apparatus 110. In addition, the monitor 122 with the rear occupant seat positioned switch transmits the information of the large classification functions thereof, viz., the normal type monitor (monitor) and (switch) corresponding to the dial type switch to the managing apparatus 110.

When the managing apparatus 110 receives the information such as (monitor) and (switch) as the functions with which either the first or second electronic equipment 121 or 122 can serve from either the first or second electronic equipment at the step F140, the managing apparatus 110 stores its information into the information storing block 111 at the step F220.

Next, in the case where the navigation system 131 is desired to make use of the normal type monitor, the navigation system 131 transmits (monitor) as the large classification of the function to the managing apparatus 110 at the step F541.

When the managing apparatus 110 receives the large classification of the function to be desired to be made use of at the step F150, the managing apparatus 110 stores the information that the navigation system 131 is desired to make use of (monitor) into the information storing block 111 at the step F320.

At the steps F330 and F331, since the function serving (enabling) information is previously stored, the managing apparatus 110 searches for the registration list which indicates the function serving (enabling) equipment.

When (monitor) can be served by each of the monitors 121 and 122, the managing apparatus 110 informs the navigation system 131 that both of the monitors 121 and 122 can serve the navigation system 131 with the function of (monitor). When the navigation system 131 receives the information of the large classification of the function to be made use of at the step F720, the navigation system 131 makes the inquiry of the detailed function to each of the monitors 121 and 122 in the form of (normal monitor) at the step F721.

When each of the monitors 121 and 122 receives the inquiry of detailed functions of (normal monitor) at the step F620, each of the monitors 121 and 122 determines that each monitor has its own (normal monitor) function at the step F630, and replies the navigation system 131 that the inquired detailed function is provided therein and is enabled to be served at the step F631.

The navigation system 131 receives the reply for the inquiry of the detailed function from each of the monitors 121 and 122 at the step F730 and the detailed function is enabled to be served at the step F731.

Hence, the navigation system 131 registers the respective monitors 121 and 122 into its making-use-of function source list at the step F732.

For the navigation system 131, the same sequence of inquiry and reply, as described in the case of the normal monitor is applicable to the joystick type switch.

The navigation system 131 registers the monitor 121 with the front occupant seat positioned switch into the making-use-of function source list as the joystick type switch being made use of.

Thereafter, the navigation system 131 makes use of both functions of the normal monitor and joystick type switch with which the monitor 121 with the front occupant switch can serve the navigation system 131.

Since the electronic equipment which can add the new function thereinto utilizing another electronic equipment can utilize the electronic equipment which can serve another electronic equipment with the function with which the electronic equipment itself is provided via the network, the effective use of a resource such as the function that each electronic equipment has becomes possible.

In addition, it is possible to connect a new electronic equipment to the network 100, with the pieces of electronic equipment constituting the networking architecture operated.

It is also possible for the other electronic equipment to use the function that the newly connected electronic equipment has, and for the newly connected electronic equipment to use the function that the other electronic equipment on the network has.

The advantages of the third embodiment are generally the same as those described in each of the previously described embodiments.

(Fourth Embodiment)

Figure 25:
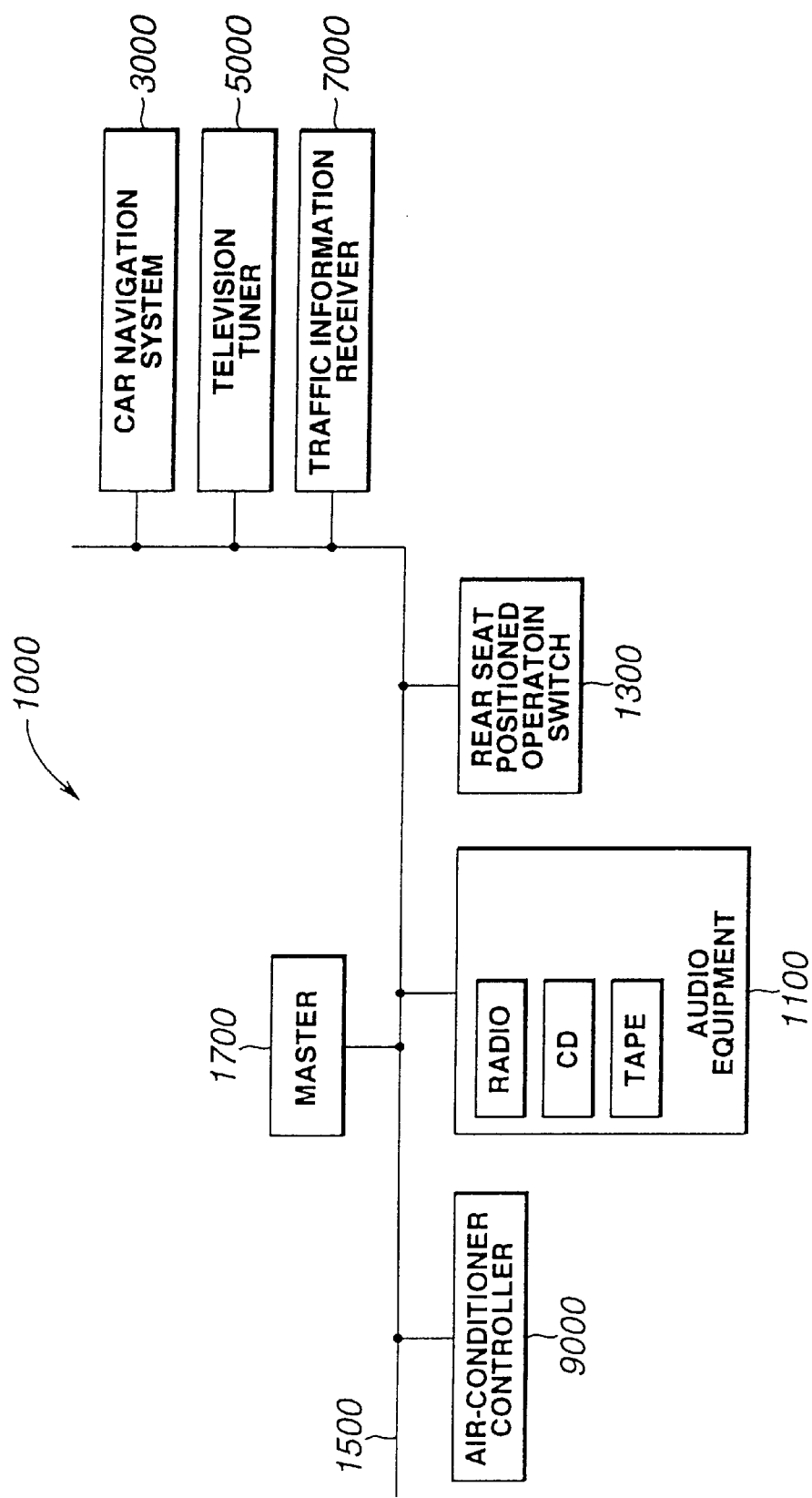
FIG. 25 is a functional block diagram of the information communication system applicable to the in-vehicle networking architecture in the case of a fourth preferred embodiment according to the present invention.

FIG. 25 shows a whole system configuration of an eighth preferred embodiment of the in-vehicle information communication system 1000 applicable to the in-vehicle networking architecture.

In FIG. 25, a vehicular present position measuring device used to measure the present position of the measured vehicle (the measured vehicle corresponds to an automotive vehicle itself in which the vehicular present position measuring device is mounted) is built in the car navigation system 3000.

The car navigation system 3000 transmits a road map information surrounding the present position of the vehicle to a master station 1700 as will be described later via the common communication bus 1500 or another video signal transmission line.

A television tuner 5000 transmits a television video information to the master station 1700 via the communication bus 1500 or the other video signal transmission line.

A traffic information receiver 7000 receives a varying-with-time traffic congestion information and/or a vacant information of parking lots transmitted from an FM broadcasting and/or beacon stations and transmits the received traffic information to the master station 1700 via the common communication bus 1500.

An air conditioner controller 9000 controls a temperature and a wind quantity generated by the vehicular air conditioner to become coincident with a target temperature and a target wind quantity set by the vehicular occupant.

The audio equipment 1100 is a modular acoustic equipment in which audio functions such as a radio receiver, CD (Compact Disc) drive, and a cassette tape deck are integrated.

The above-described pieces of electronic equipment 3000, 5000, 7000, 9000, and 1100 are respectively called slave stations.

In addition to the functions that the respective slave stations themselves have, the respective slave stations can make use of the functions that the master station 1700 have by communicating with the master station 1700.

The master station 1700 have the monitor function and switch function and serves each slave station with each function in accordance with the operation by the vehicular occupant.

An operation switch 1300 positioned on the rear occupant seat is operated by the vehicular occupant generally seated on the rear occupant seat of the vehicle.

The master station 1700, each slave station and the operation switch 1300 are interconnected to the common communication bus 1500 and transmit the communication information mutually to each other via the common communication bus 1500.

Figure 26:
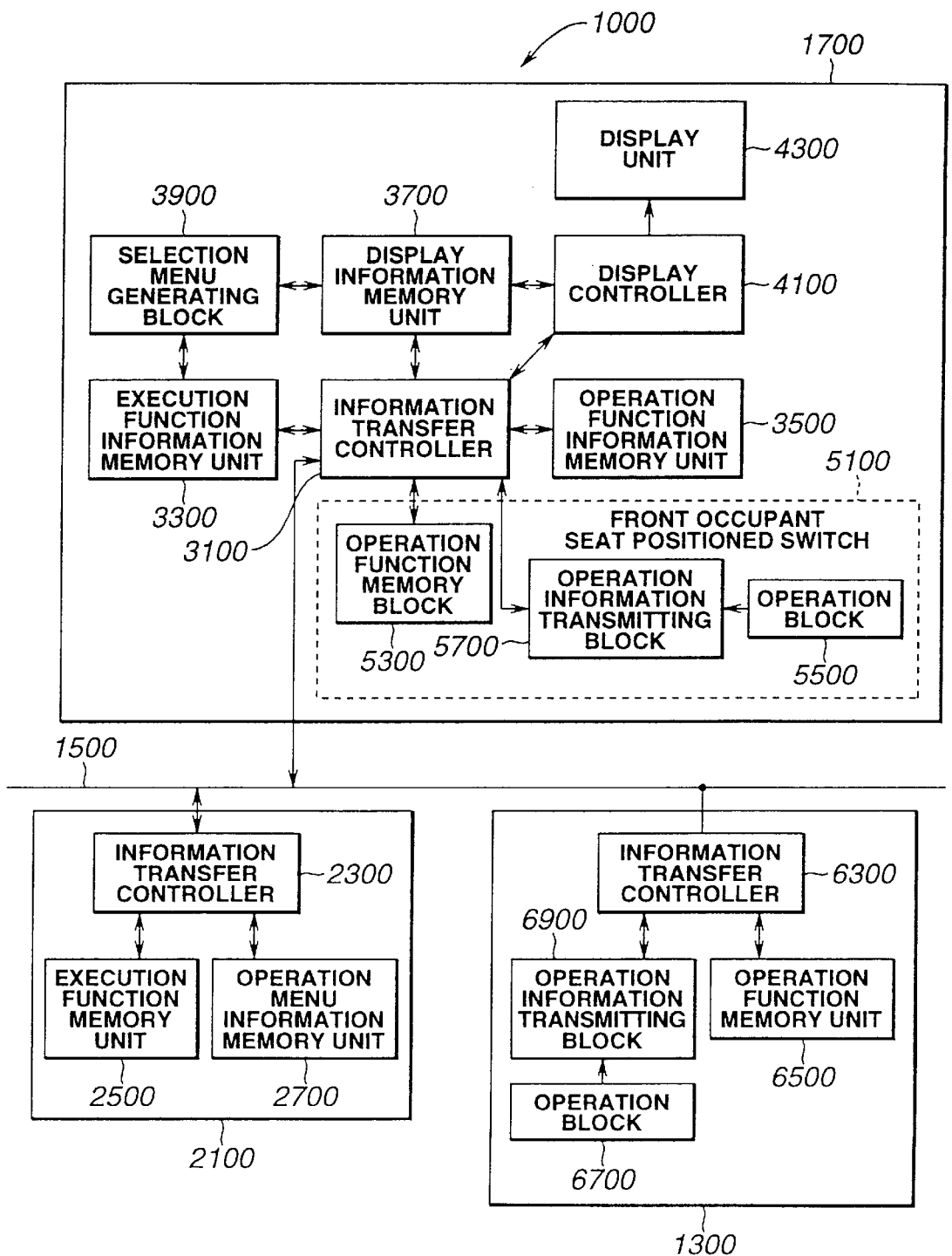
FIG. 26 is a detailed functional block diagram of the information communication system in the case of the fourth embodiment shown in FIG. 25.

Next, FIG. 26 shows a detailed structure of the in-vehicle information communication system in the eighth embodiment.

It is noted that each slave station shown in FIG. 25 has common essential elements as shown in the slave station 2100 of FIG. 26 and only a respective one of the slave stations will be described in details below.

The slave station 2100 includes: an information transfer controller 2300; an execution function memory unit 2500; and an operation menu memory unit 2900.

The slave station 2100 belongs to a group of the same structured slave stations not shown.

An execution function information representing a function that the corresponding slave station 2100 itself is executable is previously stored thereinto.

The execution function is a function of the corresponding slave station 2100 which can be executed therein by a control of the master station 1700.

For example, the execution function of the car navigation system 3000 shown in FIG. 25 is a road map function for displaying the road map information on a screen of a display unit.

The execution function of the TV tuner 5000 is a television function for receiving a broadcasting wave from a television broadcasting station and for displaying a television image on the screen of the display unit.

The traffic information receiver 7000 has the execution function for receiving the information such as the traffic congestion information and the vacant information of the parking lots and for displaying the received information on the screen of the display unit.

The air conditioner controller 9000 has the execution information for controlling the temperature and wind quantity of the air conditioner to become coincident with the target temperature and wind quantity set by the vehicular occupant.

The audio equipment 1100 has three execution functions, the first being a radio function for receiving a broadcasting wave from a radio station and converting the received wave into an acoustic signal, the second being a CD function for converting a signal recorded on the CD into an acoustic signal, and the third being a tape function for converting a signal recorded on a cassette tape into an acoustic signal.

Next, in the operation menu information memory unit 2700, an operation menu information representing a menu of kinds of operations which can be carried out in the slave station 2100 is stored in a hierarchy structure.

For example, the kinds of operations stored in the operation menu memory unit 2700 in the car navigation system 3000 shown in FIG. 25 are as follows: in a first hierarchy, the present position of the vehicle, display exchange, road map display region setting, and a point of location storage are stored; and in a second hierarchy, an operation menu information is stored which corresponds to the kinds of operations selected in the first hierarchy.

On the other hand, referring back to FIG. 26, the information transfer controller 2300 transmits the execution function information of the corresponding slave station 2100 stored in the execution function memory unit 2500 and the operation menu information stored in the operation menu information memory unit 2700 to an information transfer control block 3100 of the master station 1700.

The transmission of the execution function information and the operation menu information are carried out when a power is supplied to the slave station 2100 or to the master station 1700 or whenever a constant period of time is passed.

The master station 1700 shown in FIG. 26 includes: the information transfer control block 3100, the execution function information memory unit 3300, the operation menu function memory unit 3500, a display information memory unit 3700, a selection menu generating block 3900, a display controller 4100, the display unit 4300, and the front occupant seat positioned operation switch 5100.

The information transfer control block 3100 controls the transfer of information carried out between each memory unit within the master station 1700 and controls the transfer of the information between the master station 1700 and the slave station 2100.

The execution function information memory unit 3300 stores the execution function information transmitted from the slave station 2100 thereinto together with the equipment information on the transmitted stave station 2100. The operation function information memory unit 3500 stores thereinto the operation information corresponding to the operation carried out by the vehicular occupant (operator) and transmitted from an operation information transmitting block 5700 in the operation switch 5100 positioned on the front occupant seat.

The display information memory unit 3700 stores the operation menu information to be displayed on the screen of the display unit 4300 thereinto.

The selection menu generating block 3900 generates an execution function information stored in the execution function information memory unit 3300.

When the execution function selection menu generated by the selection menu generating block 3900 is displayed on the screen of the display unit 4300, the vehicular occupant can select a desired execution function from the displayed execution function selection menu.

The display controller 4100 performs the display processing, the updating processing, the response processing to the display in accordance with the operation information transmitted from the operation information transmitting block 5700.

The display unit 4300 performs the display of the information stored in the display information memory unit 5700 on its screen.

The display unit 4300 is disposed on a part of the vehicle surrounding the front occupant seat so as to be easily viewed from the vehicular occupant(s) seated on the front occupant seat.

The operation switch 5100 includes: the operation function memory unit 5300; an operation block 5500; and the operation information transmitting block 5700.

The operation function memory unit 5300 previously stores the operation function information of the operation switch 5100 positioned on the front occupant seat thereinto.

The operation function of the operation switch 5100 positioned on the front occupant seat is the switch function for the front occupant seat.

The operation block 5500 includes switches of the joystick type switch and of a menu button located in a vicinity to the display unit 4300 and operated by the vehicular occupant seated on the front occupant seat.

The operation information transmitting block 5700 transmits the operation information according to the operation carried out through the operation block 5500 to the information transfer controller 3100.

The operation switch 1300 positioned on the rear occupant seat includes: an information transfer controller 6300; an operation function memory unit 6500; an operation block 6700; and an operation information transmitter 6900.

The operation switch 1300 belongs to a group of the slave stations having the same structures as the operation switch 1300.

The information transfer controller 6300 controls the transfer of information between the slave station 2100 and the master station 1700.

The operation function memory unit 6500 previously stores the operation function information thereinto.

The operation function of the switch 1300 is the switch function for the rear occupant seat.

The operation block 6700 is installed adjacent to the rear occupant seat and is operated by the vehicular occupant seated on the rear occupant seat.

The operation information transmitter 6900 transmits the operation information according to the operation from the operation block 6700 to the information transfer controller 6300.

It is noted that although the operation block 5100 is disposed adjacent to the display unit 4300, the operation block 5100 may be attached onto the other slave station 2100 or may be installed independently of the slave station 2100.

Next, the information format of the information transferred between the slave station 2100 and the master station 1700 via the communication bus 1500 will be described with reference to FIG. 27.

Each information format shown in FIG. 27 has a plurality of terms, each term being divided using a division symbol. A first term indicates a kind of information and second term or more indicates a definition of necessary contents.

First, as shown in an uppermost part of FIG. 27, the information format of the execution function information has the second term representing the number of registrations, viz., the number of the execution functions that the slave station 2100 has. The third term thereof or more terms represent names of the execution functions and the number of registrations (memories) assigned in the second term are aligned.

For example, the number of the execution functions that the slave station, viz., the audio equipment 1100 shown in FIG. 25 are three and the names of the execution functions are the radio function, the CD function, and the tape function.

Secondly, in the information format of the operation function information shown in the second uppermost part of FIG. 27, the second term thereof represents the name of the operation function.

For example, the name of the operation function stored in the operation function memory unit 5300 of the master station 1700 shown in FIG. 26 is the front occupant seat positioned switch function.

In addition, the name of the operation function stored in the operation function memory unit 6500 of the operation switch 1300 positioned on the rear occupant seat is the operation switch function for the rear occupant seat.

As shown in the third uppermost part of FIG. 27, the information format of the function selection information has the second term representing the execution function selected by the vehicular occupant and using the name assigned in the third term or more of the execution function information.

Next, the information format of the kind of operation as shown in the fourth uppermost part of FIG. 27 has the second term representing the kind of operation.

The kind of operation is assigned when any one of operations of MENU, RETURN, ENTER, UP, DOWN, LEFT, and RIGHT in switches of the operation block 5100 of the master station 1700 and of the operation block 6700 of the operation switch 1300 positioned on the rear occupant seat occurs.

Next, the information format of the operation menu information has the second term representing the kind of operation menu displayed on the screen of the display unit 4300 and into which a normal (standard) menu or an interrupt menu (request menu) is assigned. According to the kind of menu, the format of the third term or more are modified.

If the kind of menu is the standard (normal) menu and a list menu, the third term indicates a title of the operation menu displayed on the screen of the display unit 4300 and the fourth term indicates the number of items of the operation menu to be displayed. The fifth term thereof indicates a default into which a default value in a numerical value is assigned as the number of the operation menu displayed in the selected state with the first item of the displayed menu as 1. The sixth term or more are aligned by the number of the items of the displayed operation menu assigned in the fourth term.

If the kind of menu is a text or an interrupt text, the title of the operation menu and the number of items in the same way as the normal menu are assigned into the third term and the fourth term thereof. The items of operation menu to be displayed are assigned into the fifth term or more.

Next, the information format of the display response information as shown in the second and fist lowest part of FIG. 27 has the second term representing a response kind 1 or the response kind 2.

The response kind 1 is assigned when any one of PUSH, ENTER, UP, and DOWN operations occurs.

The response kind 2 is assigned when only RETURN operation occurs.

The third term is added in the case of the second term being the response kind 1 which is assigned as the number of the items assigned according to the operation from the menu indicated in the operation menu information in the numerical value.

Next, a detailed operation of each block of the master station 1700 will be described with reference to FIGS. 28 through 32.

Figure 28:
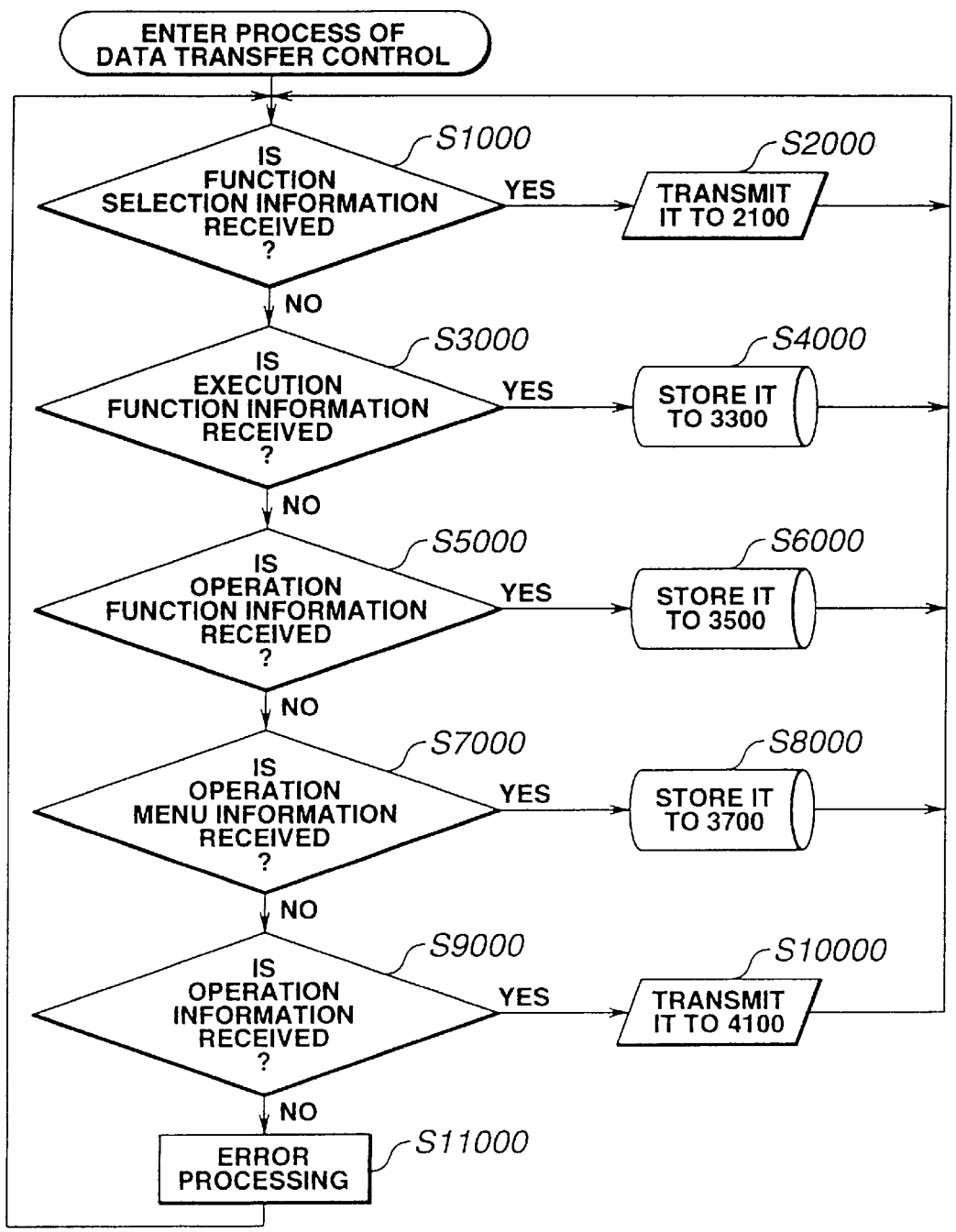
FIG. 28 is a detailed flowchart for explaining an operation carried out in an information transfer controller of the master station shown in FIG. 27.

First, an operation of the information transfer controller 3100 of the master station 1700 will be described with reference to FIG. 28.

When the vehicular occupant operates either the operation switch 5100 or the operation switch 1300 shown in FIG. 26 to select a desired item of the execution function from the execution function selection menu displayed on the display unit 4300, the display controller 4100 transmits the function selection information representing the name of the selected item to the information transfer controller 3100.

That is to say, at a step S1000, the information transfer controller 3100 determines whether the function selection information has received from the display controller 4100.

When the function selection information has been received from the display controller 4100 (YES) at the step S1000, the routine goes to a step S2000.

If no function selection information has been received (NO) at the step S1000, the routine goes to a step S3000.

At the step S2000, the information transfer controller 3100 transmits the received function selection information as the response information to the slave station 2100 having the execution function of the selected execution function.

At the step S3000, the information transfer controller 3100 determines whether the execution function information from the slave station 2100.

When the power is supplied to the slave station 2100 or to the master station 1700, or whenever the constant period of time has passed, the information transfer controller 2300 transmits the execution function information stored in the execution function memory unit 2500 to the information transfer controller 3100.

If the information transfer controller 3100 receives the execution function information from the slave station 2100 (YES) at the step S3000, the routine goes to a step S4000.

If no execution function information is received from the slave station 2100 (NO), the routine goes to a step S5000.

Next, at the step S4000, the information transfer controller 3100 transmits the received execution function information to the execution function information memory unit 3300 and stores it thereinto.

At the step S5000, the information transfer controller 3100 determines whether the operation function information has been received from either the operation function memory unit 5300 of the operation switch 5100 or the operation function memory unit 6500 of the operation switch 1300.

When the power is supplied to the operation switch 5100 or when the constant period of time has passed, the operation information is transmitted from the operation function memory unit 5300.

When the power is supplied to the switch 1300, or when the constant period of time has passed, the information transfer controller 6300 transmits the operation function information stored in the operation function memory unit 6500 to the information transfer controller 3100.

If the information transfer controller 3100 has received the operation function information (YES) at the step S5000, the routine goes to a step S6000.

If no operation function information has been received (NO), the routine goes to a step S7000.

At the step S6000, the information transfer controller 3100 transmits the received operation function information to the operation function information memory unit 3500 to store it thereinto.

At the step S7000, the information transfer controller 3100 determines whether the operation menu information has been received from the operation menu information memory unit 2700 of the slave station 2100.

When the function selection information representing the name of the item selected by the vehicular occupant is transmitted to the information transfer controller 2300, the information transfer controller 2300 transmits the operation menu information stored in the operation menu information memory unit 2700 to the information transfer controller 3100. When the information transfer controller 3100 receives the operation menu information (YES) at the step S7000, the routine goes to a step S8000.

If no operation menu information has been received (NO), the routine goes to a step S9000.

At the step S8000, the received operation menu information is transmitted to the display information memory unit 3700 to perform the display processing and to display the operation menu on the screen of the display unit 4300.

At the step S9000, the information transfer controller 3100 determines whether the operation information has been received from the operation information transmitter 5700 or 6900.

It is noted that if the operation block 5500 of the operation switch 5100 or the operation block 6700 of the operation switch 1300 has been operated, the corresponding operation information is transmitted from the operation information transmitting block 5700 or 6900.

If the information transfer controller 3100 has received the operation information, the routine goes to a step S10000.

If no operation information has been received at the step S9000, the routine goes to a step S11000.

At the step S10000, the information transfer controller 3100 transmits the received operation information to the display controller 4300 to perform the display processing, the update processing, and the response processing to the display.

At the step S11000, the error processing is carried out and the routine is thereafter returned to the step S1000 to repeat the routine described above.

As described above with reference to FIG. 28, while the slave station 2100 transfers the execution function information representing the function that the master station 1700, the operation switch 1300 transfers the inputted operation information to the master station 1700 via the common communication bus 1500.

At this time, the master station 1700 generates the selection menu including the execution function at the selection menu generating block 3900 on the basis of the transferred execution function information and displays the generated selection menu on the screen of the display unit 4300.

If the execution function is selected according to the operation information transferred from the operation switch 1300 according to the selection menu displayed on the screen of the display unit 4300, the response information is transmitted to the slave station 2100 having the corresponding execution function.

Consequently, since only the selection menu which corresponds to the execution function of the slave station 2100 connected to the communication bus 1500 is generated, the selection menu which is optimum for the present system configuration can be displayed on the screen of the display unit 4300.

Since only the displayed selection menu can be selected through the operation switch 1300 positioned on the rear occupant seat, the system configuration shown in FIGS. 25 and 26 can contribute to an improvement in operability.

In addition, the slave station 2100 may be installed at a location which is not easily accessible to the vehicular occupant.

Next, an operation of the display controller 4100 of the master station 1700 will be described below with reference to FIG. 29.

At a step S21000, the display controller 4100 determines whether the operation menu has been received.

If the operation menu information is stored in the display information memory unit 3700, the display information memory unit 3700 transmits the stored operation menu information to the display controller 4100.

If the operation menu information has been received (YES) at the step S21000, the routine goes to the step S22000.

If no operation menu information has been received (NO), the routine goes to a step S23000.

Next, at the step S22000, the display controller 4100 carries out the display processing of the received operation menu information and, thereafter, displays the operation menu information on the screen of the display unit 4300.

At the step S23000, the display controller 4100 determines whether the operation information has been received.

It is noted that if the vehicular occupant operates the operation switch 5100 or the operation switch 1300, the operation information corresponding to the operation is transmitted from the operation information transmitting block 5700 or 6900.

If the display controller 4100 determines that the operation information has been received, the routine goes to a step S24000.

If no operation information has been received (NO), the routine goes to a step S21000.

At the step S24000, the display controller 4100 determines whether the kind of operation on the received operation information is MENU.

If the vehicular occupant pushes the menu button on the operation block 5500 or 6700, the operation information transmitting block 5700 or 6900 transmits the operation information on the kind of operation being MENU.

If the kind of operation is not MENU (NO), the routine goes to a step S26000.

Next, at a step S25000, the execution function selection menu information stored in the display information storing block 3700 is read in the display controller 4100 to perform the display processing and, thereafter, displays the execution function selection menu on the screen of the display unit 4300.

At the step S26000, the display controller 4100 determines whether the execution function selection menu generated by the selection menu generating block 3900 is being displayed on the screen of the display unit 4300.

If the generated execution function selection menu is being displayed (YES), the routine goes to a step S27000.

If no generated execution function selection menu is being displayed (NO), the routine goes to a step S33000.

At the step S27000, the display controller 4100 determines whether the kind of operation of the received operation information is UP.

If it is UP (YES), the routine goes to a step S28000.

If it is not UP (NO), the routine goes to a step S29000.

At the step S28000, the display controller 4100 moves the item selected in the execution function selection menu displayed on the screen of the display unit 4300 to an upward item and the routine returns to the step S21000.

At the step S29000, the display controller 4100 determines whether the kind of operation of the received operation information is DOWN.

If the kind of operation is DOWN (YES), the routine goes to a step S30000.

If the kind of operation is not DOWN (NO) at the step S29000, the routine goes to a step S31000.

At the step S30000, the display controller 4300 moves the item selected by the execution function selection menu displayed on the display unit 4300 to a lower item and the routine returns to the step S21000.

At the step S31000, the display controller 3100 determines whether the kind of operation of the received operation information is PUSH or not.

If the kind of operation is not PUSH, the routine returns to the step S21000.

At the step S32000, the slave station 2100 having the execution function of the item which is presently selected receives the function selection information representing the name of the selected execution function.

On the other hand, at the step S33000, the display controller 4100 determines whether the operation menu information is being displayed on the screen of the display unit 4300.

Since the operation menu information represents the item selected by the vehicular occupant through the execution function selection menu, the information transfer controller 2300 transmits the operation menu information stored in the operation menu information memory unit 2700 immediately when the slave station 2100 has received the function selection information.

After the display processing of the operation menu information at the display controller 4100, the operation menu is displayed on the screen of the display unit 4300. If the operation menu is being displayed (YES) at the step S33000, the routine goes to a step S35000.

If no operation menu is being displayed (NO), the routine goes to a step S34000.

At the step S34000, the other process operation is carried out and the routine returns to the step S21000.

Next, at the step S35000, the display controller 4100 determines whether the kind of operation of the received operation information is UP.

If the kind of operation is UP (YES), the routine goes to a step S36000.

If the kind of operation does not correspond to UP (NO), the routine goes to a step S37000.

At the step S36000, the display controller 4100 moves the item selected by the operation menu and displayed on the screen of the display unit 4300 to one upward item and the routine goes to a step S39000.

Next, at the step S37000, the display controller 4100 determines whether the kind of operation of the received operation information is DOWN or not.

If the kind of operation is DOWN, the routine goes to a step S40000.

At the step S38000, the display controller 4100 moves the item displayed on the screen of the display unit 4300 and selected by the operation menu to one downward item and the routine goes to a step S39000.

At the step S39000, the display controller 4100 transmits the display response information having the kind of response being ENTER to the slave station 2100 via the information transfer controller 3100.

Next, at the step S40000, the display controller 4100 determines whether the received operation information is PUSH.

If the kind of operation is PUSH (YES), the routine goes to a step S41000.

If the kind of operation is not PUSH (NO), the routine goes to a step S42000.

At the step S41000, the display controller 4100 transmits the display response information, the kind of response being PUSH, to the slave station.

At the step S42000, the display controller 4100 determines whether the kind of operation of the received operation information is RETURN.

If the kind of operation is RETURN (YES), the routine goes to a step S43000.

If it is not RETURN, the routine goes to a step S21000.

At the step S43000, the display controller 4100 transmits the display response information that the kind of response is RETURN to the slave station 2100.

Figure 29:
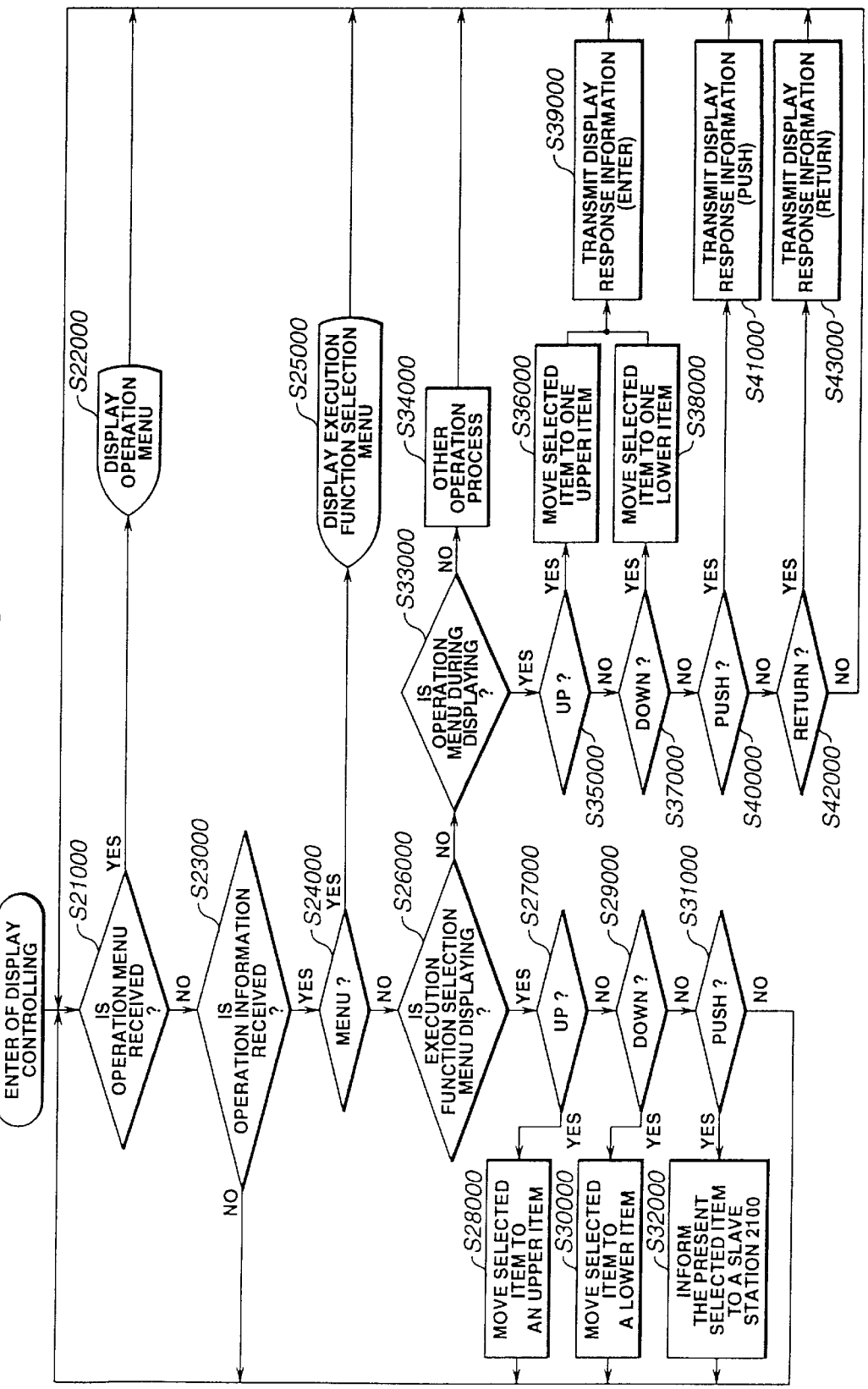
FIGS. 29, 30, and 31 are detailed flowcharts for explaining operations carried out in a display controller of the master station shown in FIG. 27.
Figure 30:
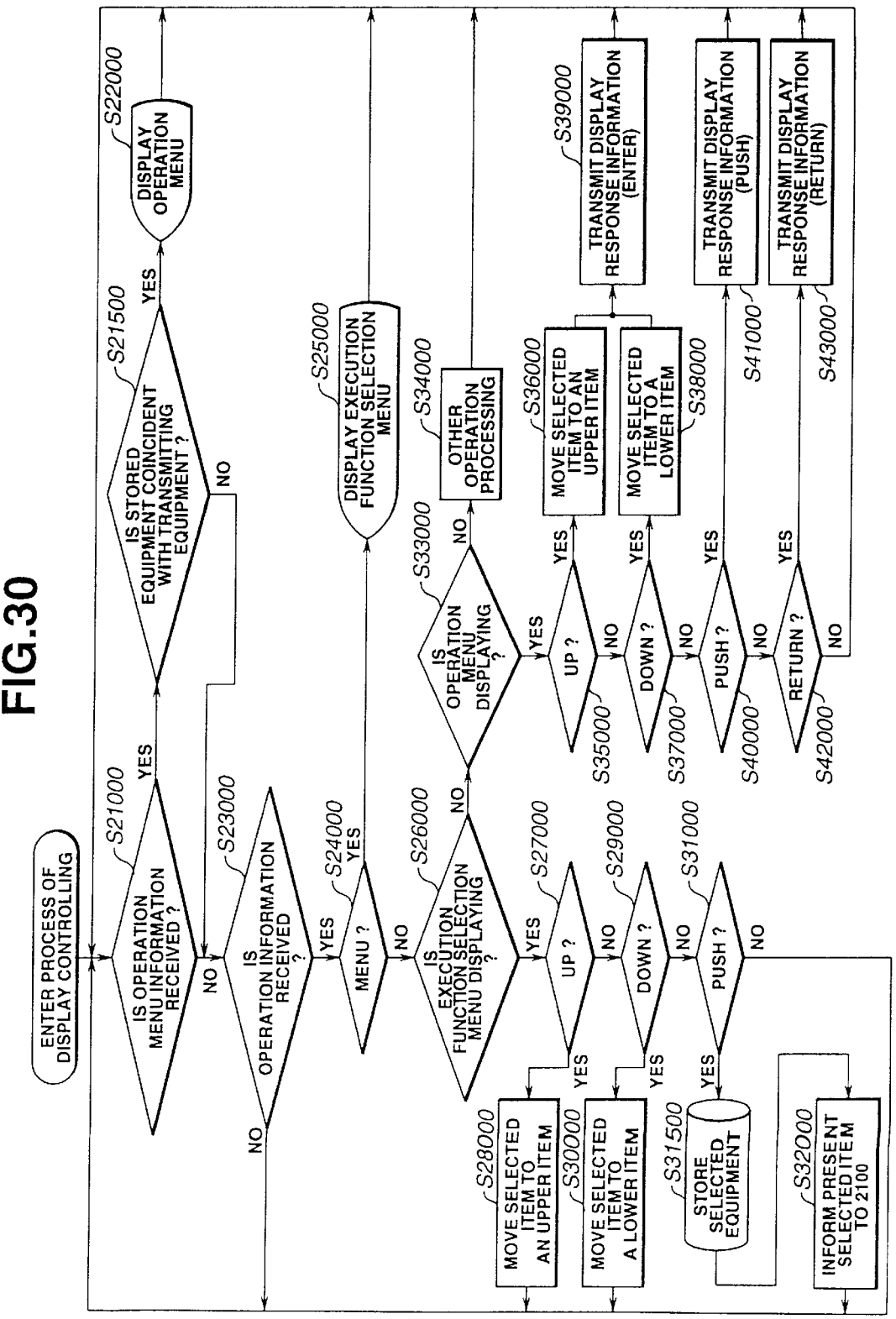

It is noted that in place of the steps S21000 through S22000 shown in FIG. 29 executed by the display controller 4100, the routine shown in FIG. 30 may be executed by the display controller 4100.

That is to say, as shown in FIG. 30, at a step S31500, the display controller 4100 stores the equipment information having the slave station 2100 selected in the execution function selection menu at the last time.

At a step S21500 of FIG. 30, the display controller 4100 determines whether the equipment information from which the operation menu has transmitted and the information of the equipment on the slave station 2100 in which the information selected in the execution function selection menu has been stored are coincident with each other.

If both are not coincident with each other, the display controller 4100 controls so that the operation menu information is not displayed on the screen of the display unit 4300.

If both are coincident with each other, the display controller 4100 can control the display so that only the operation menu information selected by the vehicular occupant through the plurality of the slave stations 2100 is displayed on the screen of the display unit 4100.

Figure 31:
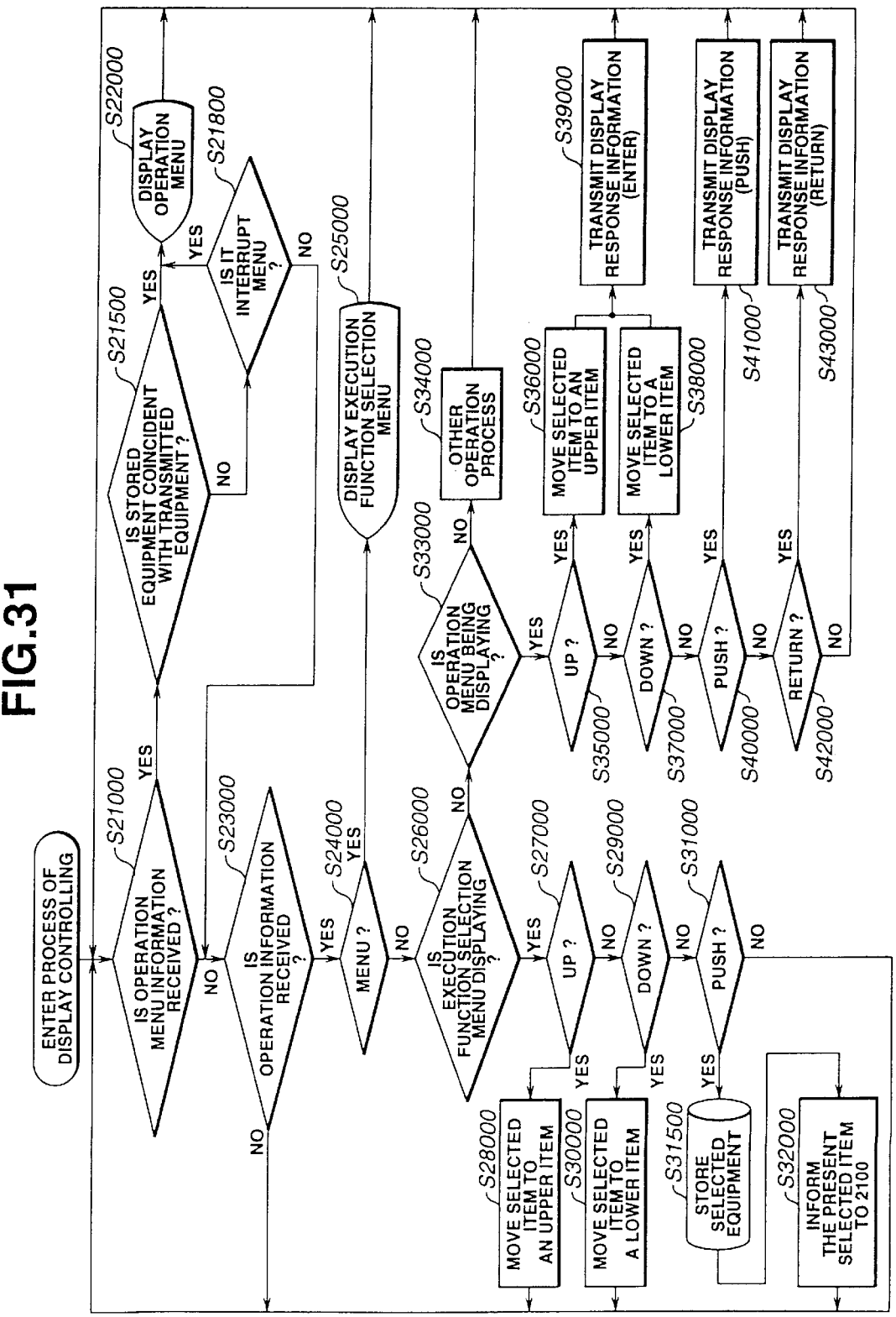

In place of the steps S21000 through S22000 shown in FIG. 29 and executed by the display controller 4100, the display controller 4100 may handle the routine of FIG. 31.

That is to say, as shown in FIG. 31, at a step S31500, the display controller 4100 stores the information of the equipment of the slave station selected in the execution function selection menu at the last time.

Next, at a step S21500 of FIG. 31, the display controller 4100 determines whether the equipment information from which both of the equipment information from which the operation menu has been transmitted and the equipment information of the slave station 2100 in which the operation menu is stored are coincident with each other.

Figure 33:
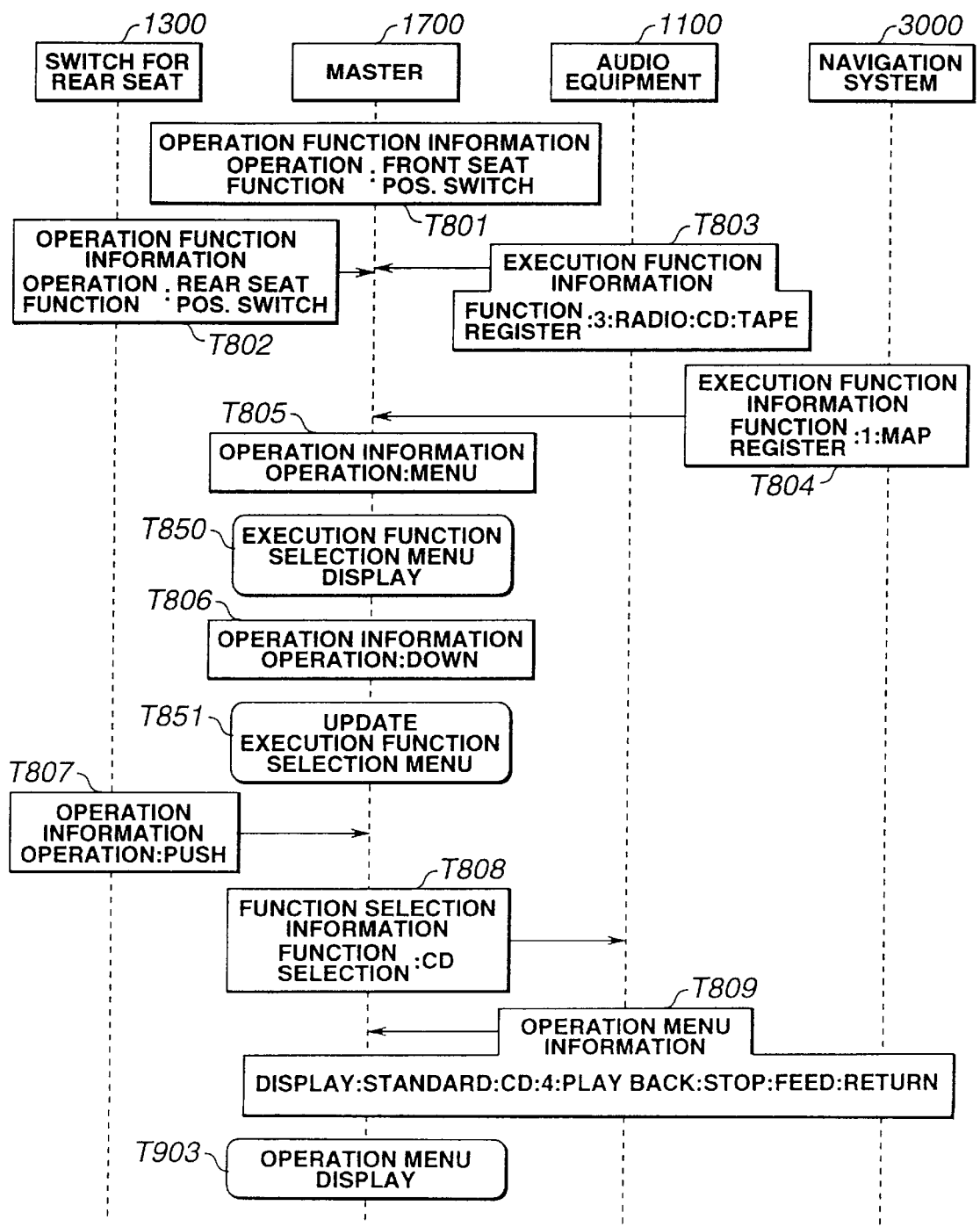
FIG. 33 is an explanatory view representing an operation sequence of the information communication system shown in FIG. 27 when a vehicular occupant selects a CD function in a case of a selection of an execution function.

If both are coincident with each other at the step S21500 of FIG. 33, the routine goes to the step S22000 of FIG. 33.

If both are different from each other at the step S21500 of FIG. 31, the routine goes to the step S21800 of FIG. 31.

At the step S21800, the display controller 4100 determines whether the kind of the received operation menu is an interrupt menu or not.

If the menu is the interrupt menu (YES), the routine goes to the step S22000 of FIG. 31 in which the display controller 4100 processes and display the received operation menu information on the screen of the display unit 4300.

In this way, with the equipment information of the selected electronic equipment in the execution function selection menu at the last time stored, the display controller 4100 determines whether both of the equipment information from which the operation menu information is transmitted and that in which it is stored are coincident with each other.

If both are coincident with each other, the display controller 4100 processes and displays the received operation menu information on the screen of the display unit 4300.

If both are different from each other and the kind of received operation menu information is the interrupt menu, the display controller 4100 displays the interrupt menu on the screen of the display unit 4300 with a higher priority than the normal one due to its emergency characteristic.

Next, an operation of the information transfer controller 2300 of the slave station 2100 will be described below with reference to FIG. 32.

First, at a step 51000, the information transfer controller 2300 determines whether the execution function information is stored in the execution function memory unit 2500 when either the power of the slave station 2100 or the master station 1700 is supplied or whenever the constant period of time has passed.

If the execution function information is stored (YES) at the step S51000, the routine goes to a step S52000.

If no execution function information is stored (NO), the routine goes to a step S53000.

At the step S52000, the execution function memory unit 2500 is transmitted to the master station 1700.

At the step S53000, the information transfer controller 2300 determines whether the function selection information representing the name of the execution function selected by the vehicular occupant has been received from the master station 1700.

If the function selection information has been received (NO) at the step S53000, the routine goes to a step S54000.

If not received (NO) at the step S53000, the routine goes to a step S56000.

At the step S54000, the operation menu information at the first hierarchy of the execution function indicated in the transmitted function selection information is transmitted from the operation menu information memory unit 2700 to the master station 1700.

At the step S56000, the information transfer controller 2300 determines whether the display response information representing the operation carried out by the vehicular occupant has been received from the master station 1700.

If the display response information has been received (YES) at the step S56000, the routine goes to a step S57000.

Figure 32:
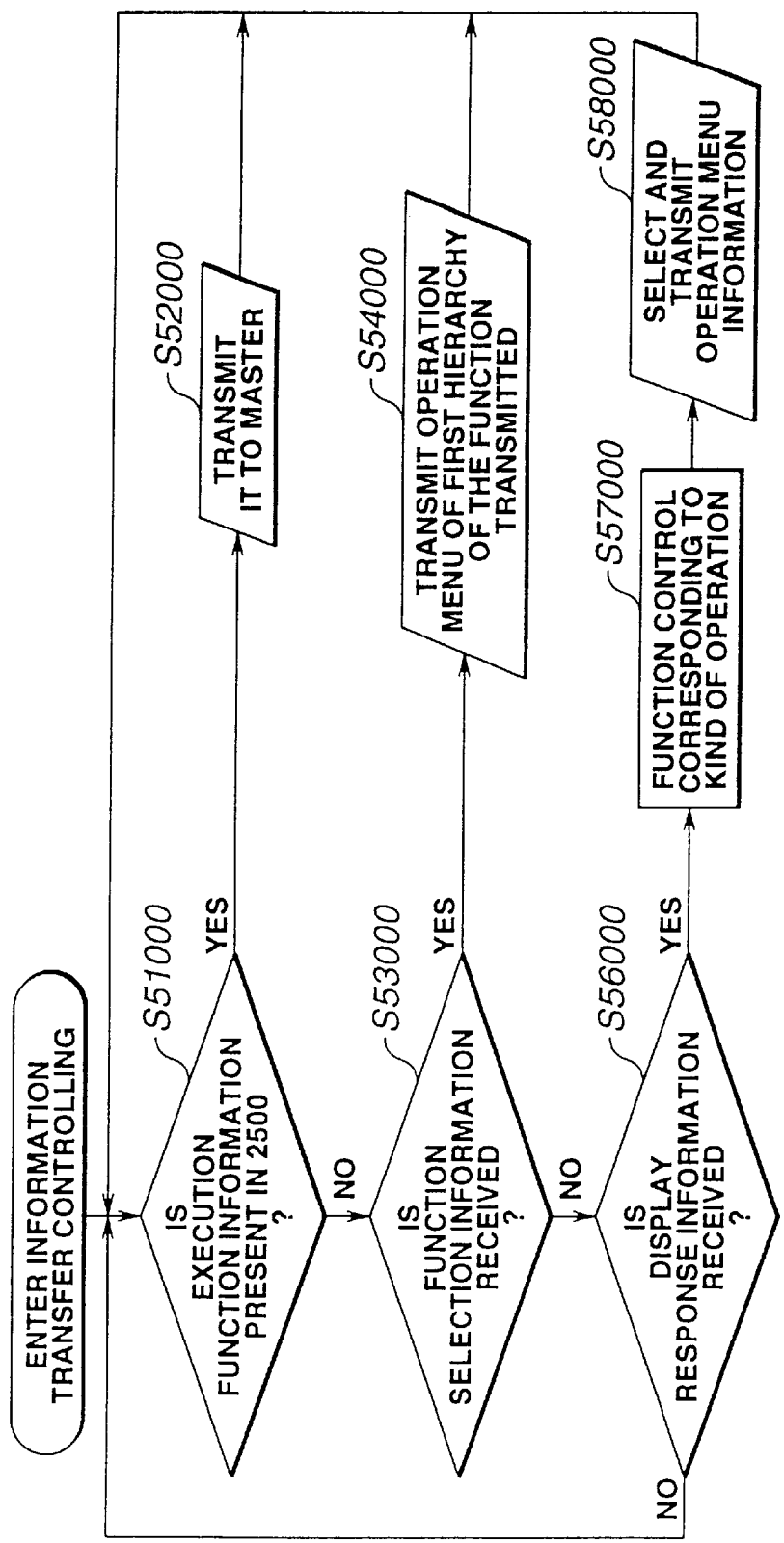
FIG. 32 is a detailed flowchart for explaining an operation of an information transfer controller of one of the slave stations shown in FIG. 27.

If no display response information has been received (NO), the routine returns to the step S51000 to repeat the routine of FIG. 32.

At the step S57000, the information transfer controller 2300 performs the control of the function of the slave station 2100 according to the received display response information.

At the step S58000, the information transfer controller 2300 performs the selection of the operation menu information to display the selected operation menu information to display the selected operation menu information on the screen of the display unit 4300 and transmits the operation menu information from the operation menu information memory unit 2700 to the master station 1700.

An operation of the whole in-vehicle information communication system 1000 shown in FIG. 25 will be described below with reference to FIGS. 33 and 34.

FIG. 33 shows an operation sequence of the in-vehicle information communication system when the vehicular occupant has selected the CD function from the execution functions.

In addition, the vehicular information communication system 1000 in the case of FIG. 33 includes: the master station 1700, the operation switch 1300, the audio equipment 1100, and the car navigation system 3000.

At a sequence T801, the master station 1700 stores the operation function information that the master station 1700 has into the operation function information memory unit 3500.

The master station 1700 stores the operation function information representing the switch function for the front occupant seat.

When the power is supplied to the master station 1700, the information transfer controller 3100 transmits the operation function information to the operation function memory unit 3500.

The operation function information memory unit 3500 stores the received operation function information when the operation function information is received.

At a sequence T802, the operation switch 1300 transmits the operation function information for the master station 1700 to store the operation function information.

The operation function memory unit 6500 stores the operation function information representing the switch function for the rear seat.

When the power is supplied to the operation switch 1300, the information transfer controller 6300 transmits the operation function information stored in the operation function memory unit 6500 to the information transfer controller 3100 of the master station 1700.

The information transfer controller 3100 transmits the received operation function information to the operation function information memory unit 3500.

The operation function information memory unit 3500 stores the received operation function information when the operation function information is received.

At a sequence T803, the radio equipment 1100 transmits the execution function information for the master station 1700 to store the execution function information.

The execution function memory unit 2500 stores the execution function information representing that the three functions of radio, CD, and tape are provided in the audio equipment 1100.

When the power is supplied to the audio equipment 1100, the information transfer controller 2300 transmits the execution function information stored in the execution function information memory unit 2500 of the master station 1700.

When the information transfer controller 3100 receives the execution function information, the information transfer controller 3100 transmits the received execution function information to the execution function information memory unit 3300.

When the execution function information is received, the execution function information memory unit 3300 stores the received execution function information when the execution function information is received.

Similarly, at a sequence of T804, the navigation system 3000 transmits the execution function information for the master station 1700 to store the execution function information.

When the power is supplied to the audio equipment 1100, the information transfer controller 3100 transmits the execution function information stored in the execution function memory unit 2500 to the information transfer controller 3100 of the master station 1700.

The information transfer controller 3100 transmits the received execution function information to the execution function memory unit 3300.

When the execution function information is received by the execution function information memory unit 3300, the execution function information is stored thereinto.

Next, at a sequence of T805, when the menu button of the operation block 5500 is pushed by the vehicular occupant, the operation information transmitting block 5700 transmits the operation information representing that the menu button has been pushed to the information transfer controller 3100.

When the information transfer controller 3100 receives the operation information, the execution function information stored in the execution function information memory unit 3300 is transmitted to the selection menu generating block 3900 in which the execution function selection menu information is generated.

The execution function selection menu is stored in the display information memory unit 3700.

Figure 35A:
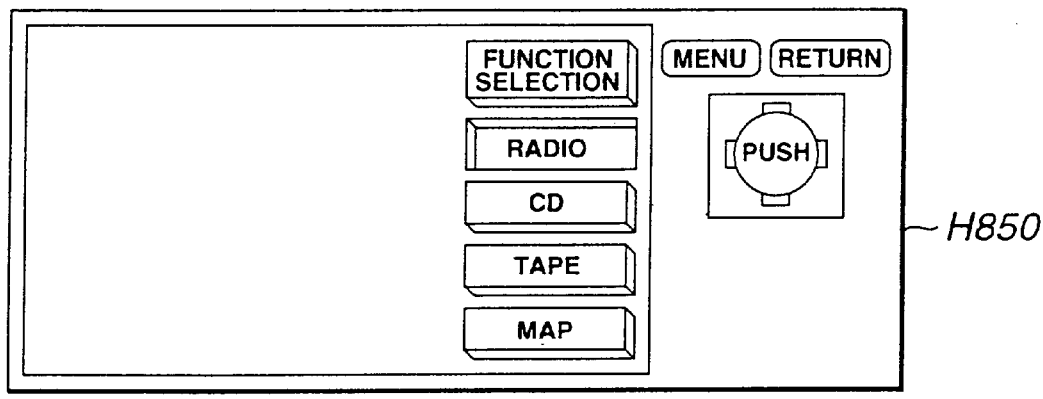
FIGS. 35A, 35B, and 35C are explanatory views, each representing a display example of an execution function selection menu.

After the display processing is carried out at the display controller 4100, the display controller 4100 displays the execution function selection menu on the screen of the display unit 4300, as shown in a display example of H850 shown in FIG. 35A.

As shown in FIG. 35A, a title of the menu "FUNCTION SELECTION" is displayed on an upper part of the screen of the display unit and each item of "radio", "CD", "tape" and "road map" is sequentially arranged in this order.

In addition, a position of a cursor indicates an item of "radio".

Next, at a sequence T806, the vehicular occupant performs a DOWN operation using the joystick of the operation block 5500 so that the position of the cursor is changed to a lower item.

Figure 35B:
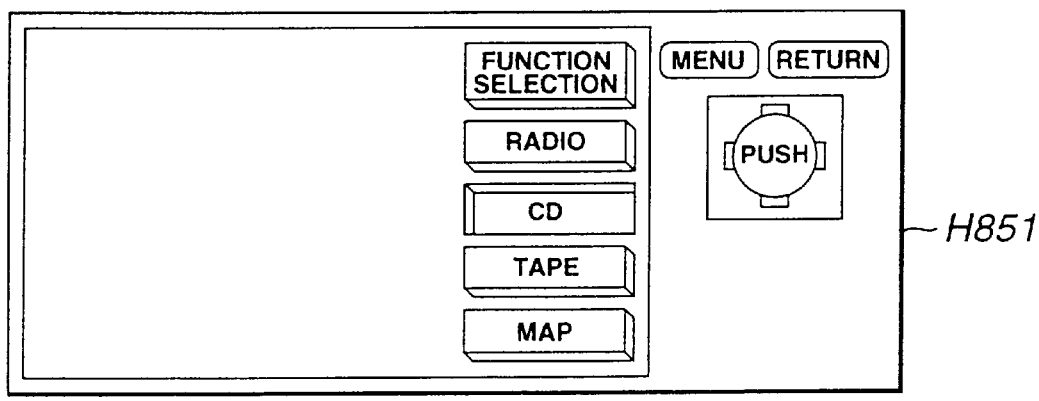

When the joystick switch is operated once to make the "DOWN" operation the position of the cursor is moved to the item of "CD". This series of operations are shown in a display example H851 in FIG. 35B.

When the item of "CD" is reversed, a visual perception can determine which item is selected by the vehicular occupant.

At a sequence of T807, when the vehicular occupant carries out PUSH operation of the operation switch 1300, the operation information representing that the PUSH operation is carried out from the operation information transmitting block 6900 is transmitted to the master station 1700.

At a sequence of T808, when the information transfer controller 3100 receives the operation information, the display controller 4100 determines that "CD" has been selected by the cursor which is presently in the selection state and transmits the function selection information representing that the "CD" has selected to the audio equipment 1100 from which this operation information has been transmitted.

Next, at a sequence of T809, when the audio equipment 1100 receives the function selection information, the operation menu information in which the selection function is the CD function is transmitted to the master station 1700.

When the information transfer controller 3100 receives the operation menu information, the operation menu information is transmitted to the display information memory unit 3700 to store it thereinto.

Then, the display controller 4100 displays the normal menu on the screen of the display unit 4300.

Figure 35C:
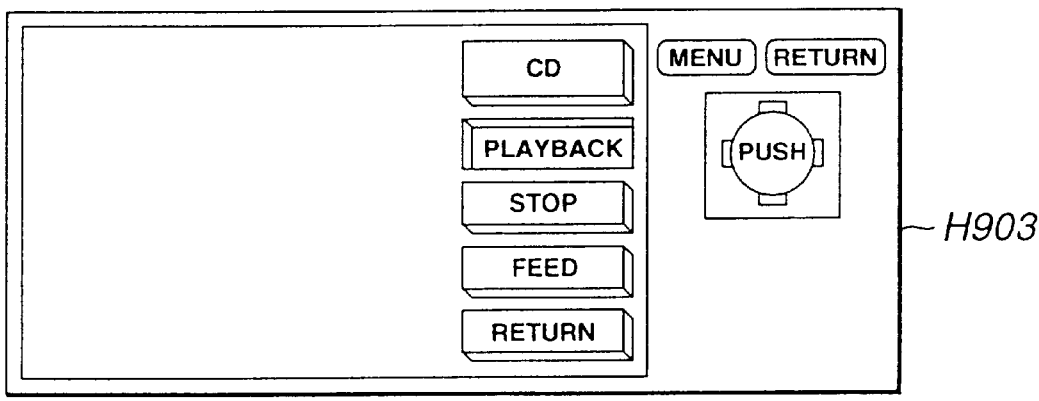

A display example of H903 of FIG. 35C shows this series of operations.

As shown in FIG. 35C, the title of the selected function "CD" is displayed on the screen of the display unit 4300 and each item of "PLAYBACK", "FEED", "RETURN" is aligned vertically. The position of the cursor is on the item of "PLAYBACK".

Hence, when the vehicular occupant operates the joystick vertically to move the position of the cursor to a desired item and to make the "PUSH" operation, the desired operation can be achieved.

FIG. 34 shows a sequence of operation in the in-vehicle information communication system 1000 when the vehicular occupant has selected the road map function in the selection of the execution function.

The same operation is carried out from the sequence T801 to the sequence T805 shown in FIG. 33 to display the execution function selection menu on the screen of the display unit 4300.

Then, when the vehicular occupant operates the joystick switch of the operation block 5500 to perform the "DOWN" operation to change the position of the cursor to a downward item.

When the joystick switch of the operation block 5500 to make the "DOWN" operation twice so that the position of the cursor is moved to the road map position.

Figure 36A:
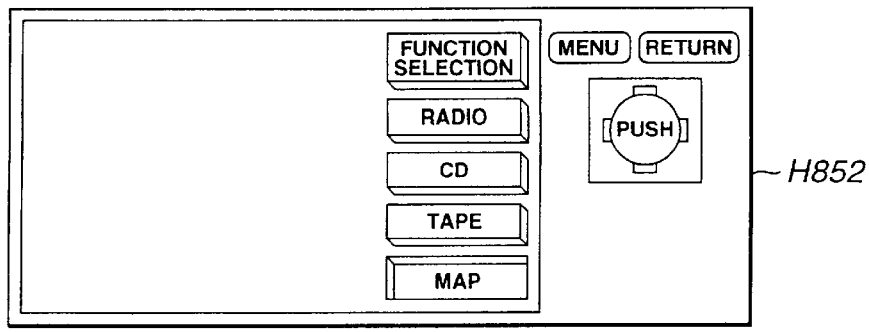
FIGS. 36A, 36B, 36C, and 36D are explanatory views, each representing a display example of the execution function selection menu.

The display of the display unit 4300 is shown in a display example H852 of FIG. 36A.

When the item of road "MAP" is reversed, the visual perception can determine which item is selected by the vehicular occupant.

When, at a sequence of T810, the vehicular occupant makes the "PUSH" operation through the operation switch 1300 located at the rear occupant seat, the operation information representing that the "PUSH" operation is carried out from the operation information transmitting block 6900 is transmitted to the master station 1700.

At the subsequent sequence T810, when the vehicular occupant makes the "PUSH" operation through the switch 1300 for the rear occupant seat, the operation information representing that the "PUSH" operation is carried out is transmitted from the operation information transmitting block 6900 to the master station 1700.

When the operation information has been received by the information transfer controller 3100 at a sequence of T811, the display controller 4100 determines that the road map in the selection state by means of the cursor has been selected and transmits the function selection information indicating that the road map function has been selected to the car navigation system 3000 from which the operation information has been transmitted.

At a sequence of T812, when the car navigation system 3000 receives the function selection information, the operation menu information of the road map function is transmitted form the navigation system 3000 to the master station 1700.

When the information transfer controller 3100 has an received the operation menu information, the operation menu information is transmitted to the display information memory unit 3700 to store it thereinto.

After the display controller 4100 carries out the display processing of the operation menu and displays it on the screen of the display unit 4300.

Figure 36B:
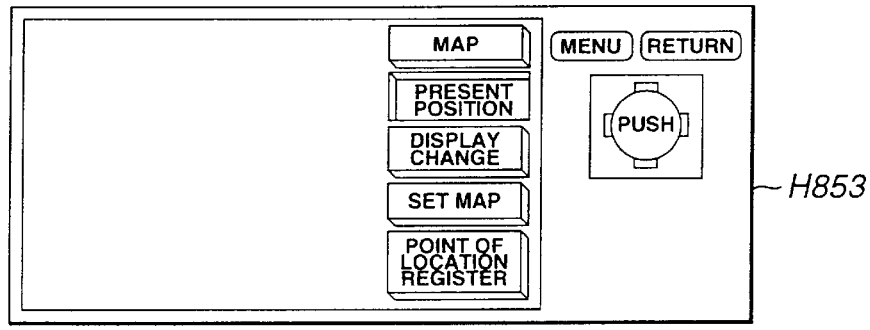

The display example of H853 is shown in FIG. 36B.

As shown in FIG. 36B, the title of the selected function "MAP" is displayed on the screen and each item of "PRESENT POSITION" "DISPLAY CHANGE", "SETTING", and "POINT OF LOCATION REGISTER" is aligned vertically in this order. The position of the cursor is on the item of the present position.

At the sequence T813, when the "DOWN" operation of the joystick switch of the operation switch 1300 is carried out, the display response information representing that the lower item has been selected is transmitted to the navigation system 3000 at the sequence T814.

The information transfer controller 2300 of the navigation system 3000 when receiving the display response information changes the position of the cursor to a lower item. The joystick switch is operated once toward the lower direction to move the position of cursor to "DISPLAY CHANGE".

Figure 36C:
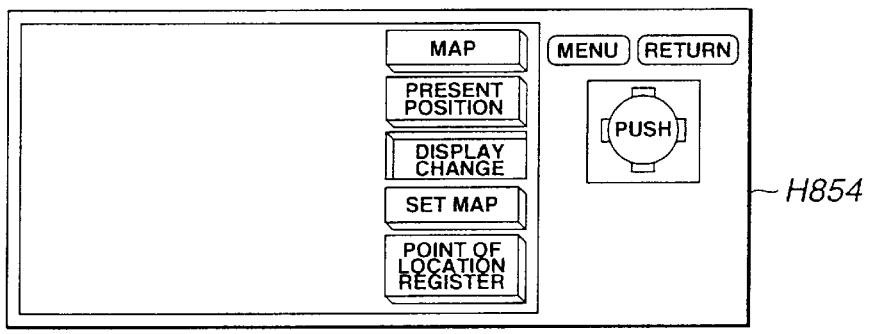

The display example H854 of FIG. 36C is shown.

When the item of "DISPLAY CHANGE" is reversed, the visual perception can determine on which item the cursor is positioned.

At a sequence of T815, the vehicular occupant transmits the operation information representing that the "PUSH"

operation is carried out from the operation information transmitting block 6900 when the operation switch 1300 makes the PUSH operation.

At a sequence of T815, when the PUSH operation is carried out through the operation switch 1300 by the vehicular occupant, the operation information representing that the PUSH operation has been carried out through the operation switch 1300 is transmitted to the master station 1700.

At a sequence of T816, when the information transfer controller 3100 receives the operation information, the display controller 4100 determines that "DISPLAY CHANGE" in presently selection state has been selected and transmits the display response information representing that the display change function has been selected in the navigation system 3000 from which the operation information is transmitted.

Next, at the sequence of T817, when the car navigation system 3000 receives the display response information, the operation menu information on the display change is transmitted to the master station 1700.

When the information transfer controller 3100 receives the operation menu information, the information transfer controller 3100 transmits the operation menu information to the display information memory unit 3700 to store it thereinto.

Then, the display controller 4100 carries out the display processing of the operation menu information and displays the operation menu information on the screen of the display unit 4300.

Figure 36D:
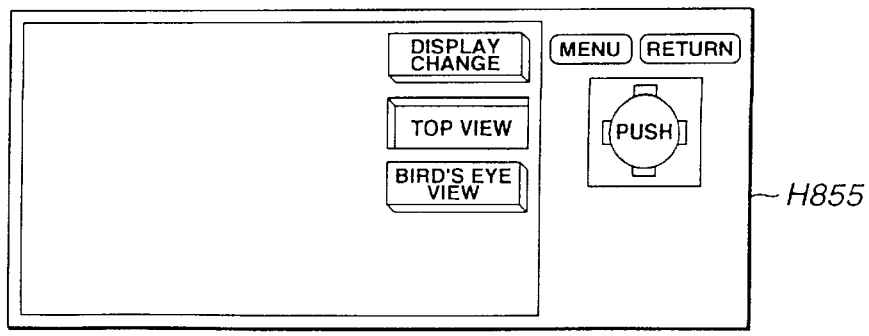

A display example of H855 is shown in FIG. 36D.

As shown in FIG. 36D, the selected item of "DISPLAY CHANGE" is displayed on the screen of the display unit 4300 and each item of "TOP VIEW" and "BIRD'S EYE VIEW" is aligned vertically in this order. The position of the cursor, at this time, is represented by the item of "TOP VIEW".

Hence, when the vehicular occupant operates the joystick switch vertically to move the position of cursor onto a desired item and makes the PUSH operation for the joystick switch, thus a desired operation being achieved.

In the fourth embodiment, the display controller 4100 of the master station 1700 carries out the determination of the operation information and transmits the display response information to the slave station 2100, the information transfer controller 2300 of the slave station 2100 repeats the selection and transmission of the operation menu. Consequently, the display information memory unit 3700 of the master station 1700 does not store all of the information in the operation menu information memory unit 2700 of the slave station 2100 but store only the necessary information, thus the capacity of memory to store the operation menu information can be reduced.

Consequently, the slave station can be located at an arbitrary position without limit of the slave station in a range by which the operator can be operated.

In addition, even if the plurality of slave stations are connected to the master station, the particular slave station can directly be selected.

Furthermore, the slave station can be added after the whole connection of the stations to the common communication bus.

(Fifth Embodiment)

Figure 37:
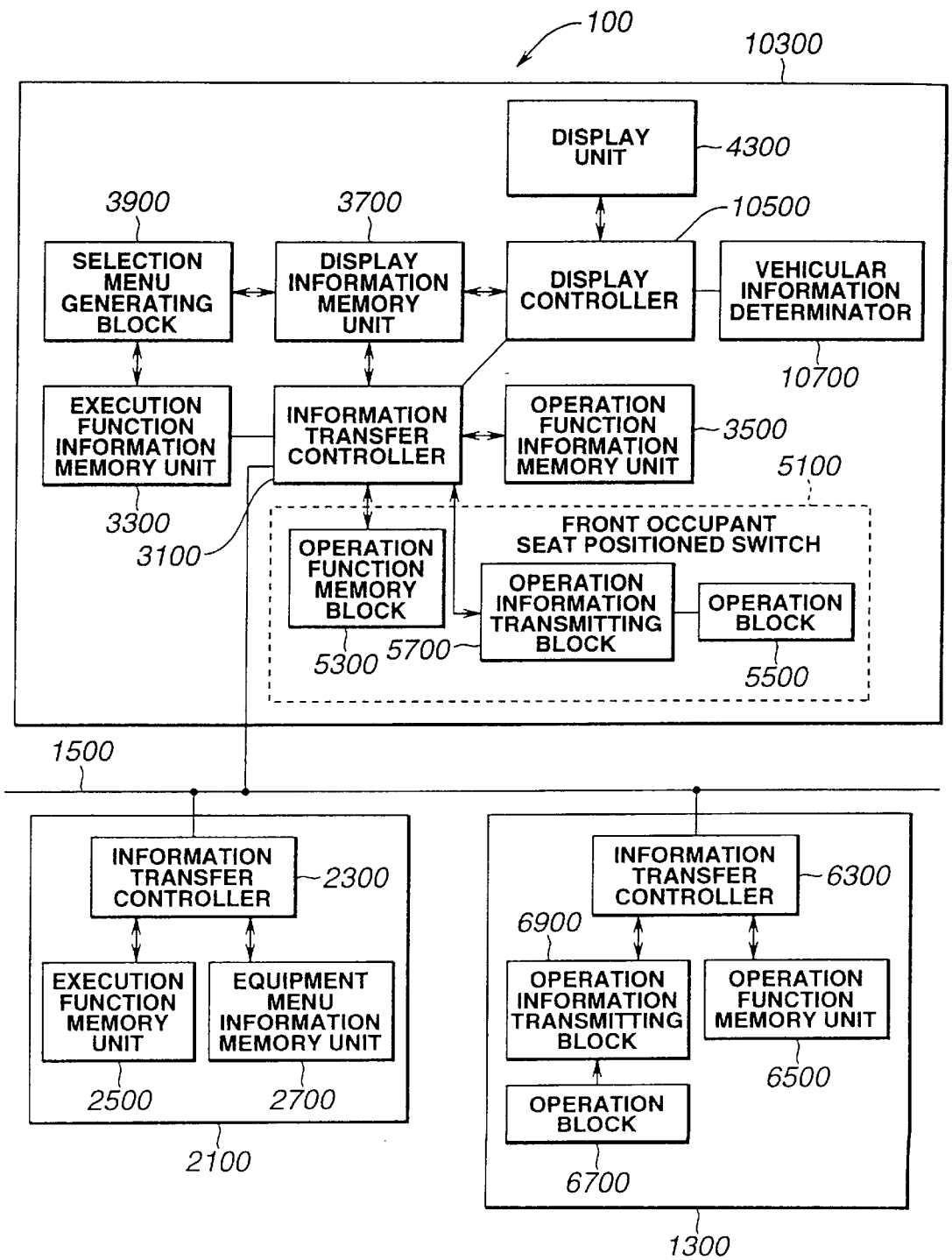
FIG. 37 is a detailed functional block diagram of the information communication system applicable to the in-vehicle networking architecture in the case of a fifth preferred embodiment according to the present invention.

FIG. 37 shows the in-vehicle information communication system in a fifth preferred embodiment according to the present invention.

The detailed explanation of the same reference numerals as those described in the fourth embodiment will be omitted herein.

The whole system configuration of the in-vehicle information communication system is the same as in FIG. 25.

The detailed configuration of the in-vehicle information communication system 100 will be described with reference to FIG. 37.

The master station 10300 includes: the information transfer controller 3100; the execution function information memory unit 3300; the operation function information memory unit 3500; the display information memory unit 3700; the selection menu generating block 3900; the display controller 105001 the display unit 4300; a vehicular information determining block 10700; and the operation switch 5100 positioned on the front occupant seat.

The master station 10300 is provided with the display controller 10500 and the vehicular information determining block 10700.

The display controller 10500 performs the display, its updating, and the response processing to the display.

The vehicular information determining block 10700 determines whether the vehicle is running or not. When the vehicle stops and determines that the switch operation is possible, the vehicular information determining block 10700 transmits the operation enabled state information indicating that the operation is enabled to the display controller 10500.

Figure 38:
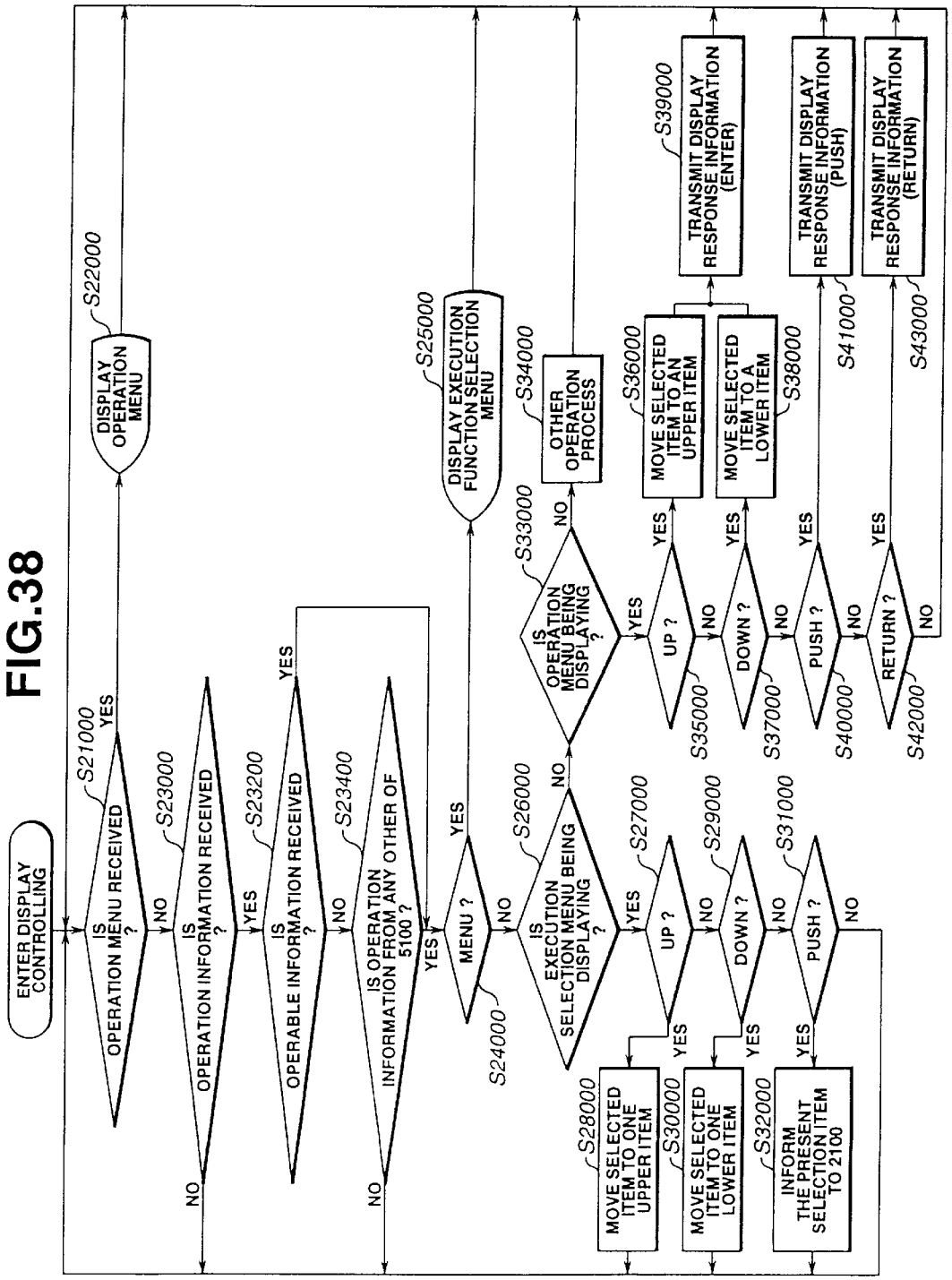
FIG. 38 is a detailed flowchart for explaining an operation carried out in a display controller shown in FIG. 37.

Next, FIG. 38 shows an operation flowchart for explaining the operation of the display controller 10500.

It is noted that the steps S21000 through the steps S23000 have the same processing as steps described in the fourth embodiment.

If the operation information is received, the routine goes to the step S23200.

At the step S23200, the display controller 10500 transmits the received information representing that the operation information has been received to the vehicular information determining block 10700.

When the received information has been received, the vehicular information determining block 10700 upon receipt of the operation information determines the running situation of the vehicle. When the vehicle stops, the vehicular information determining block 10700 transmits the operation enabled information. The display controller 10500 determines that the operation enabled information has been received from the vehicular information determining block 10700.

If the operation enabled information is received, the routine goes to a step S24000.

If not received (NO) the routine goes to a step S23400.

At the step S23400, the display controller 10500 determines whether the received operation information is that transmitted from the switch except the switch 5100 positioned on the front occupant seat.

If the received operation information is that transmitted from the switch except the switch positioned on the front occupant seat 5100, the routine goes to a step S24000. If it is the information transmitted from the operation switch except the switch 5100 positioned on the front occupant seat, the routine goes to a step S21000 to repeat the routine of FIG. 38.

It is noted that the steps of S24000 through S43000 are the same as those shown in FIGS. 29 through 31 of the eighth embodiment and its modifications and these steps S24000 through S43000 are repeated.

As described above, since the vehicular information determining block 10700 determines whether the switch operation by the vehicular occupant particularly the vehicular driver is enabled.

The display controller 10500 determines whether the switch except the operation switch 5100 has been operated when the switch operation by the vehicle driver is not enabled. When the switch described above has been operated, the switch operation is accepted so that the switch operation by the vehicular occupant except the vehicular driver can be carried out. Consequently, even if the vehicular driver is driving the vehicle, the operation by the occupant seated on the rear occupant seat can be carried out.

Thus, the fifth embodiment can contribute to the improvement of operability.

(Others)

It is noted that the car navigation system is exemplified by a U.S. Pat. No. 5,748,109 issued on May 5, 1998 and the mobile telephone is exemplified by a U.S. Pat. No. 5,734,978 issued on Mar. 31, 1998 (both of disclosures of the United States patents being herein incorporated by reference).

It is also noted that although the argument portions shown in FIG. 10 use lower case letters, no problem occurs if the argument portions shown in FIG. 10 use corresponding capital letters as used in the command names.

What is claimed is:

1. An information communication system, comprising:
   a function serving electronic-equipment which is so arranged and constructed as to be enabled to serve another electronic equipment with at least one function that the function serving electronic equipment has;
   a making-use-of function electronic equipment which is so arranged and constructed as to be enabled to make use of at least one function that another electronic equipment has;
   a common communication bus to which the function serving electronic equipment and the making-use-of function are enabled to be connected; and
   an equipment managing apparatus which is enabled to be connected to the common communication bus and including a storage block for storing a function serving information representing the function which the function serving electronic equipment is enabled to serve and a making-use-of function information representing the function of which the making-use-of function electronic equipment is enabled to make use, and a comparing block for comparing the function serving information stored in the storage block with the making-use-of function information stored in the storage block so as to determine whether both contents of the function serving information and the making-use-of function information are coincident with each other, the equipment managing apparatus allowing the making-use-of function electronic equipment to make use of the function which the function serving electronic equipment is enabled to serve when determining that both contents of the function serving information and the making-use-of function information are coincident with each other.

2. An information communication system as claimed in claim 1, wherein the equipment managing apparatus further comprises: a connection detecting block for detecting whether an electronic equipment is newly connected to the common communication bus; and a connection determining block for determining whether the newly connected electronic equipment is a new function serving electronic equipment or a new making-use-of function electronic equipment when the connection detecting block detects that the electronic equipment is newly connected.

3. An information communication system as claimed in claim 2, wherein, when the connection determining block determines that the newly connected electronic equipment is the new function serving electronic equipment, the comparing block of the managing apparatus compares the function serving information on the newly connected function serving equipment with the making-use-of function serving information on the already connected making-use-of function electronic equipment.

4. An information communication system as claimed in claim 3, wherein, when the comparing block determines that both contents of the function serving information on the newly connected function serving equipment and the making-use-of function information on the making-use-of function electronic equipment are coincident with each other, the equipment managing apparatus allows the already connected making-use-of function equipment to make use of the function which the newly connected function serving electronic equipment is enabled to serve.

5. An information communication system as claimed in claim 2, wherein, when the connection determining block determines that the newly connected electronic equipment is the new making-use-of function electronic equipment, the equipment managing apparatus compares the making-use-of function information on the newly connected making-use-of function electronic equipment with the function serving information on the already connected function serving electronic equipment so as to determine whether both contents of the making-use-of function information on the newly connected making-use-of function electronic equipment and the function serving information on the already connected function serving electronic equipment are coincident with each other.

6. An information communication system as claimed in claim 5, wherein, when the comparing block of the equipment managing apparatus determines that both contents of the making-use-of function information on the newly connected making-use-of function electronic equipment and the function serving information on the function serving electronic equipment are coincident with each other, the managing apparatus allows the newly connected making-use-of function electronic equipment to make use of the function which the already connected function serving electronic equipment is enabled to serve.

7. An information communication system as claimed in claim 1, wherein the equipment managing apparatus further includes: a disconnection detecting block for detecting whether either one of the electronic pieces of equipment is disconnected from the common communication bus and a disconnection determining block for determining whether one of the electronic pieces of equipment which is disconnected from the common communication bus is the function serving electronic equipment or the making-use-of function electronic equipment.

8. An information communication system as claimed in claim 7, wherein, when the disconnection determining block determines that the disconnected electronic equipment is the function serving electronic equipment, the comparing block of the equipment managing apparatus compares the function serving information on the disconnected function serving electronic equipment with the making-use-of function information on the connected making-use-of function electronic equipment so as to determine whether both contents of the function serving information on the disconnected function serving electronic equipment and the making-use-of function information on the connected making-use-of function electronic equipment are coincident with each other.

9. An information communication system as claimed in claim 8, wherein, when both contents of the function serving information on the disconnected function serving electronic equipment and the making-use-of function information on the connected making-use-of function electronic equipment are coincident with each other, the equipment managing apparatus inhibits the connected making-use-of function electronic equipment from making use of the function which the disconnected function serving electronic equipment is enabled to serve.

10. An information communication system as claimed in claim 7, wherein, when the disconnection determining block determines that the disconnected electronic equipment is the making-use-of function electronic apparatus, the comparing block of the equipment managing apparatus compares the function serving information on the connected function serving electronic equipment with the making-use-of function information on the disconnected making-use-of function electronic equipment so as to determine whether both contents of the function serving information on the connected function serving electronic equipment and the making-use-of function information on the disconnected making-use-of function electronic equipment are coincident with each other.

11. An information communication system as claimed in claim 10, wherein, when both contents of the function serving information on the connected function serving electronic equipment and the making-use-of function information on the disconnected making-use-of function electronic equipment are coincident with each other, the equipment managing apparatus inhibits the connected function serving electronic equipment from serving the function with which the function serving electronic equipment is enabled to serve the disconnected making-use-of function electronic equipment.

12. An information communication system as claimed in claim 1, wherein the function serving information is transmitted from the function serving electronic equipment to the common communication bus in a predetermined information format with the function serving information added thereto and the making-use-of function information is transmitted to the common communication bus in the predetermined information format with the function serving information added thereto.

13. An information communication system as claimed in claim 12, wherein the predetermined information format is constituted by a command (address, argument [, argument [, argument - - - ]]).

14. An information communication system as claimed in claim 13, wherein the common communication bus is extended within an automotive vehicle and wherein the function serving electronic equipment includes a first monitor of a wide screen with a front occupant seat positioned dial switch and a second monitor of a normal screen with a rear occupant seat positioned joystick switch and the making-use-of function electronic equipment includes a car navigation system and a mobile telephone with an adapter for the automotive vehicle and the information format in which the first monitor transmits the function serving information is resource(address, monitor_ wide, switch_dial); the information format in which the second monitor transmits the function serving information is resource(address, monitor_normal, switch_joystick); the information format in which the car navigation system transmits the making-use-of function information is search(address,switch_dial, monitor_wide); and the information format in which the mobile telephone transmits the making-use-of function information is search(address,switch_10 key, switch_joystick, monitor_normal).

15. An information communication system as claimed in claim 14, wherein each of the first and second monitors transmits function serving information in the predetermined information format to the equipment managing apparatus via a common communication bus connected thereto to store the corresponding function serving information in the predetermined information format into the storage block and each of the car navigation system and the mobile telephone transmits the making-use-of function information in the predetermined information format via the communication bus connected thereto to the equipment managing apparatus to store the making-use-of function information in the predetermined information format into the storage block, the comparing block of the equipment managing apparatus compares argument portions of the function serving information transmitted from each of the first and second monitors with those of the making-use-of function information transmitted from each of the car navigation system and the mobile telephone so as to determine whether both argument portions are coincident with each other, and the equipment managing apparatus transmits a registration instruction information to a corresponding one of the navigation system and the mobile telephone to register the corresponding one of the first monitor and the second monitor into its making-use-of function electronic equipment source list describing the equipment whose at least one function is made use of.

16. An information communication system as claimed in claim 15, wherein the equipment managing apparatus transmits the registration instruction information to the car navigation system to register the first monitor into its making-use-of function electronic equipment source list describing the electronic equipment whose at least one function is made use of and transmits the registration instruction information to the mobile telephone to register the second monitor into its making-use-of function electronic equipment source list and wherein the car navigation system is enabled to make use of a wide monitor function and a dial switch function that the first monitor serves and the mobile telephone is enabled to make use of a joystick switch function and a normal monitor function that the second monitor serves.

17. An information communication system as claimed in claim 16, wherein, when the first monitor is disconnected from the common communication bus, the equipment managing apparatus searches for the making-use-of function information having the same arguments as those of the disconnected first monitor stored in the storage block and transmits a deletion instruction information to the car navigation system which makes use of the functions of the first monitor to delete the first monitor from the making-use-of function electronic equipment source list of the car navigation system.

18. An information communication system as claimed in claim 13, wherein the common communication bus is extended within an automotive vehicle, wherein the function serving electronic equipment includes a first monitor with a front occupant seat positioned dial switch and a second monitor with a rear occupant seat positioned joystick switch and the making-use-of function electronic equipment includes a car navigation system and a mobile telephone with an adapter for the automotive vehicle, wherein each of the first monitor and the second monitor transmits large classification data of the functions which the corresponding one of the first monitor and the second monitor is enabled to serve as the function serving information via the common communication bus to store the large classification data of the functions into the storage block and each of the car navigation system and the mobile telephone transmits the large classification data of the functions of which the corresponding one of the car navigation system and the mobile telephone is desired to make use as the making-use-of function information to store the large classification data into the storage block, wherein the equipment managing apparatus tells each of the car navigation system and the mobile telephone that the function to be desired to be made use of by the corresponding one of the car navigation system and the mobile telephone is provided in the corresponding one of the first monitor and the second monitor when both of the large classification data of the functions to be served by the corresponding one of the first monitor and the second monitor and of the functions to be desired to be made use of by the corresponding one of the car navigation system and the mobile telephone are coincident with each other, wherein each of the car navigation system and the mobile telephone makes an inquiry of whether a detailed function is provided in the corresponding one of the first monitor and the second monitor to the corresponding one of the fist monitor and the second monitor when the large classification data of the function to be served by the corresponding one of the first monitor and the second monitor is coincident with that to be desired to be made use of by the corresponding one of the car navigation system and the mobile telephone, wherein each of the first monitor and second monitor returns an answer on the inquiry to the corresponding one of the car navigation system and the mobile telephone, and wherein each or either of the car navigation system or the mobile telephone registers each or either of the first monitor or the second monitor into its making-use-of function equipment source list describing the equipment whose function is desired to be made use of when the answer of the inquiry of the detailed function is positive.

19. An information communication system, comprising:

a function serving electronic equipment which is so arranged and constructed as to be enabled to serve another electronic equipment with at least one function that the function serving electronic equipment has;

a making-use-of function electronic equipment which is so arranged and constructed as to be enabled to make use of at least one function that another electronic equipment has;

a common communication bus to which the function serving electronic equipment and the making-use-of function are enabled to be connected; and equipment managing apparatus which is enabled to be connected to the common communication bus and including storage means for storing a function serving information representing the function which the function serving electronic equipment is enabled to serve and a making-use-of function information representing the function of which the making-use-of function electronic equipment is enabled to make use, and comparing means for comparing the function serving information stored in the storage means with the making-use-of function information stored in the storage means so as to determine whether both contents of the function serving information and the making-use-of function information are coincident with each other, the equipment managing apparatus allowing the making-use-of function electronic equipment to make use of the function which the function serving electronic equipment is enabled to serve when determining that both contents of the function serving information and the making-use-of function information are coincident with each other.

20. An information communication method, comprising the steps of:

connecting a function serving electronic equipment which is so arranged and constructed as to be enabled to serve another electronic equipment with at least one function that the function serving electronic equipment has to a common communication bus;

connecting a making-use-of function electronic equipment which is so arranged and constructed as to be enabled to make use of at least one function that another electronic equipment has to the common communication bus;

connecting an equipment managing apparatus to the common communication bus;

storing a function serving information representing the function which the function serving electronic equipment is enabled to serve and a making-use-of function information representing the function of which the making-use-of function electronic equipment is enabled to make use into a storage block of the equipment managing apparatus;

comparing the function serving information stored in the storage block with the making-use-of function information stored in the storage block so as to determine whether both contents of the function serving information and the making-use-of function information are coincident with each other; and allowing the making-use-of function electronic equipment to make use of the function which the function serving electronic equipment is enabled to serve when determining that both contents of the function serving information and the making-use-of function information are coincident with each other at the comparing step.

* * * * *